United States Patent
Maruyama et al.

(10) Patent No.: US 12,371,282 B2
(45) Date of Patent: **\*Jul. 29, 2025**

(54) PICK-UP DEVICE

(71) Applicant: JUKI CORPORATION, Tama (JP)

(72) Inventors: Takeshi Maruyama, Tama (JP); Yuuki Uehara, Tama (JP)

(73) Assignee: JUKI CORPORATION, Tama (JP)

( * ) Notice: Subject to any disclaimer, the term of this patent is extended or adjusted under 35 U.S.C. 154(b) by 910 days.

This patent is subject to a terminal disclaimer.

(21) Appl. No.: 17/539,328

(22) Filed: Dec. 1, 2021

(65) Prior Publication Data

US 2022/0185600 A1 Jun. 16, 2022

(30) Foreign Application Priority Data

Dec. 10, 2020 (JP) ................. 2020-204921

(51) Int. Cl.
*B65G 59/04* (2006.01)
*B25J 15/00* (2006.01)
(Continued)

(52) U.S. Cl.
CPC .......... *B65G 59/04* (2013.01); *B25J 15/0014* (2013.01); *B25J 15/0052* (2013.01);
(Continued)

(58) Field of Classification Search
CPC .......... B65H 3/0816; B65H 3/14; B65H 3/32; B65H 3/40; B65H 3/48; B65G 59/023; B65G 59/04; B25J 15/0052; B25J 15/0014
(Continued)

(56) References Cited

U.S. PATENT DOCUMENTS

| 1,567,372 A | * | 12/1925 | Jacobson | ................. B65H 3/48 271/20 |
| 2,454,762 A | * | 11/1948 | Belluche | ................. B65H 3/48 271/11 |

(Continued)

FOREIGN PATENT DOCUMENTS

| JP | S55-89143 A | 7/1980 |
| JP | H04-303494 A | 10/1992 |

(Continued)

OTHER PUBLICATIONS

Notice of Reasons for Refusal mailed Jun. 11, 2024 for Japanese Patent Application No. 2020-204921.

*Primary Examiner* — James R Bidwell
(74) *Attorney, Agent, or Firm* — Faegre Drinker Biddle & Reath LLP

(57) ABSTRACT

A pick-up device picking up stacked sheet-shaped workpieces from the top, the device includes a nozzle mechanism that pulls up a first workpiece from the top of the stacked workpieces by air blowing, a holding mechanism that holds the first workpiece, a separation mechanism that includes a claw member being inserted into a lower side of the first workpiece with respect to the stacked workpieces, and a forward and backward drive unit causing a tip part of the claw member to move forward and backward, a suction mechanism that pulls up the first workpiece, a control device that controls the above four mechanisms, and a selection unit that selects one or more combinations of the nozzle mechanism, the separation mechanism, and the suction mechanism. The control device controls an operation for picking up the stacked workpieces from the top according to the selection of the selection unit.

9 Claims, 43 Drawing Sheets

(51) Int. Cl.
  *B65G 59/02*   (2006.01)
  *B65H 3/08*    (2006.01)
  *B65H 3/14*    (2006.01)
  *B65H 3/32*    (2006.01)
  *B65H 3/40*    (2006.01)
  *B65H 3/48*    (2006.01)
(52) U.S. Cl.
  CPC ......... *B65G 59/023* (2013.01); *B65H 3/0816* (2013.01); *B65H 3/14* (2013.01); *B65H 3/32* (2013.01); *B65H 3/48* (2013.01); *B65G 2203/0233* (2013.01); *B65H 3/40* (2013.01)
(58) Field of Classification Search
  USPC ..................................... 271/97, 98, 105, 106
  See application file for complete search history.

(56) References Cited

U.S. PATENT DOCUMENTS

| | | | | |
|---|---|---|---|---|
| 7,328,895 B2* | 2/2008 | Dinatale | .............. | B65H 3/0816 |
| | | | | 271/106 |
| 8,925,912 B2* | 1/2015 | Wang | ................... | B65H 3/0816 |
| | | | | 271/106 |
| 12,043,936 B2* | 7/2024 | Uehara | ................... | B65H 5/08 |

FOREIGN PATENT DOCUMENTS

| JP | H11-71033 A | 3/1999 |
|---|---|---|
| JP | 2017-006591 A | 1/2017 |
| JP | 2020-029353 A | 2/2020 |

* cited by examiner

PICK-UP DEVICE

CROSS-REFERENCE TO RELATED APPLICATIONS

The present application claims the benefit of priority of Japanese Patent Application No. 2020-204921, filed on Dec. 10, 2020, the content of which is incorporated herein by reference.

TECHNICAL FIELD

The present invention relates to a pick-up device for picking up stacked sheet-shaped workpieces.

BACKGROUND

In order to perform sewing efficiently, a sewing device such as a sewing machine or the like uses a pick-up device that picks up a first workpiece from the top one by one from a supply unit in which a plurality of sheet-shaped workpieces are stacked and stored, and supplies the picked-up workpiece to the sewing machine.

In the pick-up device, the workpieces are sucked and picked up one by one by a suction nozzle and then conveyed to the sewing machine for supply (for example, refer to JP-A-2017-6591).

SUMMARY

However, since the above-described pick-up device of related art is configured to pick up a first workpiece from the top by allowing a tip part of a suction nozzle to abut against the first workpiece from the top from above, two or more of workpieces are picked up at a time depending on a type of material of the workpiece, such that it is difficult to stably perform a desirable pick-up operation.

An object of the present invention is to appropriately pick up a workpiece in consideration of various workpieces.

An aspect of the present embodiment is a pick-up device picking up stacked sheet-shaped workpieces from the top, the device comprising:
  a nozzle mechanism that includes a pick-up nozzle pulling up a first workpiece from the top of the stacked workpieces by air blowing;
  a holding mechanism that holds the first workpiece from the top;
  a separation mechanism that includes a claw member being inserted into a lower side of the first workpiece from the top with respect to the stacked workpieces, and a forward and backward drive unit causing a tip part of the claw member to move forward and backward;
  a suction mechanism that includes a non-absorption type suction pad pulling up the first workpiece from the top of the stacked workpieces;
  a control device that controls the nozzle mechanism, the separation mechanism, the suction mechanism, and the holding mechanism; and
  a selection unit that selects one or more combinations of the nozzle mechanism, the separation mechanism, and the suction mechanism,
  wherein the control device executes operation control for picking up the stacked workpieces from the top according to the selection of the selection unit.

In the pick-up device, the control device may execute, according to the selection of the selection unit, the operation control of any one of a first pick-up operation for picking up the workpiece by the separation mechanism alone, a second pick-up operation for picking up the workpiece by a combination of the nozzle mechanism and the separation mechanism, and a third pick-up operation for picking up the workpiece by a combination of the suction mechanism and the separation mechanism.

In the pick-up device, the holding mechanism may include a gripping member that is lowered relative to the claw member on the upper side of the claw member to grip the workpiece, and a gripping drive unit that gives the gripping member a movement operation for allowing the gripping member to move along a relatively downward direction with respect to the claw member, and the control device, in the first pick-up operation, may cause the tip part of the claw member of the separation mechanism to move forward to be inserted into the lower side of the first workpiece from the top, and may cause the gripping member of the holding mechanism to be relatively lowered to grip the first workpiece from the top.

In the pick-up device, the holding mechanism may include a gripping member that is lowered relative to the claw member on the upper side of the claw member to grip the workpiece, and a gripping drive unit that gives the gripping member a movement operation for allowing the gripping member to move along a relatively downward direction with respect to the claw member, and the control device, in the second pick-up operation, may cause the pick-up nozzle to blow air by the nozzle mechanism to pull up the first workpiece from the top, may cause the tip part of the claw member of the separation mechanism to move forward to be inserted into the lower side of the first workpiece from the top, and may cause the gripping member of the holding mechanism to be relatively lowered to grip the first workpiece from the top.

In the pick-up device, the holding mechanism may include a gripping member that is relatively lowered relative to the claw member on the upper side of the claw member to grip the workpiece, and a gripping drive unit that gives the gripping member a movement operation for allowing the gripping member to move along a relatively downward direction with respect to the claw member, and the control device, in the third pick-up operation, may cause the non-absorption type suction pad of the suction mechanism to pull up the first workpiece from the top of the stacked workpieces, may cause the tip part of the claw member of the separation mechanism to move forward to be inserted into the lower side of the first workpiece from the top, and may cause the gripping member of the holding mechanism to be relatively lowered to grip the first workpiece from the top.

The pick-up device may further comprise a displacement detecting unit that detects a displacement in a stacking direction on an upper surface of the stacked workpieces; and an estimation unit that estimates a state of the first workpiece from the top, based on a detected result of the displacement detecting unit.

In the pick-up device, the estimation unit may estimate the state of the first workpiece from the top, from the displacement in the stacking direction on the upper surface of the stacked workpieces to be detected by the displacement detecting unit, and an inclination based on the displacement.

In the pick-up device, the control device may execute a normalization operation for normalizing the state of the first workpiece according to the state of the first workpiece from the top estimated by the estimation unit.

In the pick-up device, the control device may control any one or more of the nozzle mechanism, the separation mechanism, the suction mechanism, and the holding mechanism to execute the normalization operation.

As described above, the present invention includes a selection unit for selecting any one or a plurality of combinations of a nozzle mechanism, a separation mechanism, and a suction mechanism. Since a control device executes operation control for picking up stacked workpieces from the top according to selection of the selection unit, it is possible to pick up the workpiece suitable for each mechanism and to desirably pick up a wide variety of workpieces.

DESCRIPTION OF EMBODIMENTS

Embodiment of the Invention

Figure 1:
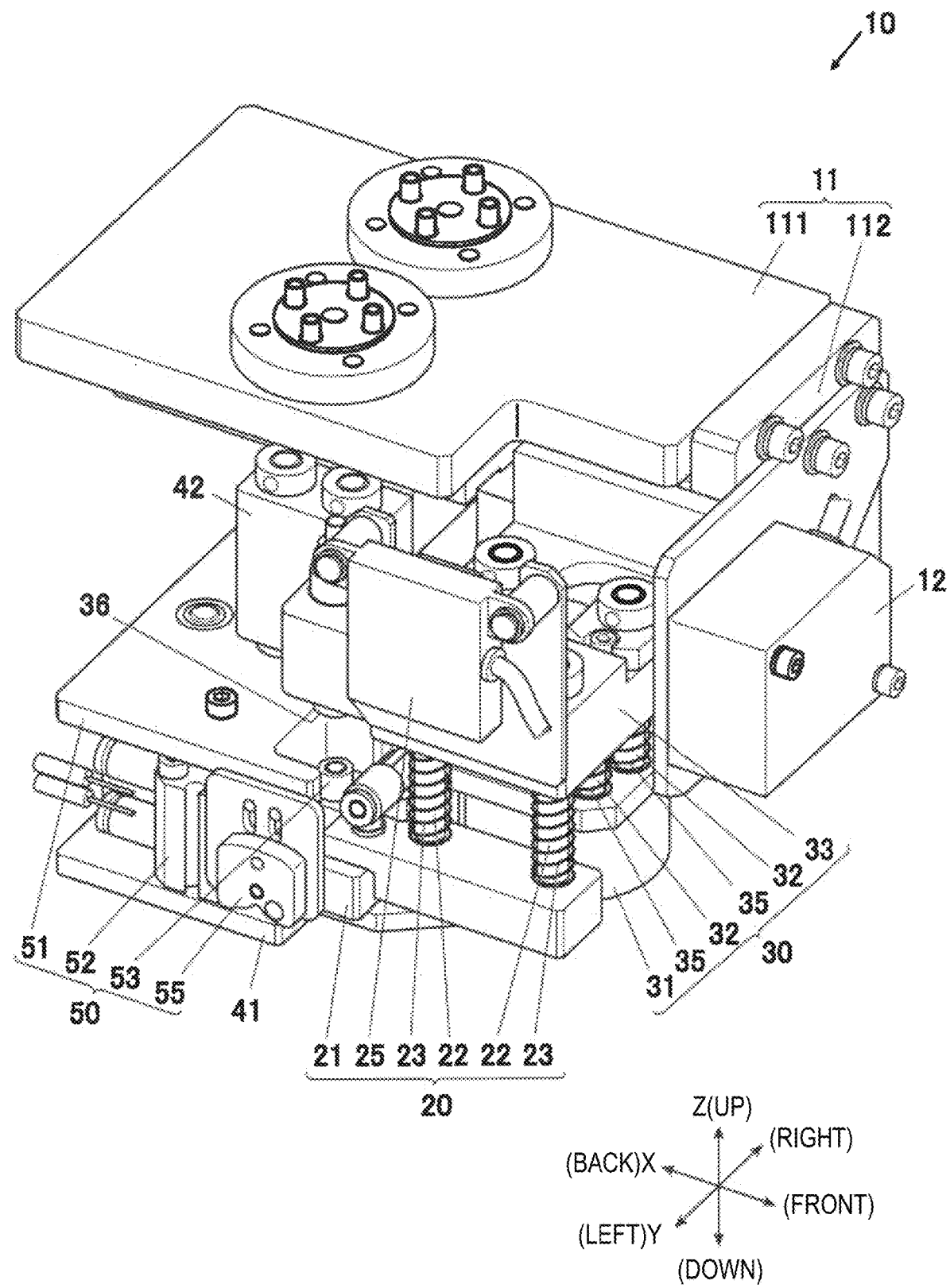
FIG. 1 is a perspective view of a pick-up device according to an embodiment.

An embodiment of the present invention will be described with reference to the drawings.

FIGS. 1 to 4 are perspective views of a pick-up device 10 according to the embodiment when viewed from different directions.

The pick-up device 10 is supported by a conveyance device capable of holding the pick-up device 10 and conveying the pick-up device 10 in any direction of front, back, left, right, up, and down, and further is supported by a conveyance device such as a robot arm or the like capable of rotating the pick-up device 10 around three axes orthogonal to each other and changing a posture thereof.

The pick-up device 10 supplies a workpiece C by picking up the workpieces C one by one from a supply device that holds a plurality of sheet-shaped workpieces C in a stacked state, and by conveying the workpiece C to a sewing machine.

In the following description, a direction which is parallel to a flat bottom surface of a claw member 41 and in which the claw member 41 moves forward and backward, is referred to as an X-axis direction, a direction parallel to the flat bottom surface of the claw member 41 and orthogonal to the X-axis direction is referred to as a Y-axis direction, and a direction orthogonal to the X-axis direction and the Y-axis direction is referred to as a Z-axis direction, which will be described later.

When the pick-up device 10 picks up a first workpiece C from the top of a plurality of workpieces C stacked in the supply device which is not illustrated, the Z-axis direction of the pick-up device 10 is directed to a state parallel to a perpendicular vertical direction.

As illustrated in FIGS. 1 to 4, a direction which is parallel to the X-axis direction and in which the claw member 41 moves forward, is referred to as "front", and a direction opposite thereto is referred to as "back", a direction which is parallel to the Y-axis direction and becomes a left side when the pick-up device 10 is viewed from the front is referred to as "left", a direction which is parallel to the Y-axis direction and becomes a right side when the pick-up device 10 is viewed from the front is referred to as "right", a direction which is parallel to the Z-axis direction and becomes an upper side when the workpiece C is picked up is referred to as "up", and a direction which is parallel to the Z-axis direction and becomes a lower side when the workpiece C is picked up is referred to as "down".

The directions of the X-axis, the Y-axis, and the Z-axis, and the directions of front, back, left, right, up, and down indicate each direction from a viewpoint on the pick-up device 10, and the direction of the pick-up device 10 can be freely and selectively changed by a conveyance device such as a robot arm or the like. It is assumed that in principle, the directions of the X-axis, the Y-axis, and the Z-axis, and the directions of front, back, left, right, up, and down in the following description indicate each direction from the viewpoint on the pick-up device 10, and do not indicate each direction from a viewpoint on the conveyance device unless otherwise specified.

[Schematic Configuration of Pick-Up Device]

Figure 11:
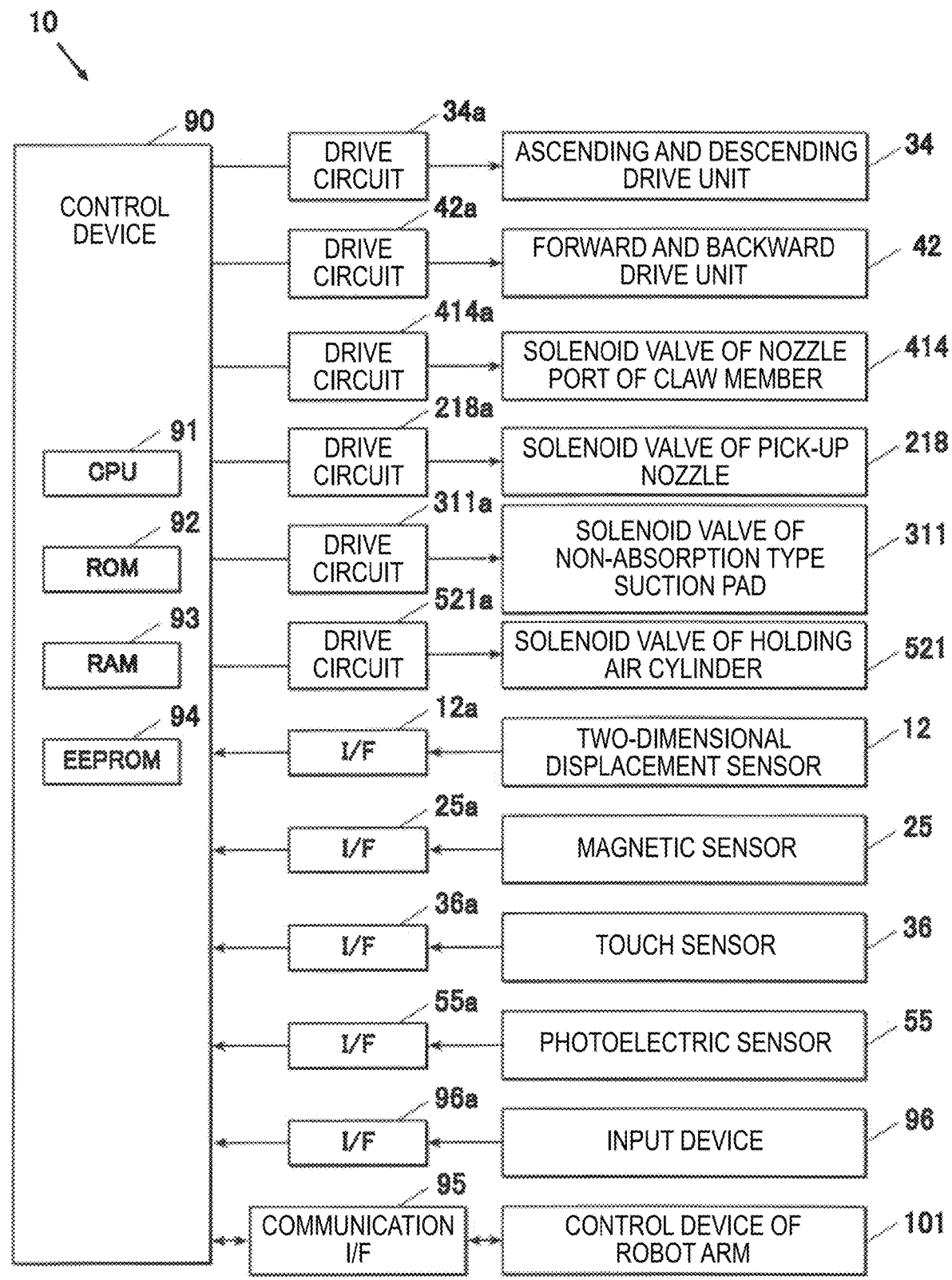
FIG. 11 is a block diagram illustrating a control system of the pick-up device.

The pick-up device 10 includes a nozzle mechanism 20 that pulls up the first workpiece C from the top of the stacked workpieces C by air blowing, a holding mechanism 50 that holds the first workpiece C from the top, a separation mechanism 40 that separates the first workpiece C from the top of the stacked workpieces C, a suction mechanism 30 that draws the first workpiece C from the top of the stacked workpieces C, a base body 11 that supports the nozzle mechanism 20, the suction mechanism 30, the separation mechanism 40, and the holding mechanism 50, and a control device 90 that controls the nozzle mechanism 20, the suction mechanism 30, the separation mechanism 40, and the holding mechanism 50 (refer to FIG. 11).

[Base Body]

The base body 11 includes a top plate 111 located on an upper side of the pick-up device 10 and a front side plate 112 located on a front side thereof, and the top plate 111 and front side plate 112 are integrated to be connected to each other.

A two-dimensional displacement sensor 12 that detects a target such as the workpiece C or the like when a robot arm, which is not illustrated and supports the pick-up device 10, determines a location of the pick-up device 10 is provided on a front surface of the front plate 112.

The two-dimensional displacement sensor 12 has a function of detecting a cross-sectional shape along an X-Z plane with respect to a lower part thereof, and scans and moves the pick-up device 10 along the Y-axis direction, thereby making it possible to detect a three-dimensional shape of the lower part thereof. Accordingly, the two-dimensional displacement sensor 12 functions as a displacement detecting unit that detects a displacement in a stacking direction (the Z-axis direction) on an upper surface of the stacked workpieces C.

[Separation Mechanism]

As illustrated in FIGS. 1 to 4, the separation mechanism 40 includes the claw member 41 having a plate shape for inserting a front end part between the first workpiece C from the top of the plurality of workpieces C stacked in the supply device which is not illustrated and a second workpiece C directly below the first workpiece C, and a forward and backward drive unit 42 that causes the claw member 41 to move forward and backward along the X-axis direction.

The claw member 41 has a plate shape as a whole, and a bottom surface thereof is supported by the forward and backward drive unit 42 in a state parallel to an X-Y plane.

A tip part 411, which is the end part of the front side of the claw member 41, has a sharp shape in which a width thereof in the Y-axis direction decreases toward the front in a plan view. The tip part 411 of the claw member 41 is formed so that an upper surface thereof becomes an inclined surface and a thickness thereof in the Z-axis direction becomes thinner toward the front. Accordingly, it is easy to insert the tip part 411 of the claw member 41 between the stacked workpieces C and the workpiece C.

On a bottom surface of the claw member 41, a groove-shaped air flow path 413 is formed from a center part of the bottom surface to the tip part 411. The flow path 413 opens from the tip part 411 toward the front and serves as a nozzle port 412 that blows air forward. A root portion of the flow path 413 is connected to a positive pressure air supply source such as a fan, a pump, a positive pressure tank, or the like which are not illustrated.

Figure 2:
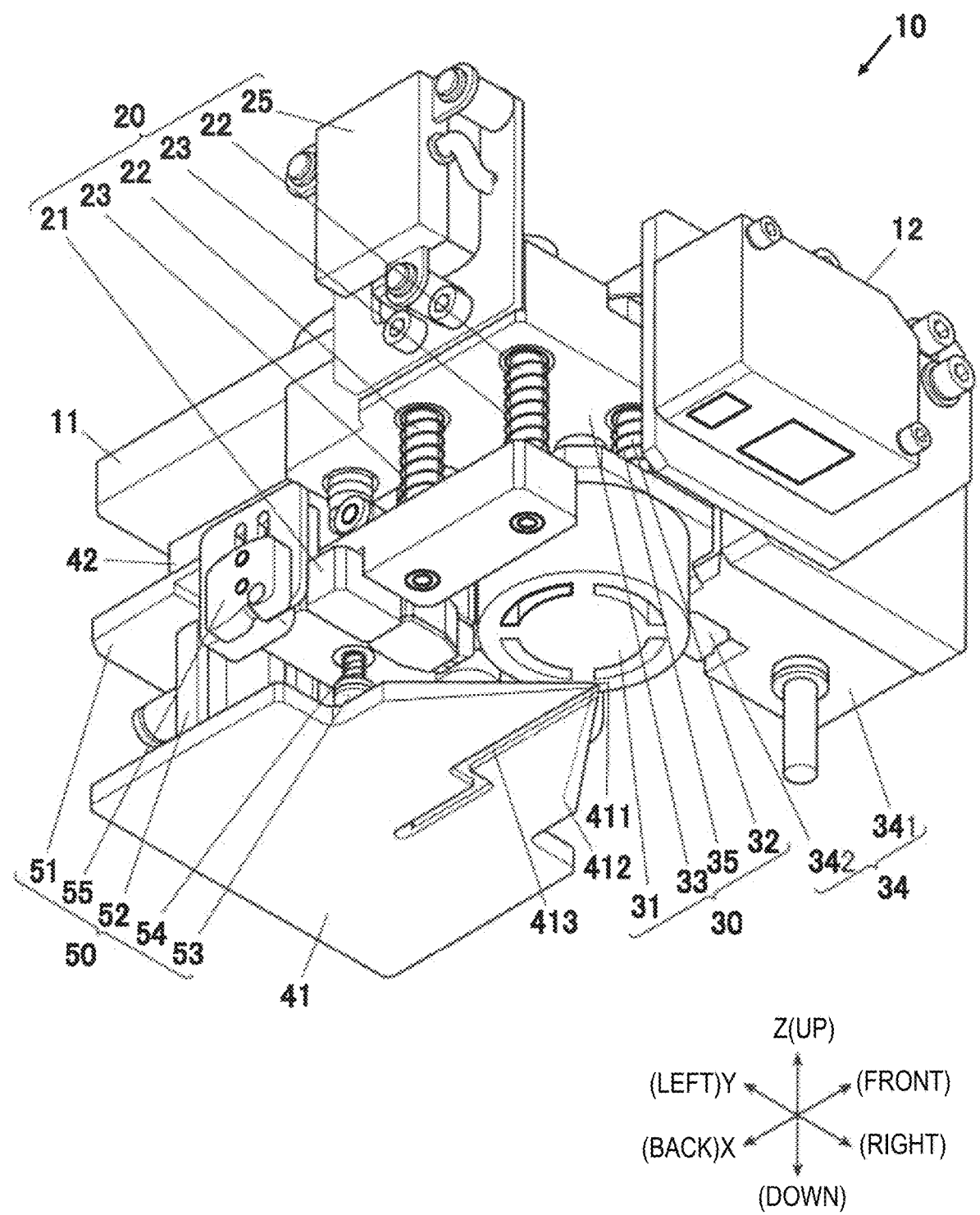
FIG. 2 is a perspective view of the pick-up device viewed from a direction different from that of FIG. 1.
Figure 3:
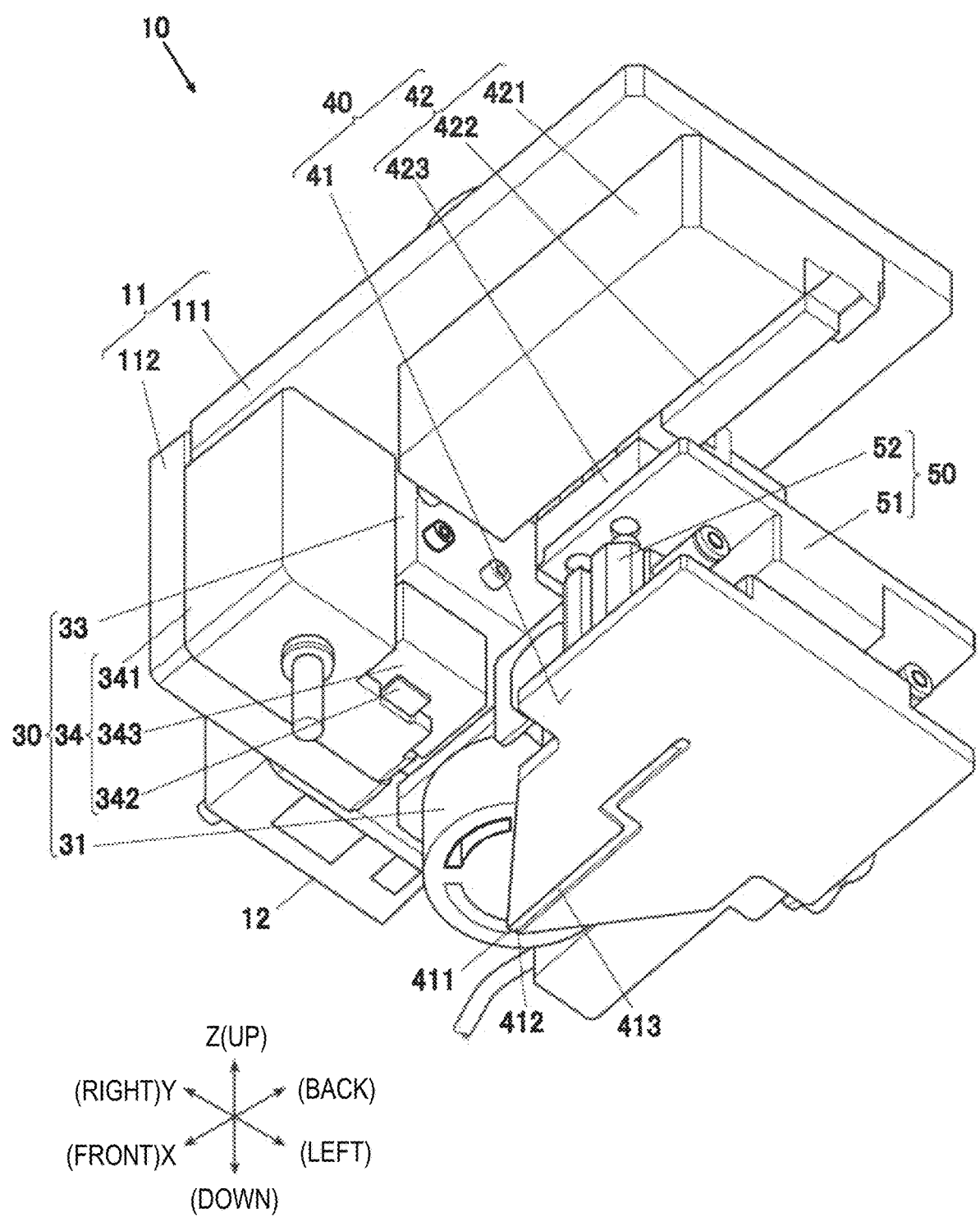
FIG. 3 is a perspective view of the pick-up device viewed from a direction different from that of FIGS. 1 and 2.
Figure 4:
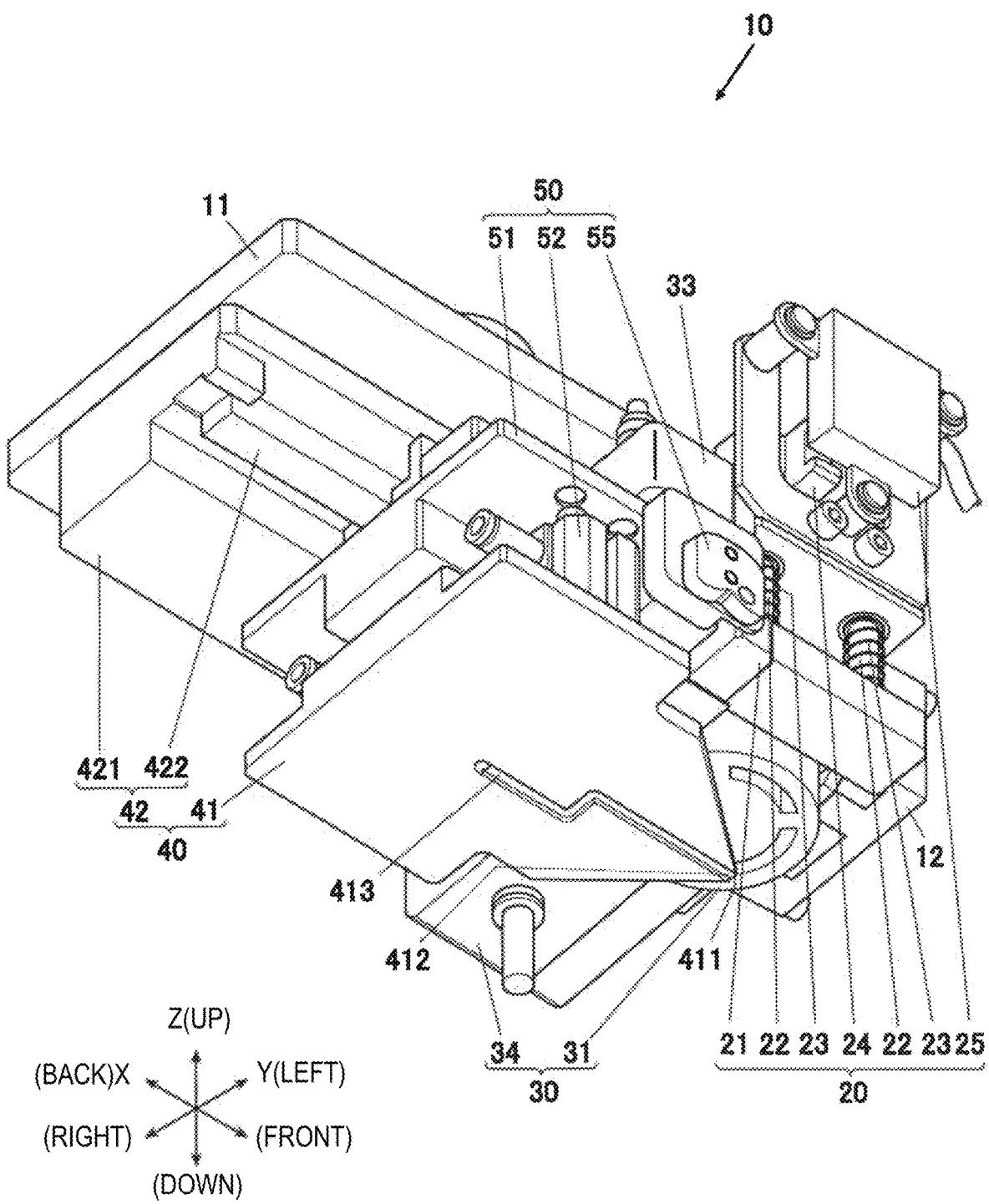
FIG. 4 is a perspective view of the pick-up device viewed from a direction different from that of FIGS. 1 to 3.

The flow path 413 appears to be released downward in FIGS. 2 to 4, and a transparent film is actually attached to the bottom surface of the claw member 41, such that air can be blown only from the nozzle port 412 toward the front.

The forward and backward drive unit 42 is formed of an electric slider, and includes a main body unit 421 including a built-in a linear motion mechanism such as a motor, a ball screw mechanism, or the like serving as a drive source, a slide rail 422 provided on the main body unit 421 along the X-axis direction, and a slide block 423 that slides along the slide rail 422.

The slide block 423 is supported on the slide rail 422 via a linear guide which is not illustrated. The slide block 423 is connected to a ball nut of the main body unit 421 and can be located at any location along the X-axis direction.

The slide block 423 fixedly supports the claw member 41 in a suspended state by two columns which are not illustrated along the Z-axis direction. Accordingly, the claw member 41 moves forward and backward along the X-axis direction while maintaining a constant distance with respect to the slide block 423 in the Z-axis direction.

[Holding Mechanism]

Figure 5:
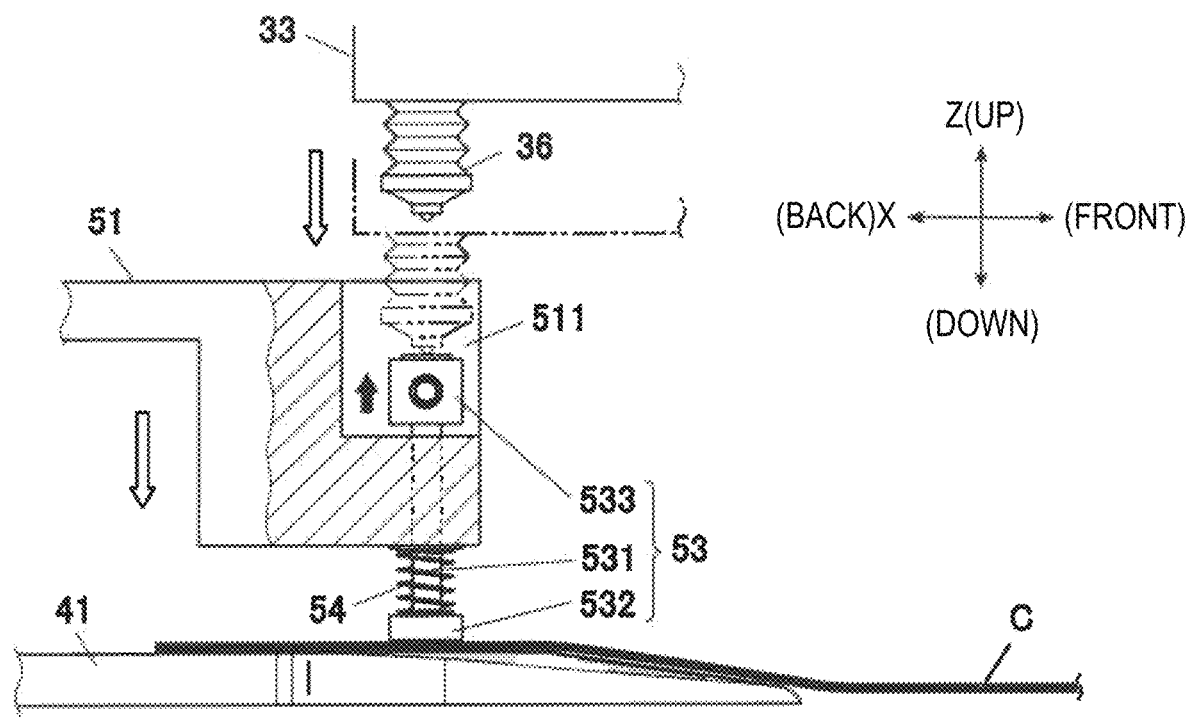
FIG. 5 is a side view of a holding mechanism partially cut out and viewed from the left.

FIG. 5 is a side view of the holding mechanism 50 partially cut out and viewed from the left.

The holding mechanism 50 is attached to an upper surface of the claw member 41, and moves forward and backward along the X-axis direction together with the claw member 41.

As illustrated in FIGS. 1 to 5, the holding mechanism 50 includes a holding block 51 supported so as to be able to move up and down along the Z-axis direction with respect to the claw member 41, a holding air cylinder 52 serving as a drive source for giving the holding block 51 an ascending and descending operation, a gripping member 53 that grips, from the top, the workpiece C placed on the upper surface of the claw member 41 when the holding block is lowered, and a photoelectric sensors 55 provided on left and right end parts of the holding block 51.

The holding block 51 is penetrated by the two columns that support the claw member 41, and is supported so as to be vertically movable along the columns. The two columns are provided with a pressing spring that constantly presses the holding block 51 downward.

One holding air cylinder 52 is provided on each of the left and right sides of the upper surface of the claw member 41, and the holding block 51 can be pushed upward against the above-described pressing spring.

The gripping member 53 is movably supported by the holding block 51 along the Z-axis direction. The gripping member 53 includes a shaft unit 531 penetrating the holding block 51 along the Z-axis direction, a substantially disk-shaped contact unit 532, which is fixedly provided at a lower end part of the shaft unit 531 and has an outer diameter larger than that of the shaft unit 531, and a substantially cylindrical head unit 533 that is fixedly provided at an upper end part of the shaft unit 531 and has an outer diameter larger than that of the shaft unit 531.

The contact unit 532 of the gripping member 53 is provided in a state of protruding downward further than a bottom surface of the holding block 51, and a pressing spring 54 for pressing downward the gripping member 53 is provided between the contact unit 532 and the holding block 51.

Accordingly, when the holding block 51 is lowered, the contact unit 532 of the gripping member 53 contacts the workpiece C on the upper surface of the claw member 41 and the workpiece C can be gripped by a spring pressure of the pressing spring 54.

The head unit 533 of the gripping member 53 is disposed in a recessed part 511 in which an upper part and a front part of the holding block 51 are open, and a touch sensor 36, which will be described later, can contact an upper end part of the head unit 533 from above. That is, when the holding block 51 is lowered and the contact unit 532 of the gripping member 53 grips the workpiece C on the upper surface of the claw member 41, the gripping member 53 is in a state of being relatively pushed up with respect to the holding block 51. At this time, the touch sensor 36 contacts the gripping member 53 from above, and a height of the touch sensor 36 at the time of contacting the gripping member 53 is detected, such that the control device 90 detects a thickness of the workpiece C gripped between the claw member 41 and the contact unit 532, and determines whether or not appropriate gripping is performed.

The two photoelectric sensors 55, which are individually provided on the left and right sides of the holding block 51, are both disposed downward in the Z-axis direction. Each photoelectric sensor 55 can emit detection light vertically downward, detect a light intensity of the reflected light, and determine presence or absence of the workpiece C on the upper surface of the claw member 41.

Figure 6:
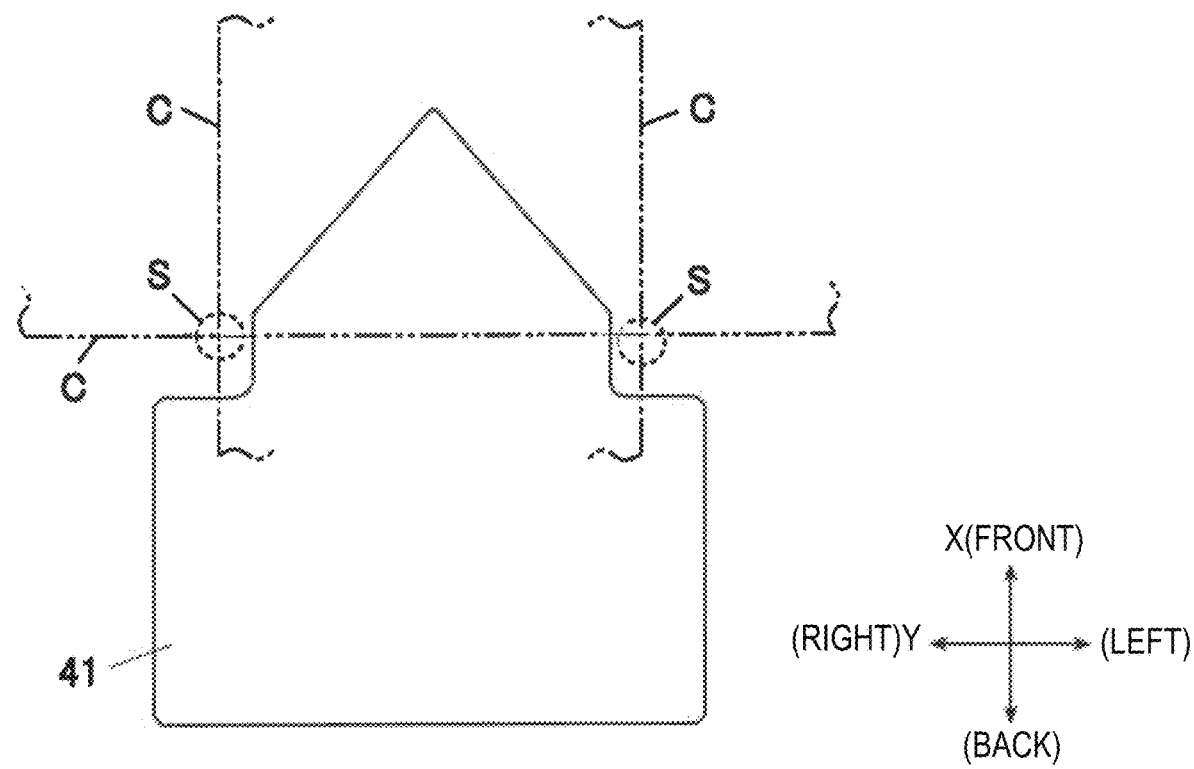
FIG. 6 is an explanatory view illustrating detection locations of two photoelectric sensors with respect to a claw member in a plan view.

FIG. 6 is an explanatory view illustrating detection locations S of the two photoelectric sensors 55 with respect to the claw member 41 in a plan view.

The two photoelectric sensors 55 detect the location of a front end part of the workpiece C and a left or right end part thereof in a state where the claw member 41 moves forward by the forward and backward drive unit 42 and the workpiece C relatively enters between the claw member 41 and the gripping member 53.

That is, since it is required to grip the workpiece C at an appropriate location after the claw member 41 moves forward by the forward and backward drive unit 42, the photoelectric sensor 55 detects the end part of the workpiece C, and the robot arm determines a location for a gripping location of the workpiece C.

More specifically, the robot arm moves the pick-up device 10 forward, such that a rear end part of the workpiece C moves relatively backward to reach the detection locations S of the two photoelectric sensors 55. By detecting a change in presence or absence of the rear end part of the workpiece C at that time, the rear end part of the workpiece C can be located at the detection location S. At that time, since the detection is performed at two points, the rear end part of the workpiece C can be located in a direction that is not inclined with respect to left and right directions.

If necessary, after determining the location of the rear end part of the workpiece C, the robot arm moves the pick-up device 10 in any one of the left and right directions to detect the presence or absence of the left end part or the right end part of the workpiece C by any one of the photoelectric sensors 55 on the left and right sides, such that the end part of the workpiece C in the left direction or right direction can be located at the detection location S.

[Suction Mechanism]

Figure 7:
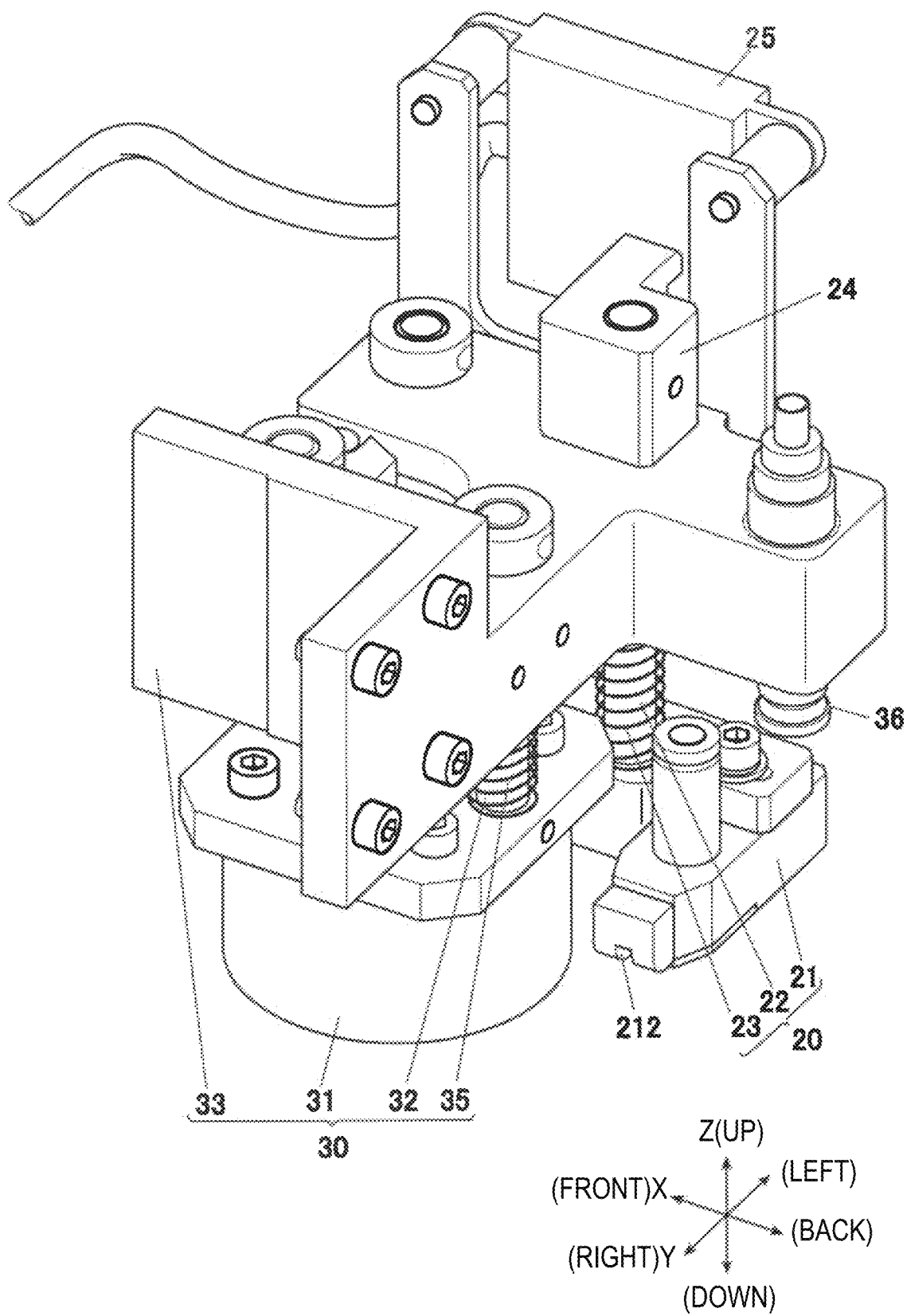
FIG. 7 is a perspective view of a configuration around an ascending and descending block.

FIG. 7 is a perspective view of a configuration around an ascending and descending block 33 which will be described later.

As illustrated in FIGS. 1 to 7, the suction mechanism 30 includes a non-absorption type suction pad 31 that sucks the first workpiece C from the top, the ascending and descending block 33 that supports the non-absorption type suction pad 31 so as to be able to move forward along the Z-axis direction via a plurality of support shafts 32, and an ascending and descending drive unit 34 that moves the ascending and descending block 33 along the Z-axis direction.

The non-absorption type suction pad 31 includes a circular opening formed on a bottom surface thereof, which is a surface opposite to the side of the workpiece C, and air is discharged downward from the circular opening.

The non-absorption type suction pad 31 is connected to a fan, a pump, a positive pressure tank, or the like to supply positive pressure air.

Accordingly, when the air is blown from the circular opening to the workpiece C, the air is blown outward in a radial direction because an air escape path is not provided on a center part side of the circular opening. Accordingly, according to Bernoulli's principle, a low pressure area is generated in a center part of the bottom surface of the non-absorption type suction pad 31.

Therefore, when the bottom surface of the non-absorption type suction pad 31 approaches the workpiece C to some extent without contacting the workpiece C, the workpiece C can be picked up in a non-contact absorption state.

While the embodiment describes an example in which the air is discharged from the opening of the non-absorption type suction pad 31 in a direction perpendicular to the bottom surface (the side of the workpiece C), an air discharge direction may be inclined outward in the radial direction of the circular opening.

The ascending and descending drive unit 34 is formed of an electric slider, and includes a main body unit 341 including a built-in linear motion mechanism such as a motor, a ball screw mechanism, or the like serving as a drive source, a slide rail 342 provided on the main body unit 341 along the Z-axis direction, and a slide block 343 sliding along the slide rail 342.

The slide block 343 is supported on the slide rail 342 via a linear guide which is not illustrated. The slide block 343 is connected to a ball nut of the main body unit 341 and can be located at any location along the Z-axis direction.

The ascending and descending block 33 is connected to and supported by the slide block 343 of the ascending and descending drive unit 34, and an ascending and descending operation is freely and selectively performed along the Z-axis direction.

The ascending and descending block 33 suspends and supports the non-absorption type suction pad 31 via a plurality of support shafts 32 that penetrates the ascending and descending block 33 along the Z-axis direction and can slide along the Z-axis direction.

Each support shaft 32 is provided with a stopper with respect to the ascending and descending block 33 at an upper end part thereof, and a lower end part thereof is fixedly connected to an upper surface of the non-absorption type suction pad 31. In each support shaft 32, a pressing spring 35 is disposed between the ascending and descending block 33 and the non-absorption type suction pad 31, and the non-absorption type suction pad 31 is always pressed downward against the ascending and descending block 33.

The touch sensor 36 directed downward is provided on a bottom surface of the ascending and descending block 33, that is, provided at a location directly above the gripping member 53 when the gripping member 53 grips the workpiece C on the claw member 41.

When the workpiece C exists on the upper surface of the claw member 41 at the time of lowering the holding block 51, the gripping member 53 rises with respect to the holding block 51 by a thickness of the workpiece C.

When the ascending and descending block 33 is lowered in this state, it can be detected that the touch sensor 36 contacts the upper end part of the head unit 533 of the gripping member 53.

Therefore, when the ascending and descending block 33 is lowered, the touch sensor 36 monitors the detection of contact with the gripping member 53, and the number of operation pulses of an actuator which is a drive source of the ascending and descending drive unit 34 at the time of contact detection is counted, thereby making it possible to detect a location of the gripping member 53 with respect to the claw member 41 in the Z-axis direction.

The location of the gripping member 53 with respect to the claw member 41 in the Z-axis direction corresponds to the thickness of the workpiece C on the upper surface of the claw member 41 along the Z-axis direction, and the touch sensor 36 functions as a thickness detecting unit.

Figure 8:
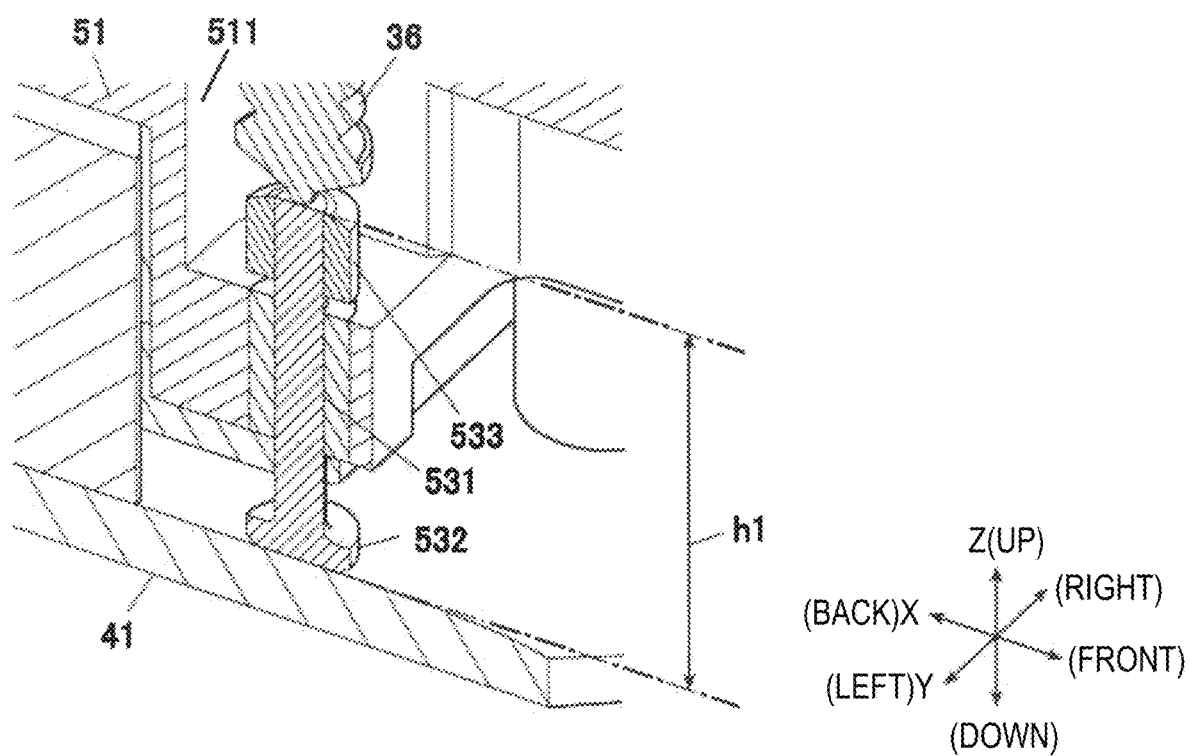
FIG. 8 is a perspective view of a configuration around a gripping member in a state where a workpiece does not exist on the claw member.
Figure 9:
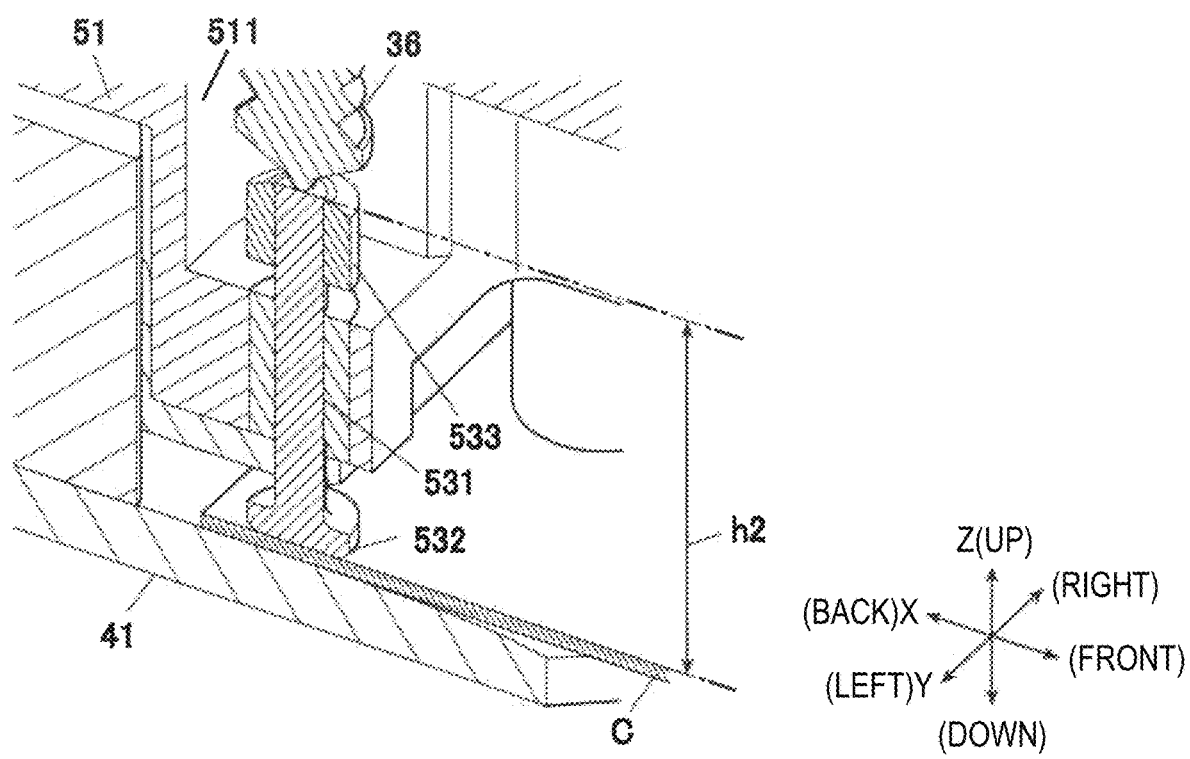
FIG. 9 is a perspective view of the configuration around the gripping member in a state where the workpiece exists on the claw member.

Specifically, when the workpiece C does not exist on the upper surface of the claw member 41, the control device 90 stores in advance the number of counts when the touch sensor 36 detects the contact with the gripping member 53 as a height h1 of the gripping member 53 (refer to FIG. 8), and when the gripping member 53 grips the workpiece C, the control device 90 obtains a height h2 of the gripping member 53 (refer to FIG. 9) from the number of counts when the touch sensor 36 detects the contact with the gripping member 53. After that, the control device 90 obtains a difference between h2 and h1, and calculates an amount of lift of the gripping member 53.

Next, the control device 90 functions as a determination unit that determines whether or not the workpiece C is appropriately gripped based on the amount of lift of the gripping member 53. For example, when the amount of lift is too small, the control device 90 determines that the workpiece C is not gripped, and when the amount of lift is excessive, the control device 90 determines that two or more sheets of the workpieces C are gripped, thereby making it possible to determine a gripping error.

[Nozzle Mechanism]

Figure 10:
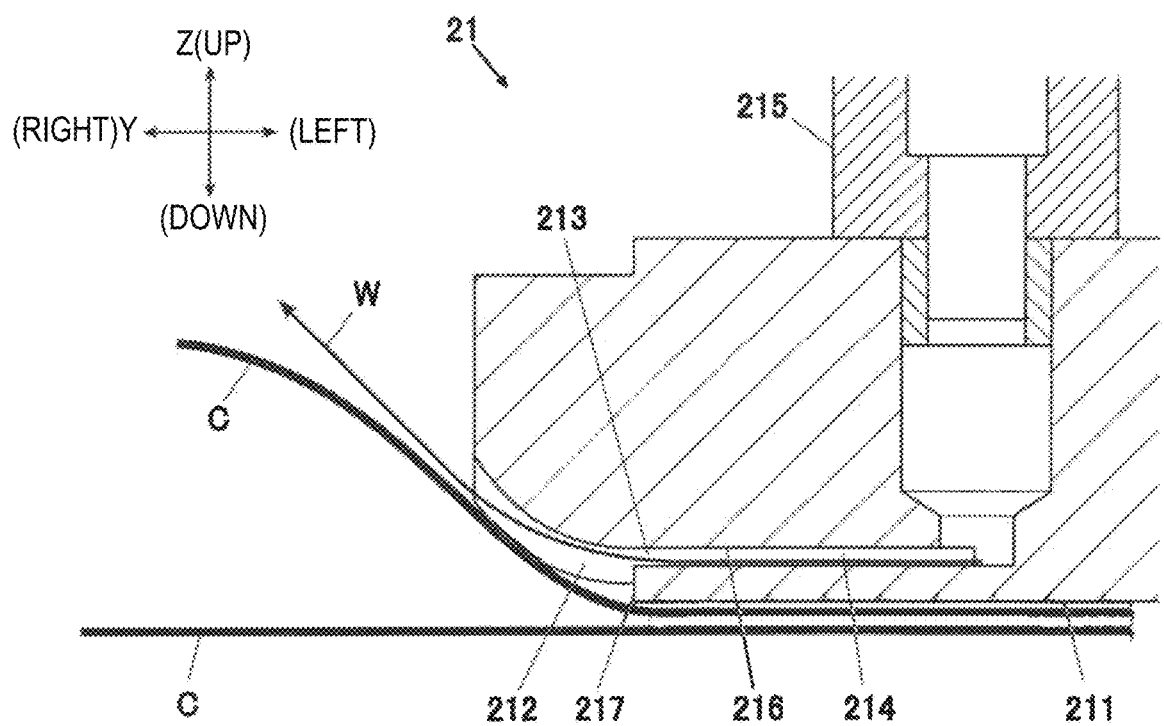
FIG. 10 is a cross-sectional view taken along a perpendicular vertical direction of a pick-up nozzle.

FIG. 10 is a cross-sectional view taken along a Y-Z plane of a pick-up nozzle 21 which will be described later.

As illustrated in FIGS. 1 to 4, 7, and 10, the nozzle mechanism 20 includes the pick-up nozzle 21 that pulls the first workpiece C from the top upward, and a plurality of support shafts 22 that allow the pick-up nozzle 21 to move forward along the Z-axis direction with respect to the ascending and descending block 33. The ascending and descending block 33 that supports the pick-up nozzle 21 so as to be able to move up and down, and the ascending and descending drive unit 34 that gives the pick-up nozzle 21 an ascending and descending operation are shared with the suction mechanism 30. Therefore, the ascending and descending block 33 and the ascending and descending drive unit 34 can also be referred to as an ascending and descending block and an ascending and descending drive unit of the nozzle mechanism 20.

As illustrated in FIG. 10, the pick-up nozzle 21 includes a ventilation groove 212 provided on a bottom surface 211 opposite to an upper surface of the first workpiece C from the top and passing through to a right end part in the Y-axis direction which is an air blowing side end part, a nozzle port 213 that blows air to the right side along an inside of the ventilation groove 212, and a supply pipe 215 that supplies air to an air flow path 214 leading to the nozzle port 213.

The supply pipe 215 is a tubular body along the Z-axis direction, and is provided on an upper part of the pick-up nozzle 21. An upper end part of the supply pipe 215 is connected to a fan, a pump, a positive pressure tank, or the like to supply positive pressure air.

The air flow path 214 leading to the nozzle port 213 is formed along the Y-axis direction, and a left end part thereof is connected to a flow path provided in the supply pipe 215.

Accordingly, air supplied from the outside of the pick-up nozzle 21 is discharged to the right from the nozzle port 213.

The ventilation groove 212 is a groove that is open downward on the bottom surface 211, and is formed along the Y-axis direction on an extension line of the flow path 214.

The bottom surface 211 of the pick-up nozzle 21 and a groove inner bottom surface 216 of the ventilation groove 212 are formed to be a horizontal plane parallel to the X-Y plane except the right end part which is the air blowing side end part. On the other hand, the right end part of the bottom surface 211 and the groove inner bottom surface 216 is directed in a direction (upward) of being separated from the workpiece C to some extent. More specifically, the right end part of the bottom surface 211 and the groove inner bottom surface 216 is formed in a curved surface shape in which an inclination thereof gradually increases upward toward the right.

The right end part of the bottom surface 211 of the pick-up nozzle 21 is separated from the workpiece C upward further than other portions of the bottom surface 211 by a step 217.

In the pick-up nozzle 21, according to the above-described structure, when air is discharged to the right from the nozzle port 213 into the ventilation groove 212, Coanda effect causes the air to travel in the ventilation groove 212 along the groove inner bottom surface 216 as shown by an arrow W, and then the air is discharged diagonally upward to the right from the right end part thereof. As a result, a lower side of the right end part of the ventilation groove 212 becomes a negative pressure state, such that the workpiece C can be pulled along the right end part of the bottom surface 211.

While the non-absorption type suction pad 31 also has a configuration in which a negative pressure is formed to suck the workpiece C, the non-absorption type suction pad 31 has a structure in which air is blown out in all directions of the outer periphery. On the other hand, since the pick-up nozzle 21 has a structure in which air is discharged in a certain direction (to the right), the pick-up nozzle 21 is disposed close to the upper surface of the workpiece C, and the air blowing side end part of the pick-up nozzle 21 is disposed near the end part of the workpiece C, thereby making it possible to pull the end part of the workpiece C so as to locally turn up the end part thereof upward.

According to the above-described structure, the pick-up nozzle 21 can cause the first workpiece C from the top to be turned up so that the first workpiece C from the top is locally and gradually separated from the second workpiece C, thereby making it possible to prevent the second workpiece C from being pulled together with the first workpiece C while the second workpiece C is in close contact with the first workpiece C.

The groove inner bottom surface 216 of the ventilation groove 212 of the pick-up nozzle 21 may be formed with one inclined surface of which right end part is inclined upward, or may be formed with a plurality of inclined surfaces of which an inclination angle at the right end part increases upward toward the right side.

The plurality of support shafts 22 penetrate the ascending and descending block 33 along the Z-axis direction, and can slide along the Z-axis direction with respect to the ascending and descending block 33. Each support shaft 22 is provided with a stopper with respect to the ascending and descending block 33 at an upper end part thereof, and a lower end part thereof is fixedly connected to an upper surface of the pick-up nozzle 21. In each support shaft 22, a pressing spring 23 is disposed between the ascending and descending block 33 and the pick-up nozzle 21, and the pick-up nozzle 21 is always pressed downward against the ascending and descending block 33.

The bottom surface 211 of the pick-up nozzle 21 in a state of being pushed down to the maximum against the ascending and descending block 33 by the pressing spring 23, and the bottom surface of the non-absorption type suction pad 31 in a state of being pushed down to the maximum against the ascending and descending block 33 by the pressing spring 35 are disposed to be provided at the same location (the same height) in the Z-axis direction.

One of the plurality of support shafts 22 is provided with a permanent magnet 24 at the upper end part thereof, and a magnetic sensor 25 is supported in the ascending and descending block 33 so as to face the permanent magnet 24 in close proximity to the permanent magnet 24. The magnetic sensor 25 can detect a location of the permanent magnet 24 in the Z-axis direction.

Accordingly, the magnetic sensor 25 detects the location of the permanent magnet 24 in the Z-axis direction in a state where the ascending and descending block 33 is lowered to a specified location where at least the bottom surface 211 of the pick-up nozzle 21 contacts the workpiece C existing on the upper surface of the claw member 41, such that the magnetic sensor 25 also functions as a thickness detecting unit that detects the thickness of the workpiece C on the claw member 41.

More specifically, the control device 90 lowers the ascending and descending block 33 to a specified location in a state where the workpiece C does not exist on the upper surface of the claw member 41, and stores in advance a location of the permanent magnet 24 in the Z-axis direction detected by the magnetic sensor 25 as a reference location.

Next, when the workpiece C is picked up, the control device 90 lowers the ascending and descending block 33 to the specified location, and the magnetic sensor 25 detects the location of the permanent magnet 24 in the Z-axis direction, thereby making it possible to obtain the thickness of the workpiece C on the claw member 41 from a difference between the detection location of the permanent magnet 24 and the reference location thereof.

In this case as well, the control device 90 functions as a determination unit for determining whether or not the workpiece C is appropriately gripped from a difference value between the detection location of the permanent magnet 24 and the reference location thereof. For example, when the difference value therebetween is significantly small, the control device 90 can determine that the workpiece C is not gripped, and when the difference value therebetween is significantly large, the control device 90 can determine a gripping error by determining that two or more sheets of the workpieces C are gripped.

[Control Device]

FIG. 11 is a block diagram illustrating a control system of the pick-up device 10.

The control device 90 includes a CPU 91 that performs various arithmetic processes, a ROM 92 that stores a program related to operation control of each configuration described above, a RAM 93 that stores various data related to the process of the CPU 91 in a work area, and an EEPROM 94 serving as a storage unit for recording various setting data or the like. The storage unit is not limited to the EEPROM, and any non-volatile memory or storage device can be used as a substitute.

A drive source of the ascending and descending drive unit 34 of the suction mechanism 30 and a drive source of the forward and backward drive unit 42 of the separation mechanism 40 are respectively connected to the control device 90 via drive circuits 34a and 42a.

Also, a solenoid valve 218 that supplies air to the pick-up nozzle 21, a solenoid valve 311 that supplies air to the non-absorption type suction pad 31, a solenoid valve 414 that supplies air to the nozzle port 412 of the claw member 41, and a solenoid valve 521 that operates the holding air cylinder 52 are respectively connected to the control device 90 via drive circuits 218a, 311a, 414a, and 521a.

The two-dimensional displacement sensor 12, the magnetic sensor 25, the touch sensor 36, and the photoelectric sensor 55 are respectively connected to the control device 90 via interfaces 12a, 25a, 36a, and 55a.

The pick-up device 10 can select and perform first to third pick-up operations which will be described later when picking up the first workpiece C from the top from the supply device. Therefore, an input device 96 for selecting which of the first to third pick-up operations to be executed is connected to the control device 90 via an interface 96a.

The pick-up device 10 picks up the first workpiece C from the top of the stacked workpieces C prepared in the supply device and supplies the first workpiece C to the sewing machine in cooperation with a robot arm serving as a conveyance device that supports the pick-up device 10 and determines a movement location of the pick-up device 10, such that a communication interface 95 for communicating with a control device 101 of the robot arm is attached to the control device 90.

A configuration including the pick-up device 10, the robot arm serving as the conveyance device for conveying the pick-up device 10, and the control device 101 of the robot arm is referred to as a pick-up system.

[First Pick-Up Operation]

As described above, the CPU 91 of the control device 90 controls the pick-up device 10 so as to execute any one of the first to third pick-up operations selected and set by the input device 96 in advance.

Figure 12:
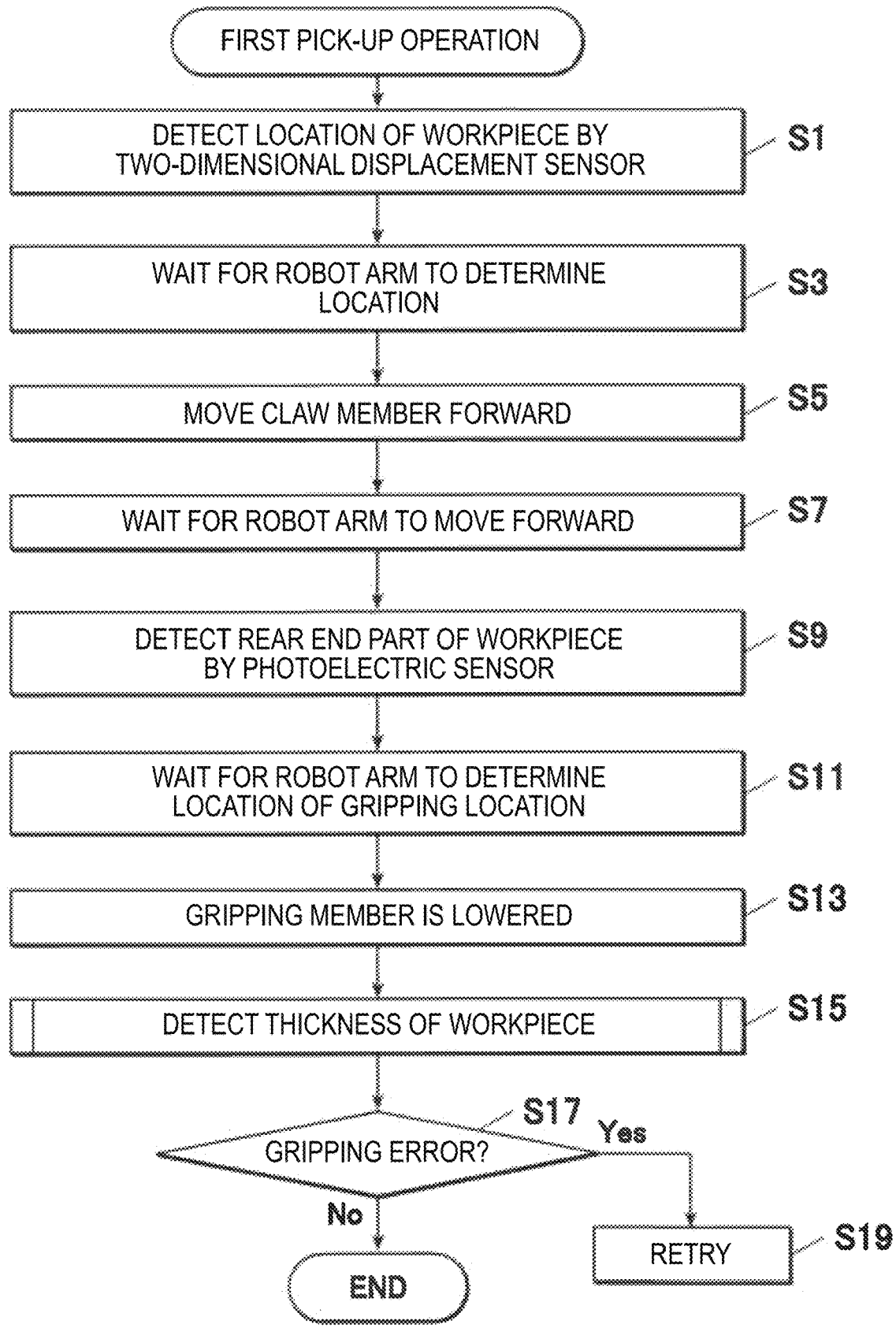
FIG. 12 is a flowchart illustrating control of a first pick-up operation.

Here, operation control of the first pick-up operation will be described based on a flowchart of FIG. 12 and operation explanatory views of FIGS. 13 and 14.

In the first pick-up operation, the first workpiece C from the top is picked up only by the separation mechanism 40 without using the nozzle mechanism 20 and the suction mechanism 30. This first pick-up control is desirable when the workpiece C is not a material that causes curl at an end part thereof, and when the workpiece C is not a material that causes the workpieces C to be stuck to each other due to entanglement of fibers because the workpiece C is fiber.

In advance, the robot arm conveys the pick-up device 10 above the front of the workpiece C stacked and disposed. At this time, the robot arm supports the pick-up device 10 so that a placement surface on which the workpieces C are stacked and disposed, and the X-Y plane of the pick-up device 10 are parallel to each other.

Next, the CPU 91 detects a shape and location of the lower stacked workpieces C and a height of the first workpiece C by the two-dimensional displacement sensor 12 and outputs a detected result to the robot arm side (step S1).

Figure 13:
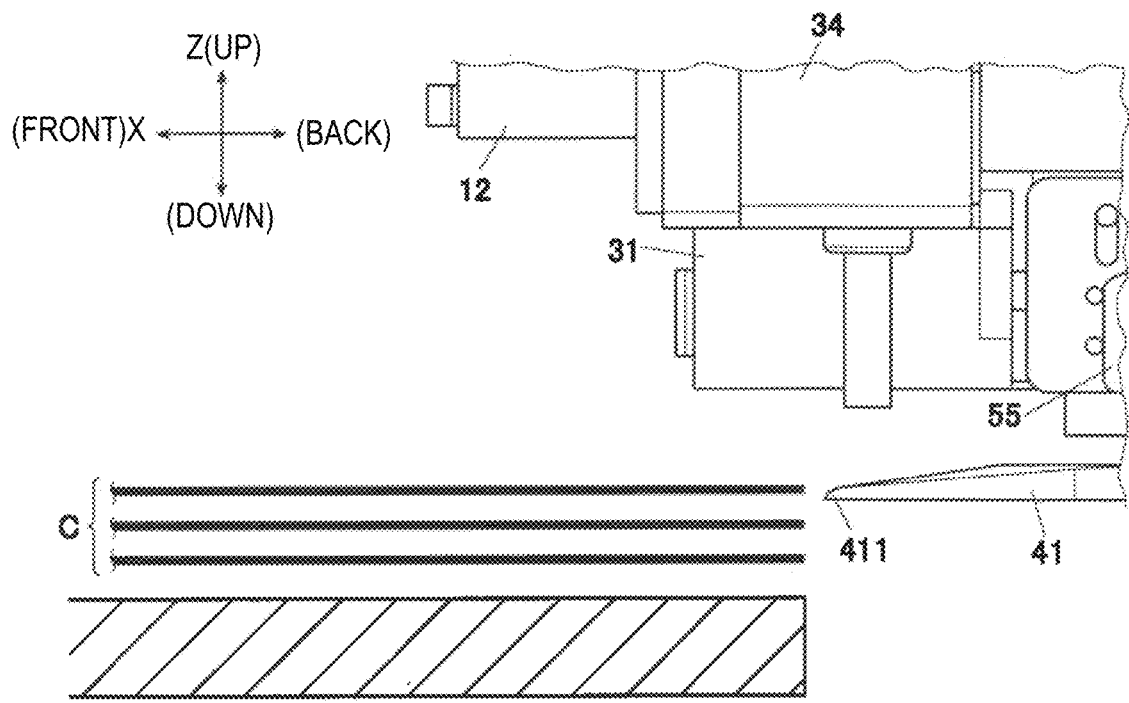
FIG. 13 is an operation explanatory view of the first pick-up operation.

As illustrated in FIG. 13, the robot arm determines, based on the detected result, a location of the pick-up device 10 so that a bottom surface of the claw member 41 becomes a height between the first workpiece C and the second workpiece C, and the tip part 411 faces a rear end part of the stacked workpieces C. The CPU 91 is in a waiting state in which the location determination operation is completed (step S3).

Figure 14:
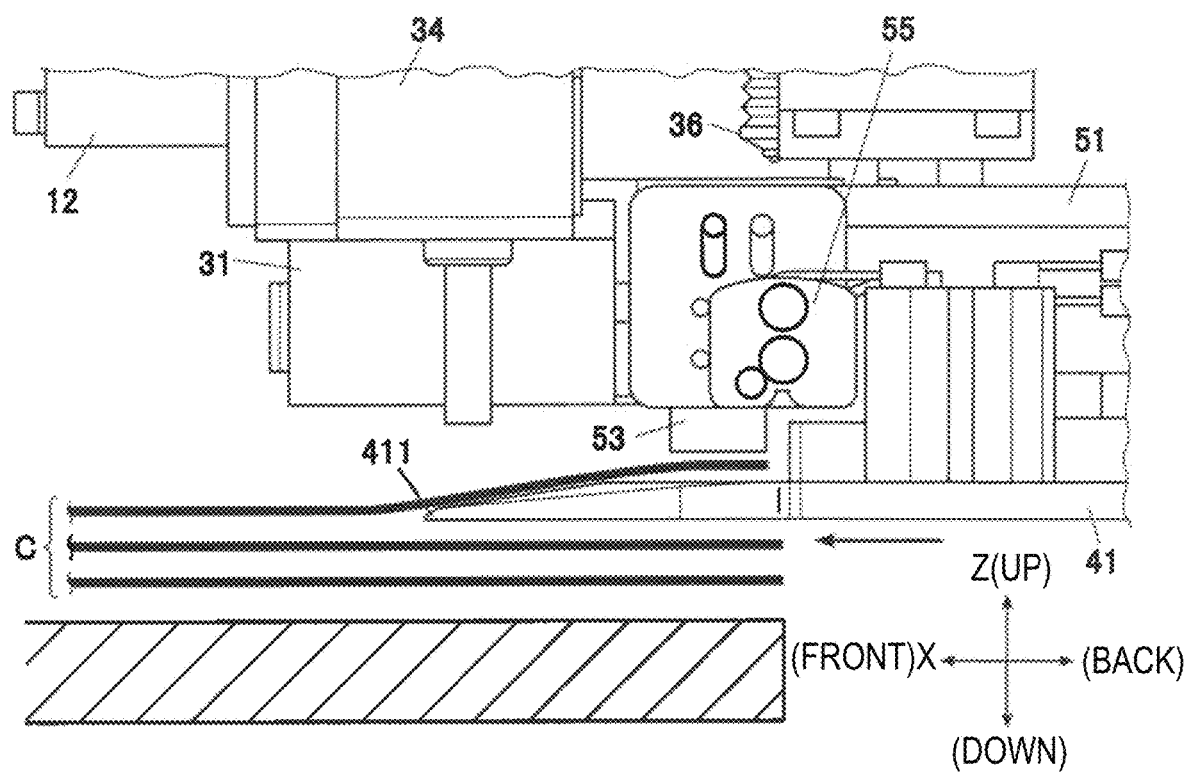
FIG. 14 is an operation explanatory view of the first pick-up operation following FIG. 13.

When the location determination of the robot arm is completed, as illustrated in FIG. 14, the CPU 91 controls the forward and backward drive unit 42 to cause the claw member 41 to move forward (step S5). Accordingly, the tip part 411 of the claw member 41 is inserted between the first workpiece C from the top and the second workpiece C therefrom, such that the first and second workpieces C are separated from each other.

As the claw member 41 moves forward, the robot arm moves the pick-up device 10 forward, such that the CPU 91 waits for the operation of this forward movement (step S7).

When the pick-up device 10 moves forward, the CPU 91 detects the rear end part of the first workpiece C by the two photoelectric sensors 55 (step S9), and when the rear end part thereof is detected, the CPU 91 inputs a stop command to the robot arm (step S11).

When the left end part or right end part of the workpiece C is located at the detection location S, an operation command for movement to the right or movement to the left is input to the robot arm such that the robot arm is stopped at the detection location S.

By detecting the end part of the workpiece C, the workpiece C is located at a relatively appropriate gripping location with respect to the holding mechanism 50.

Next, the CPU 91 operates the holding air cylinder 52 to lower the holding block 51 (step S13). Accordingly, the contact unit 532 of the gripping member 53 presses and contacts, from the top, the workpiece C on the upper surface of the claw member 41, such that the workpiece C is in a state of being gripped.

When a lowering operation of the holding block 51 is performed, the CPU 91 executes a process of detecting a workpiece thickness (step S15), obtains the thickness of the workpiece C between the claw member 41 and the contact unit 532 of the gripping member 53, determines, from a value of the thickness thereof, whether or not a plurality of sheets of the workpieces C are gripped, or whether or not even one sheet of the workpiece C cannot be gripped, and determines occurrence of a gripping error (step S17). The details of the process of detecting the workpiece thickness will be described later.

Next, when the CPU 91 determines that the gripping error occurs, the process returns to step S1 and the first pick-up operation is executed again. When the CPU 91 determines that one sheet of the workpiece C is appropriately gripped, the CPU 91 notifies the robot arm side of the fact that one workpiece is gripped, and ends the operation control of the first pick-up operation.

The robot arm side conveys the pick-up device 10 to the sewing machine, and the pick-up device 10 supplies the gripped workpiece C to a predetermined supply location.

[Process of Detecting Workpiece Thickness]

Figure 15:
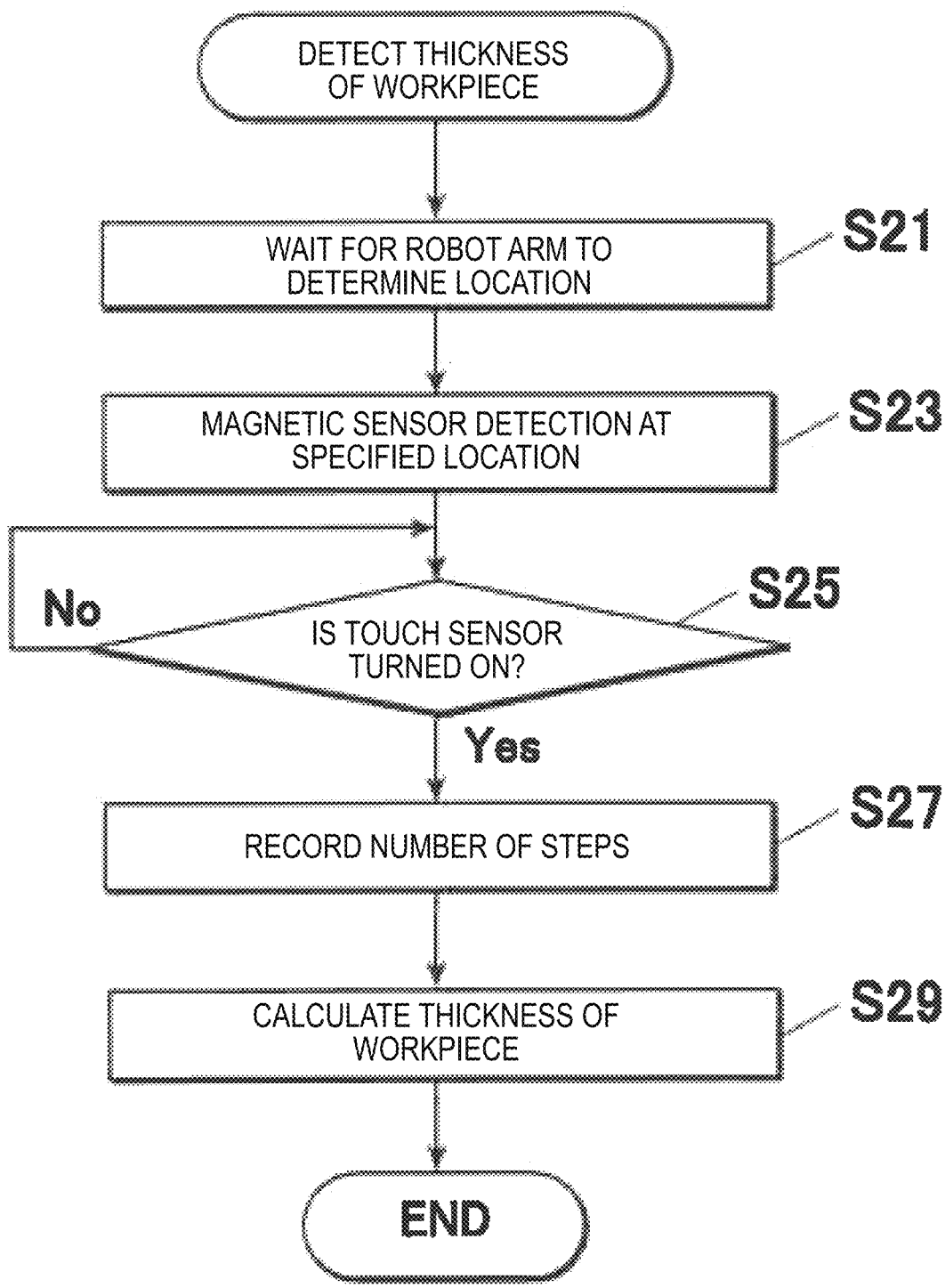
FIG. 15 is a flowchart illustrating a process of detecting a workpiece thickness.

The above-described process of detecting the workpiece thickness will be described with reference to a flowchart of FIG. 15 and operation explanatory views of FIGS. 16 to 19.

Figure 16:
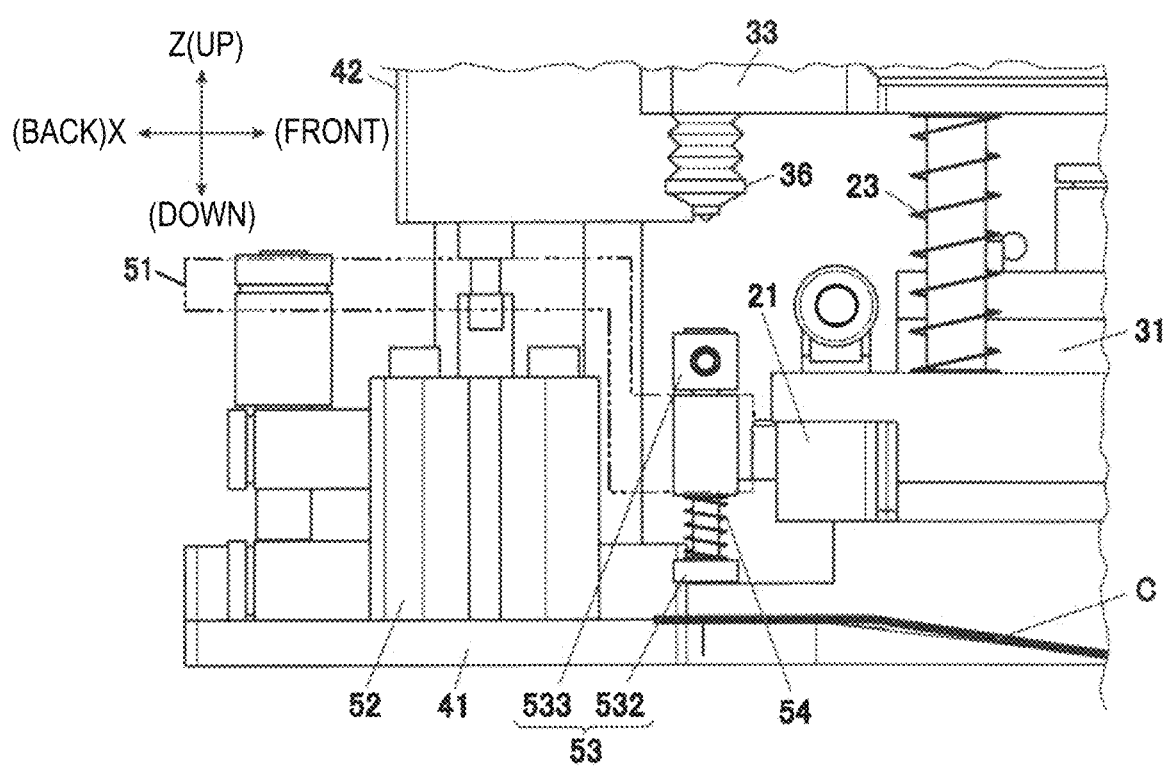
FIG. 16 is an operation explanatory view in the process of detecting the workpiece thickness.

In the process of detecting the workpiece thickness, as illustrated in FIG. 16, the CPU 91 waits for the robot arm to determine a location for an appropriate gripping location, and then operates the holding air cylinder 52 to lower the holding block 51 (step S21).

Figure 17:
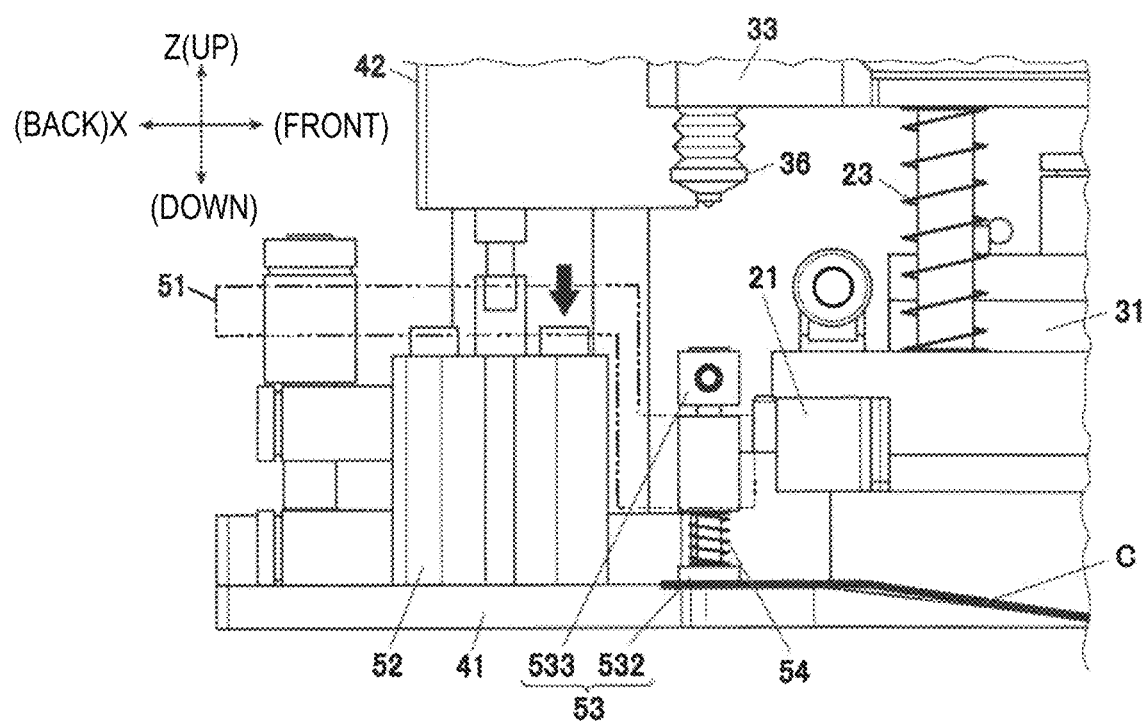
FIG. 17 is an operation explanatory view in the process of detecting the workpiece thickness following FIG. 16.

Accordingly, as illustrated in FIG. 17, the gripping member 53 is in a state of gripping the workpiece C being pressed by the spring pressure of the pressing spring 54, and the gripping member 53 stops at a location separated upward from the upper surface of the claw member 41 by the thickness of the workpiece C.

Next, the CPU 91 controls the ascending and descending drive unit 34 to start lowering the ascending and descending block 33.

Figure 18:
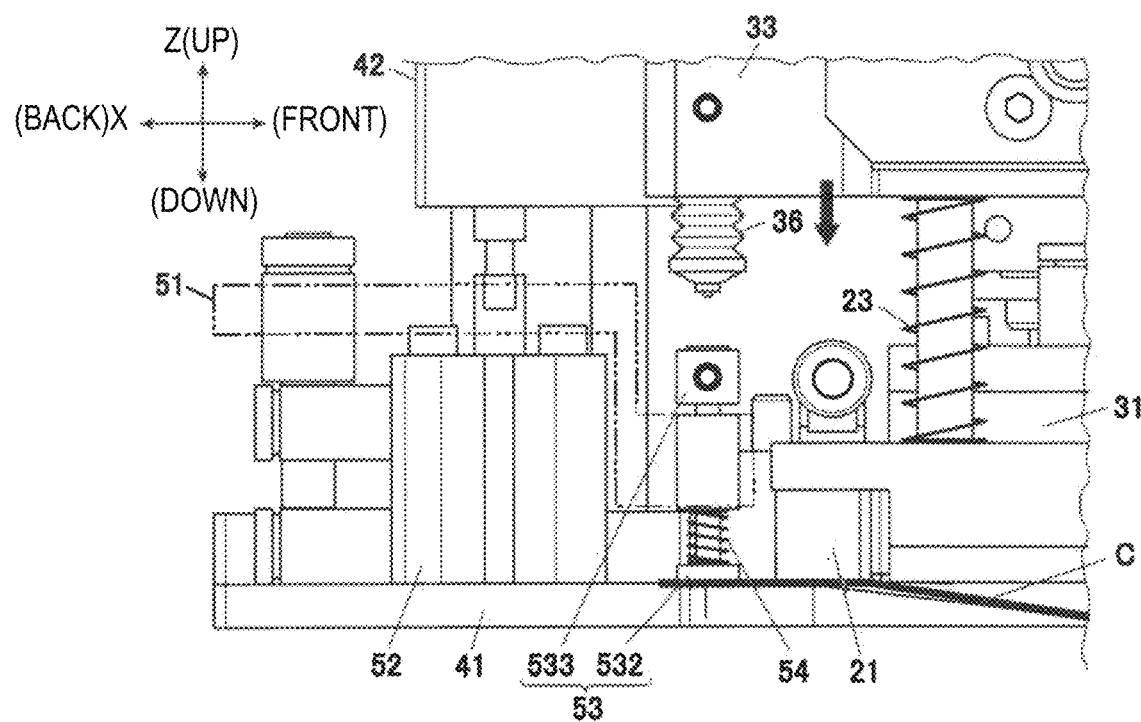
FIG. 18 is an operation explanatory view in the process of detecting the workpiece thickness following FIG. 17.

As the ascending and descending block 33 is lowered, as illustrated in FIG. 18, the pick-up nozzle 21 and the non-absorption type suction pad 31 are also lowered, and a bottom surface thereof reaches the workpiece C. After the bottom surface thereof reaches the workpiece C, the lowering operation of the ascending and descending block 33 is continuously performed, the pressing springs 23 and 35 are compressed, the pick-up nozzle 21 and the non-absorption type suction pad 31 are not lowered, and only the ascending and descending block 33 is lowered. Accordingly, the permanent magnet 24 provided on the support shaft 22 of the pick-up nozzle 21 moves relatively upward with respect to the magnetic sensor 25.

The CPU 91 reads a detection location of the permanent magnet 24 to be detected by the magnetic sensor 25 when the ascending and descending block 33 is lowered to a specified height. The specified height is, for example, a height at which the bottom surface of the pick-up nozzle 21 and the non-absorption type suction pad 31 reaches the upper surface of the claw member 41 when the ascending and descending block 33 is lowered in a state where the workpiece C does not exist.

When the workpiece C exists on the upper surface of the claw member 41, and when the ascending and descending block 33 reaches the specified height, the pick-up nozzle 21 and the non-absorption type suction pad 31 change the locations thereof upward by the thickness of the workpiece C, thereby making it possible to calculate the thickness of the workpiece C on the upper surface of the claw member 41 from a value detected by the magnetic sensor 25 at this time.

Figure 19:
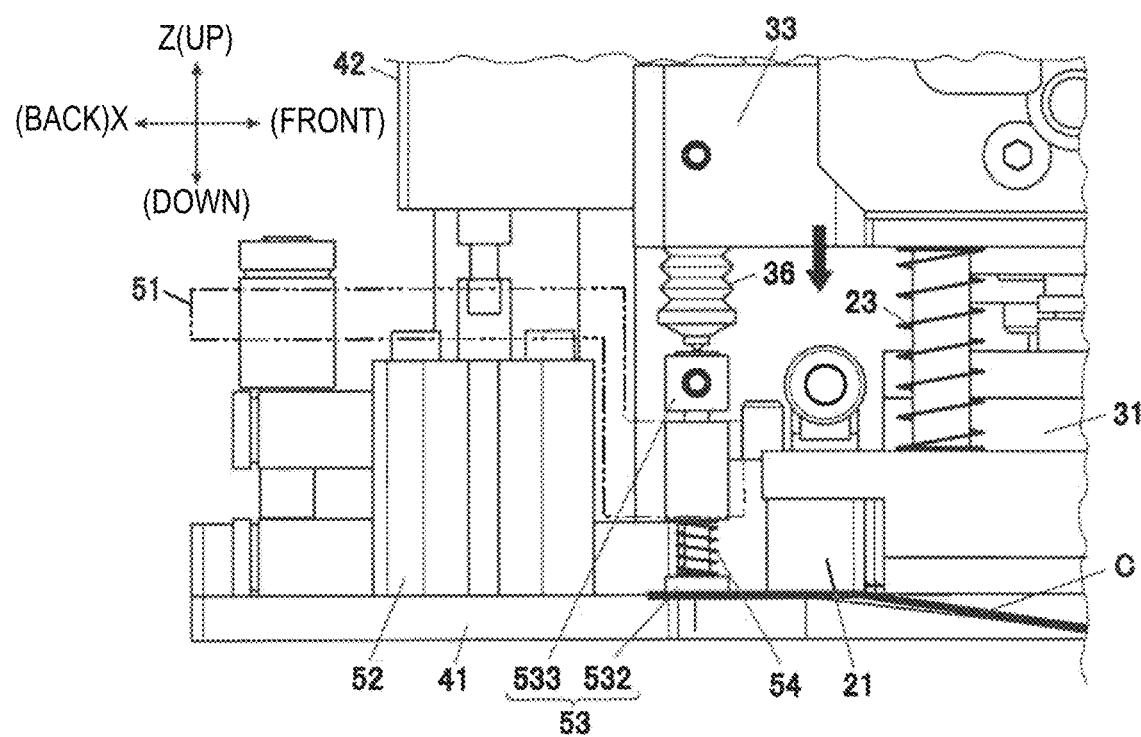
FIG. 19 is an operation explanatory view in the process of detecting the workpiece thickness following FIG. 18.

The CPU 91 continuously performs the lowering operation of the ascending and descending block 33 while monitoring, by the touch sensor 36, a detection state of the contact with the head unit 533 of the gripping member 53 (step S25), and as illustrated in FIG. 19, stops the ascending and descending block 33 when the touch sensor 36 of the ascending and descending block 33 detects the contact with the head unit 533 of the gripping member 53. Next, the number of operation steps of the drive source of the ascending and descending drive unit 34 when the ascending and descending block 33 is stopped is recorded (step S27). Next, the thickness of the workpiece C on the upper surface of the claw member 41 can be calculated from a difference between the recorded number of steps and the number of steps at a pre-measured reference location (the number of steps when the touch sensor 36 detects the contact with the head unit 533 in a state where the workpiece C does not exist) (step S29).

In this manner, in the process of detecting the workpiece thickness, the thickness of the workpiece C is calculated based on the detection of the magnetic sensor 25 and the thickness of the workpiece C is calculated based on the detection of the touch sensor 36, such that the thickness of the workpiece C can be obtained from the two systems.

Therefore, when the CPU 91 determines the gripping error in step S17 described above, the appropriateness of the thickness of the workpiece C may be determined for the thicknesses of the workpiece C respectively detected by the two systems. Next, when both values are appropriate, the CPU 91 may determine that the workpiece C is appropriately gripped, and when either of the values is inappropriate, the CPU 91 may determine that the workpiece C is inappropriately gripped.

[Second Pick-Up Operation]

Figure 20:
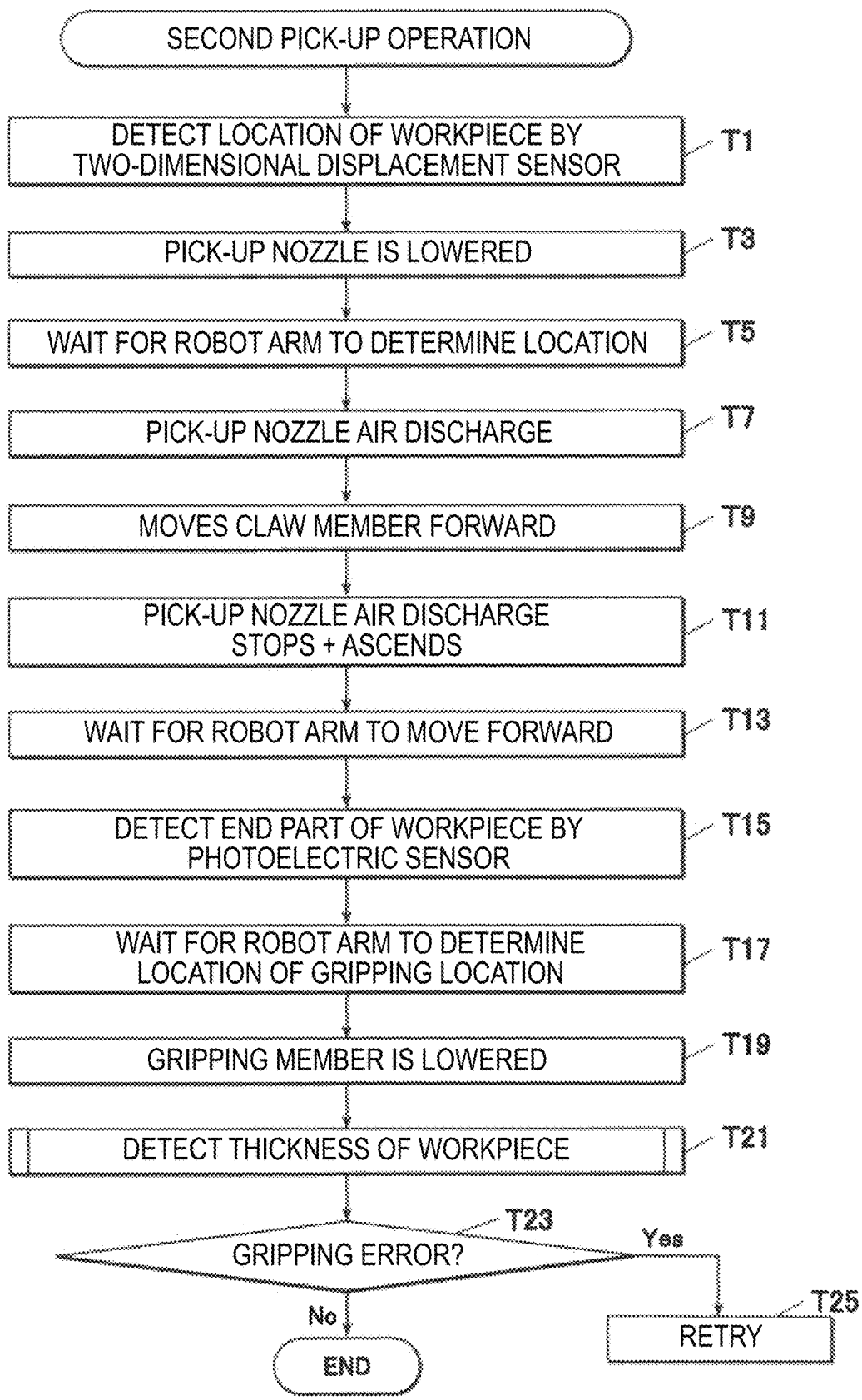
FIG. 20 is a flowchart illustrating control of a second pick-up operation.

Next, operation control of a second pick-up operation will be described with reference to a flowchart of FIG. 20 and operation explanatory views of FIGS. 21 to 25.

In the second pick-up operation, the first workpiece C from the top is picked up by a combination of the nozzle mechanism 20 and the separation mechanism 40 without using the suction mechanism 30. This second pick-up control can also pick up a material in which the workpiece C is curled at an end part thereof, and a material in which the workpieces C are stuck to each other due to fiber entanglement caused by the fibrous workpieces C and other factors.

In advance, the robot arm conveys the pick-up device 10 above the front of the workpiece C stacked and disposed. In this case as well, the robot arm supports the pick-up device 10 so that a placement surface on which the workpieces C are stacked and disposed, and the X-Y plane of the pick-up device 10 are parallel to each other.

Next, the CPU 91 detects a shape and location of the lower stacked workpieces C and a height of the first workpiece C by the two-dimensional displacement sensor 12 and outputs a detected result to the robot arm side (step T1).

Next, the CPU 91 controls the ascending and descending drive unit 34 and lowers the pick-up nozzle 21 to a height at which the bottom surface 211 of the pick-up nozzle 21 is equal to the bottom surface of the claw member 41 (step T3).

Figure 21:
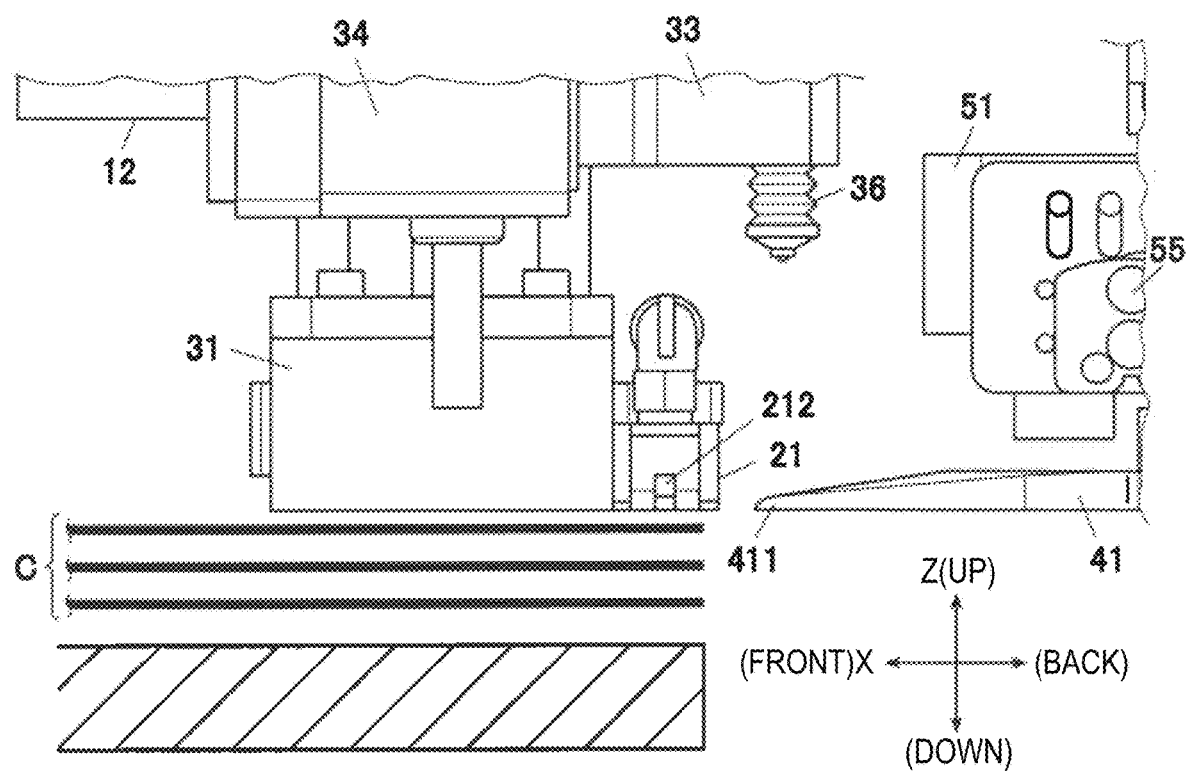
FIG. 21 is an operation explanatory view of the second pick-up operation.

On the other hand, as illustrated in FIG. 21, the robot arm determines, based on the detected result by the two-dimensional displacement sensor 12, a location of the pick-up device 10 so that the bottom surface of the claw member 41 is slightly higher than the upper surface of the first workpiece C, and the tip part 411 faces the rear end part of the stacked workpieces C.

The CPU 91 waits for the robot arm to finish determining the location (step T5).

The pick-up nozzle 21 is disposed directly in front of the retracted claw member 41, such that when the robot arm finishes determining the location, the pick-up nozzle 21 is located above the rear end part of the first workpiece C.

Figure 22:
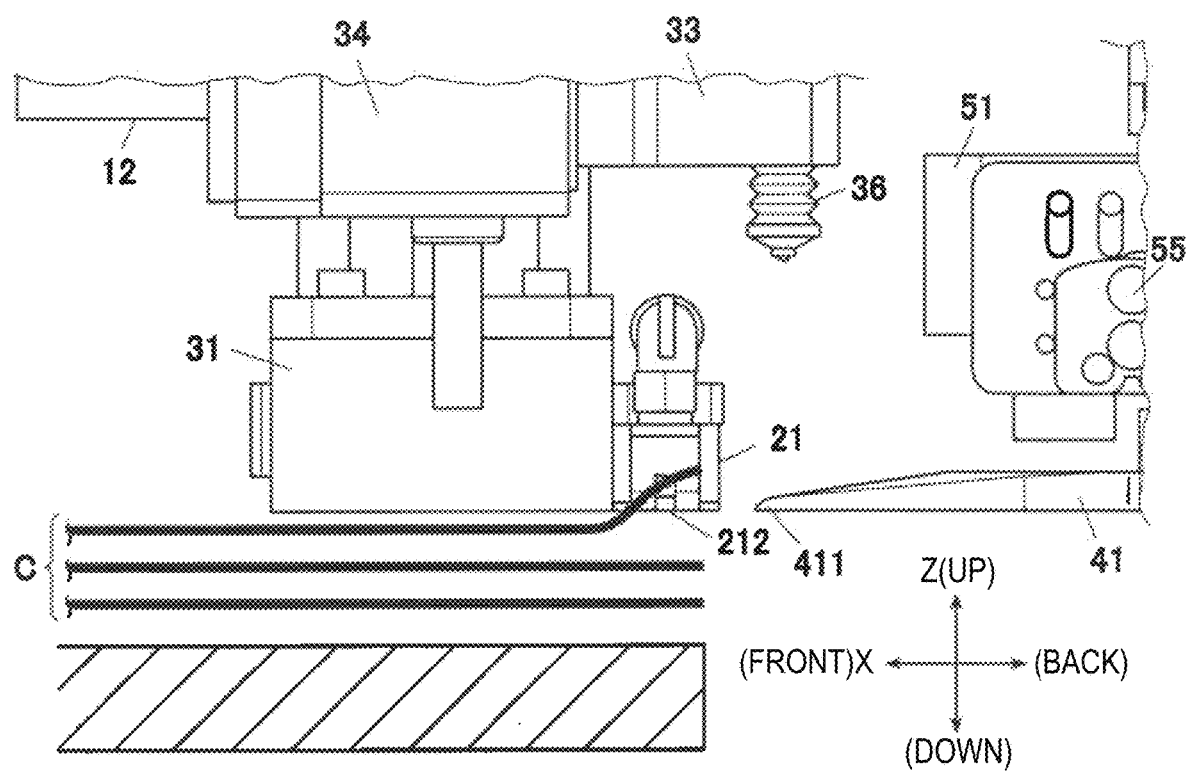
FIG. 22 is an operation explanatory view of the second pick-up operation following FIG. 21.

In this state, the CPU 91 controls the solenoid valve 218 of the pick-up nozzle 21 to set the solenoid valve 218 in an air discharge state (step T7). Next, as illustrated in FIG. 22, the rear end part of the first workpiece C is in a state of being turned up to the air blowing side end part of the pick-up nozzle 21, that is, turned up upward.

Figure 23:
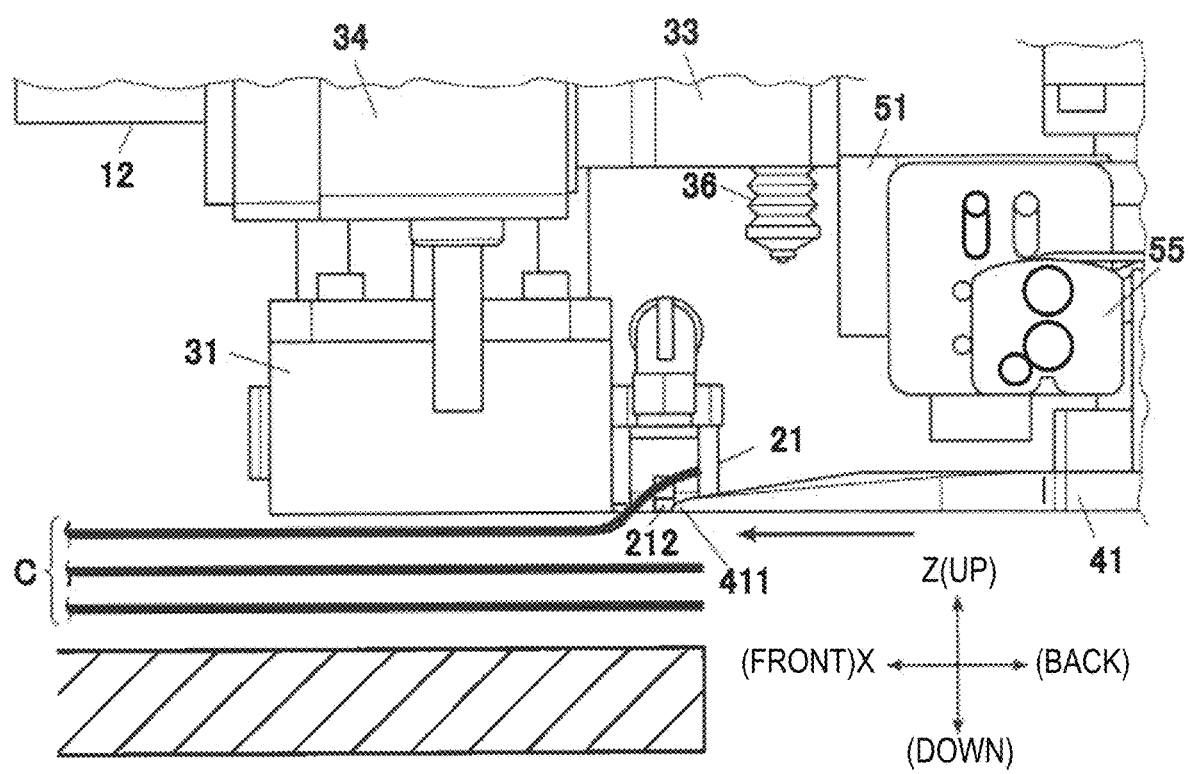
FIG. 23 is an operation explanatory view of the second pick-up operation following FIG. 22.

In this state, as illustrated in FIG. 23, the CPU 91 controls the forward and backward drive unit 42 to start a forward movement of the claw member 41 (step T9).

Figure 24:
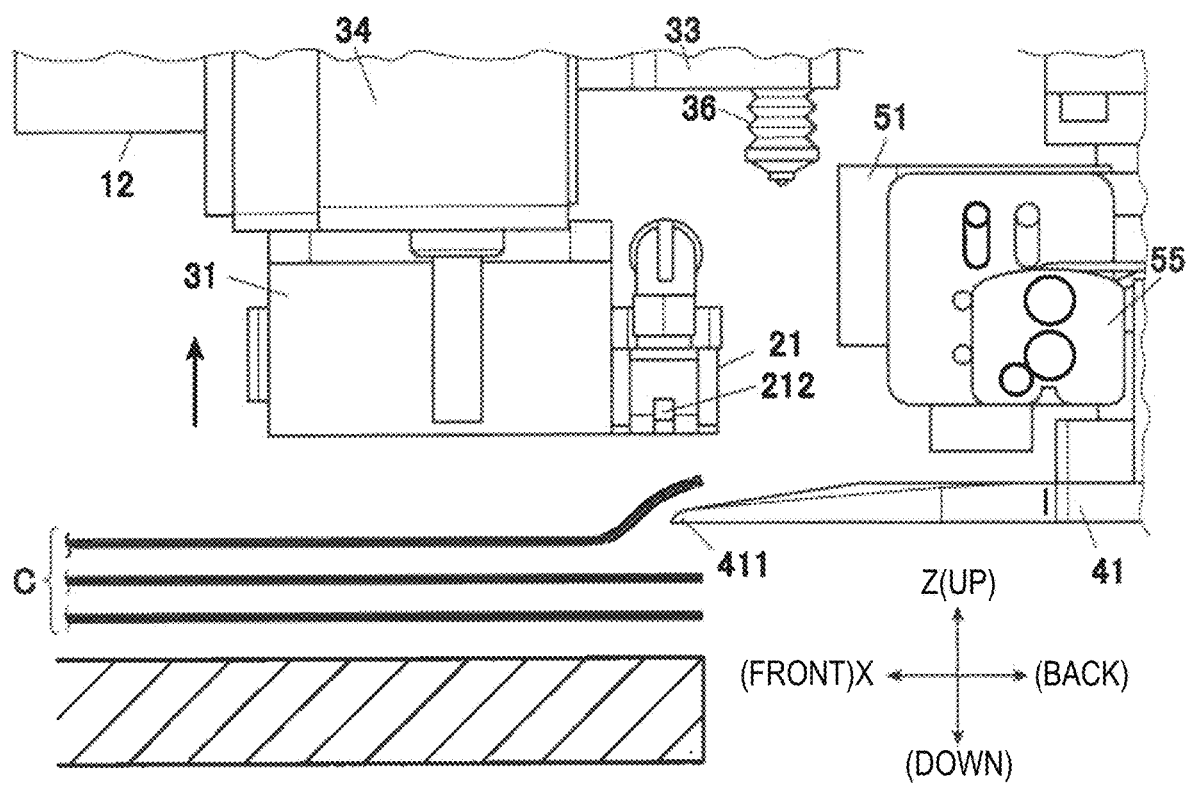
FIG. 24 is an operation explanatory view of the second pick-up operation following FIG. 23.

As illustrated in FIG. 24, the CPU 91 stops the air discharge, and controls the ascending and descending drive unit 34 to cause the pick-up nozzle 21 to move upward, thereby avoiding interference between the pick-up nozzle 21 and the claw member 41 that moves forward (step T11).

Figure 25:
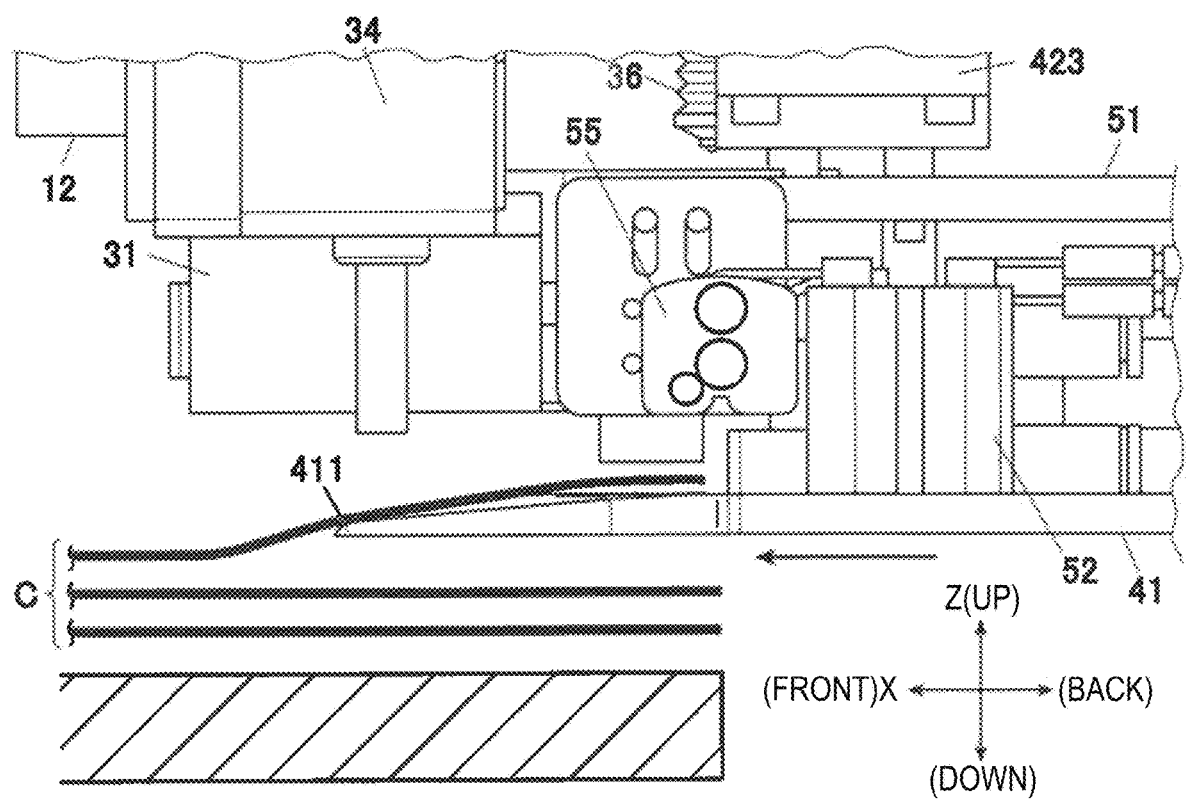
FIG. 25 is an operation explanatory view of the second pick-up operation following FIG. 24.

As illustrated in FIG. 25, the claw member 41 further moves forward, and is inserted between the first workpiece C from the top and the second workpiece C therefrom, such that the first and second workpieces C are separated from each other.

The subsequent processes are the same as steps S7 to S19 of the first pick-up operation.

That is, the CPU 91 waits for the robot arm to perform an operation of the forward movement (step T13), detects an end part location of the first workpiece C by the two photoelectric sensors 55 (step T15), and stops the robot arm at a gripping location (step T17).

The CPU 91 performs the gripping of the workpiece C (step T19), performs a process of detecting a workpiece thickness (step T21), and determines whether or not the gripping thereof is appropriately performed (step T23). When a gripped state is not appropriate, the CPU 91 retries the pick-up operation from step T1 (step T25), and when the gripped state is appropriate, the CPU 91 ends the pick-up operation.

[Third Pick-Up Operation]

Figure 26:
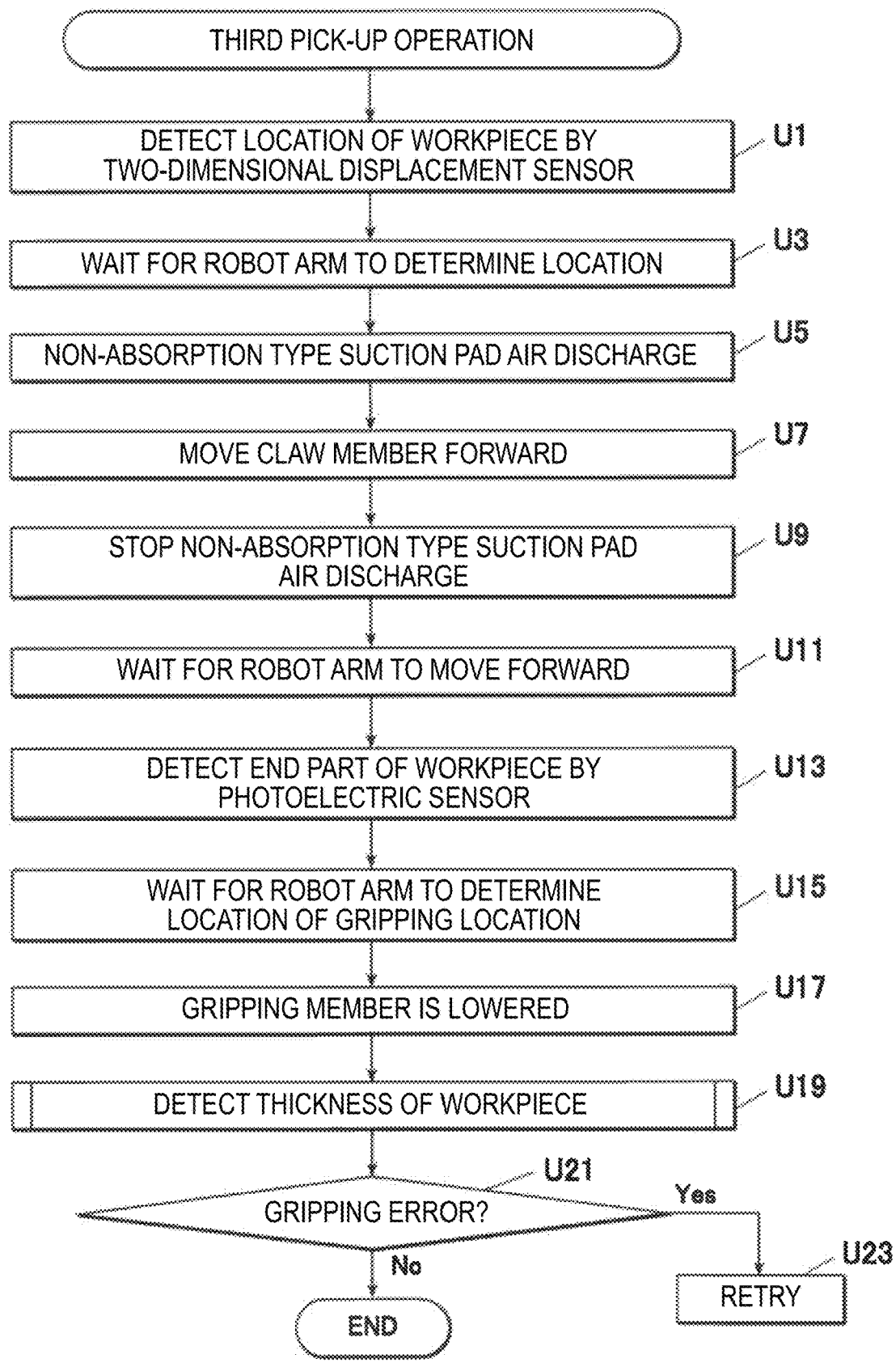
FIG. 26 is a flowchart illustrating control of a third pick-up operation.

Next, operation control of a third pick-up operation will be described with reference to a flowchart of FIG. 26 and operation explanatory views of FIGS. 27 to 30.

In the third pick-up operation, the first workpiece C from the top is picked up by a combination of the suction mechanism 30 and the separation mechanism 40 without using the nozzle mechanism 20. When the workpiece C is not a material that causes curl at an end part thereof and when the workpiece C is not a material that causes the workpieces C to be stuck to each other, the third pick-up control is performed to pick up the first workpiece C which is difficult to be picked up only by the separation mechanism 40.

In advance, the robot arm conveys the pick-up device 10 above the front of the workpiece C stacked and disposed. In this case as well, the robot arm supports the pick-up device 10 so that a placement surface on which the workpieces C are stacked and disposed, and the X-Y plane of the pick-up device 10 are parallel to each other.

Next, the CPU 91 detects a shape and location of the lower stacked workpieces C and a height of the first workpiece C by the two-dimensional displacement sensor 12 and outputs a detected result to the robot arm side (step U1).

Figure 27:
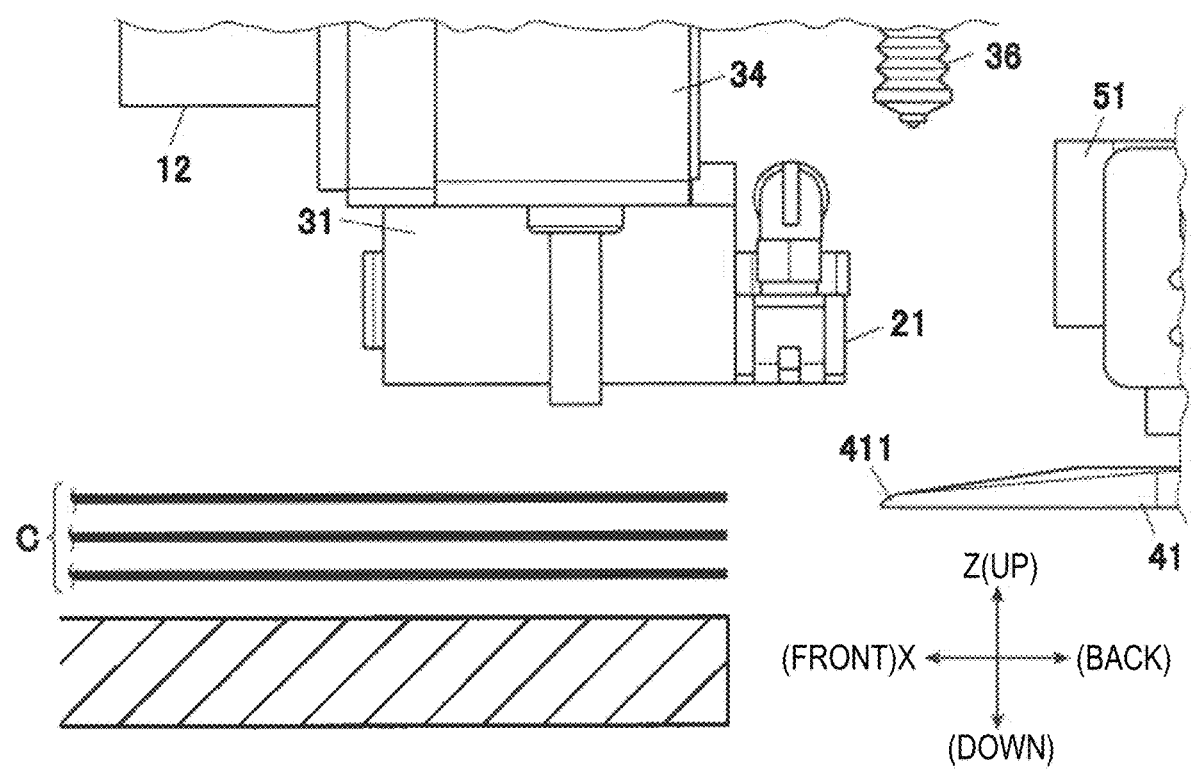
FIG. 27 is an operation explanatory view of the third pick-up operation.

As illustrated in FIG. 27, the robot arm determines, based on the detected result by the two-dimensional displacement sensor 12, a location of the pick-up device 10 at a location where the bottom surface of the claw member 41 becomes a height between the first workpiece C and the second workpiece C, and the bottom surface of the non-absorption type suction pad 31 is slightly higher than the upper surface of the first workpiece C.

The CPU 91 waits for the robot arm to finish determining the location (step U3).

The non-absorption type suction pad 31 is disposed in front of the retracted claw member 41, such that when the robot arm finishes determining the location, the non-absorption type suction pad 31 is located above the rear end part of the first workpiece C.

Figure 28:
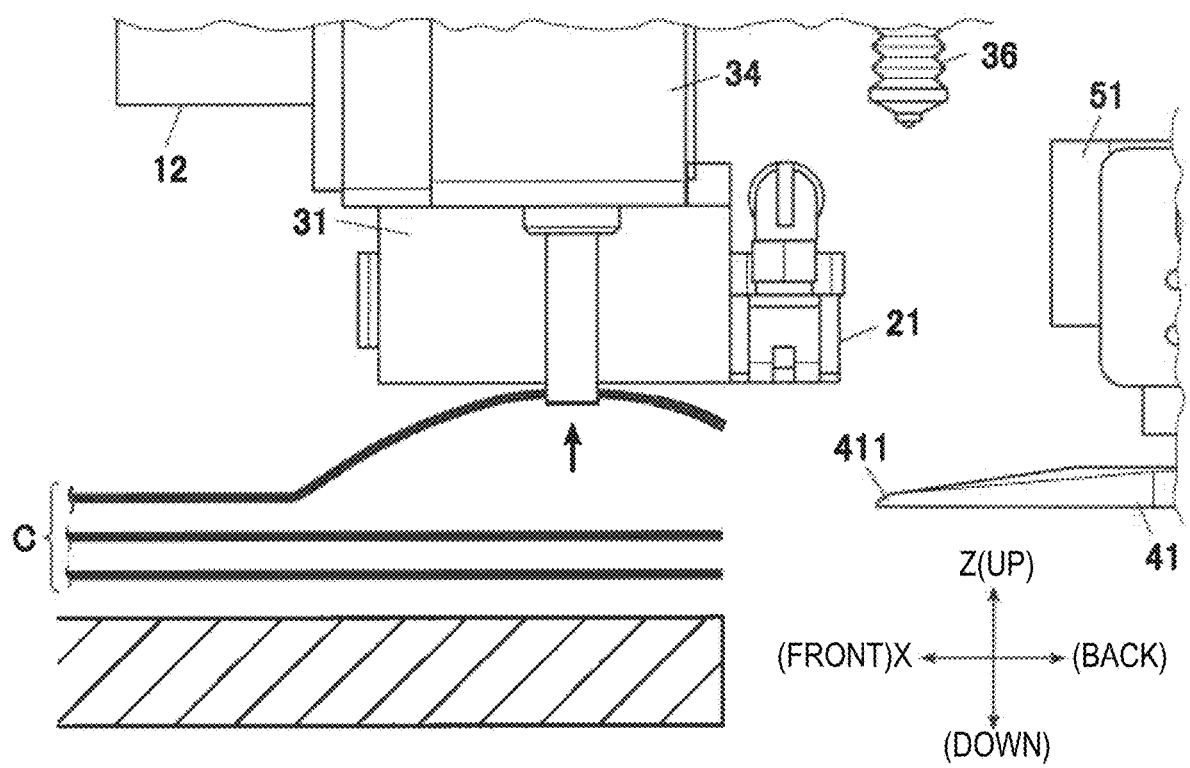
FIG. 28 is an operation explanatory view of the third pick-up operation following FIG. 27.

In this state, the CPU 91 controls the solenoid valve 311 of the non-absorption type suction pad 31 to set the solenoid valve 311 in an air discharge state (step U5). Next, as illustrated in FIG. 28, the first workpiece C is in a state of being pulled to the bottom surface of the non-absorption type suction pad 31.

Figure 29:
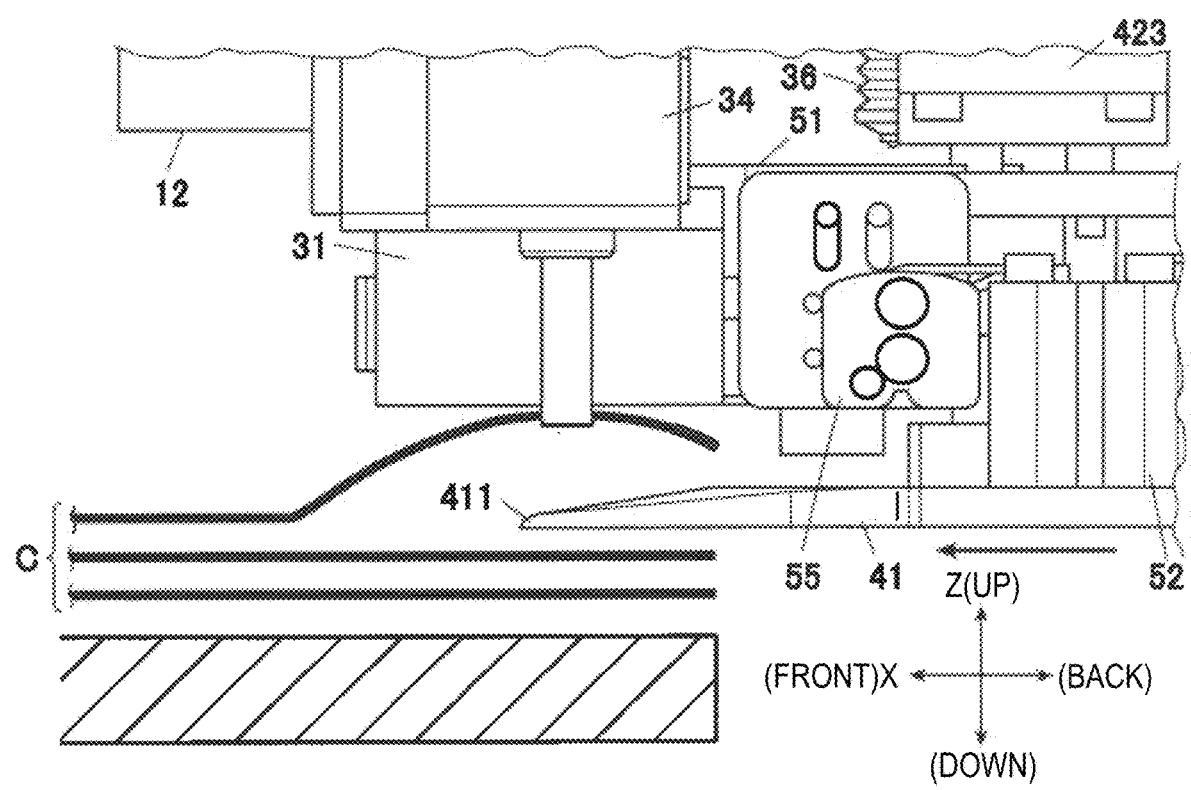
FIG. 29 is an operation explanatory view of the third pick-up operation following FIG. 28.

In this state, as illustrated in FIG. 29, the CPU 91 controls the forward and backward drive unit 42 to start a forward movement of the claw member 41 (step U7).

Figure 30:
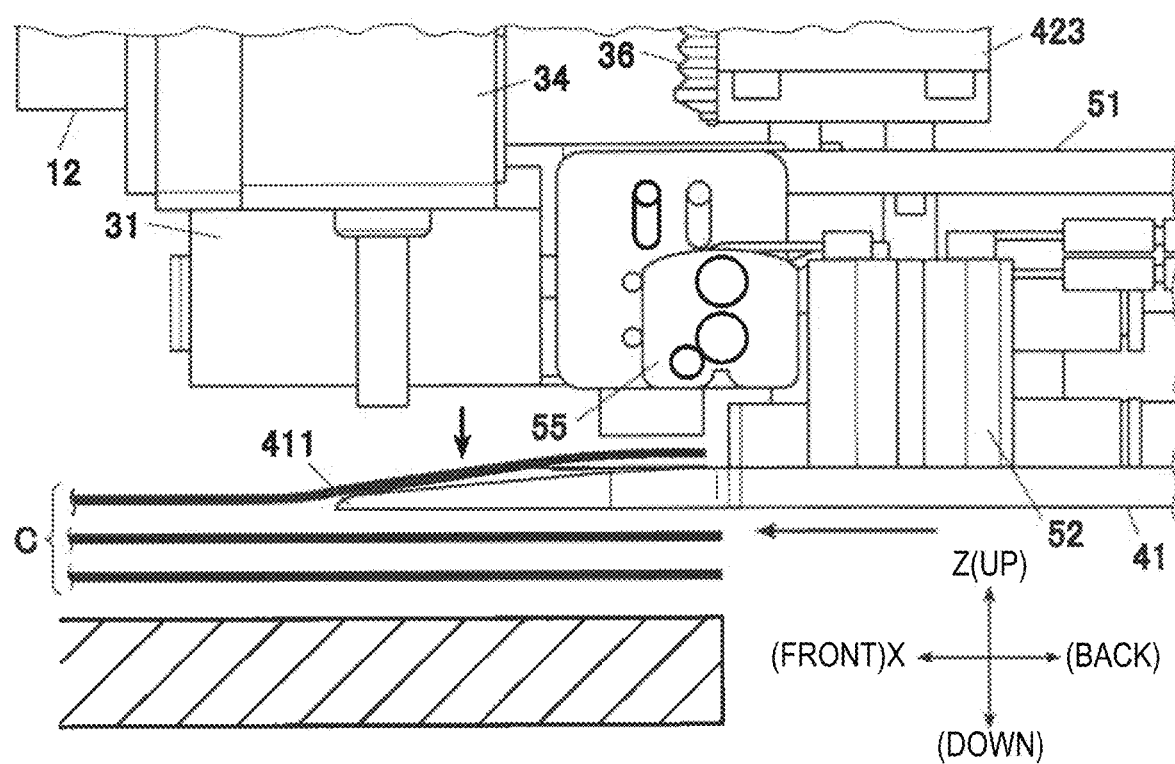
FIG. 30 is an operation explanatory view of the third pick-up operation following FIG. 29.

As illustrated in FIG. 30, the CPU 91 stops the air discharge (step U9).

The claw member 41 further moves forward, and is inserted between the first workpiece C from the top and the second workpiece C therefrom, such that the first and second workpieces C are separated from each other.

The subsequent processes are the same as steps S7 to S19 of the first pick-up operation.

That is, the CPU 91 waits for the robot arm to perform an operation of the forward movement (step U11), detects an end part location of the first workpiece C by the two photoelectric sensors 55 (step U13), and stops the robot arm at a gripping location (step U15).

The CPU 91 performs the gripping of the workpiece C (step U17), performs a process of detecting a workpiece thickness (step U19), and determines whether or not the gripping thereof is appropriately performed (step U21). When a gripped state is not appropriate, the CPU 91 retries the pick-up operation from step U1 (step U23), and when the gripped state is appropriate, the CPU 91 ends the pick-up operation.

[Process of Estimating Surface State of Workpiece]

Next, a process of estimating a surface state of a workpiece executed by the CPU 91 of the control device 90 will be described with reference to FIGS. 31A to 36B. FIGS. 31A, 32A, 33A, 34A, 35A, and 36A are side views illustrating various surface states generated in the first workpiece C from the top of the stacked workpieces C which is not picked up yet. FIGS. 31B, 32B, 33B, 34B, 35B, and 36B are diagrams illustrating a displacement of the upper surface of the first workpiece C, a horizontal axis indicates a location in the X-axis direction, and a vertical axis indicates a detected displacement in the Z-axis direction.

Figure 35A:
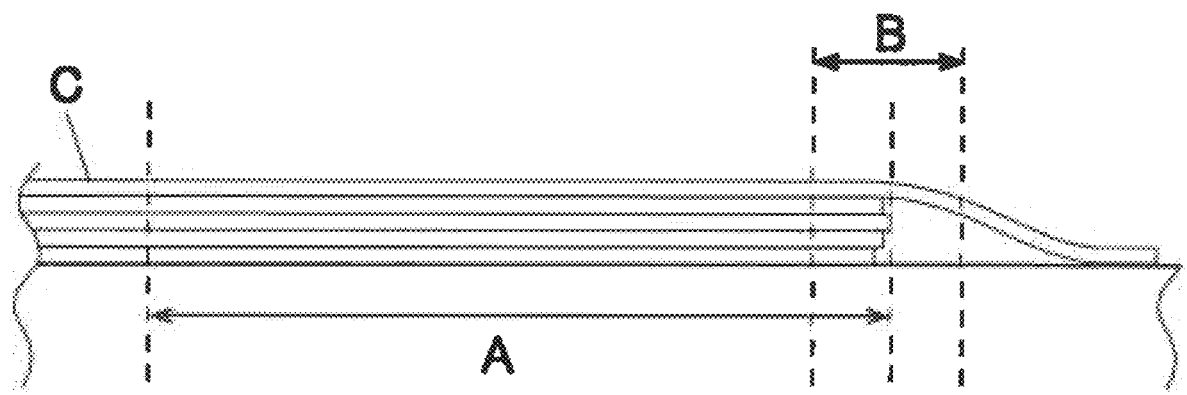
FIG. 35A is a diagram illustrating the displacement of the upper surface of the first workpiece in an "upper fabric excessive state"
Figure 36A:
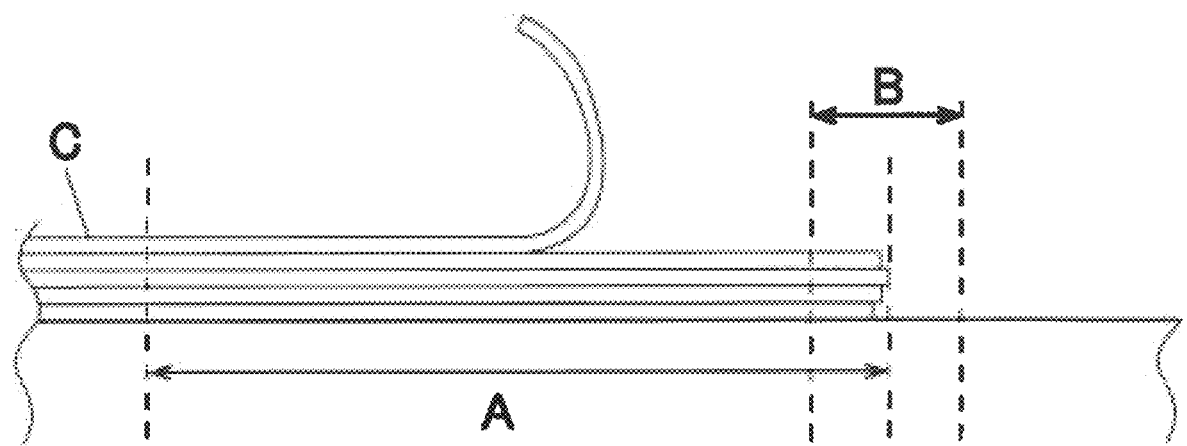
FIG. 36A is a diagram illustrating the displacement of the upper surface of the first workpiece in a "curled state"

Examples of the surface state generated in the first workpiece C from the top of the stacked workpieces C which are not picked up yet include a "normal state" (FIG. 31A), an "upward-turned state" (FIG. 32A), a "downward-turned state" (FIG. 33A), an "upper fabric shortage state" (FIG. 34A), an "upper fabric excessive state" (FIG. 35A), and a "curled state" (FIG. 36A).

On a placement surface on which the workpieces C are stacked and placed, a reference point F for aligning locations of the rear end parts of the respective workpieces C is set in advance in the X-axis direction. With respect to the workpiece C on the placement surface, a displacement in a stacking direction (the Z-axis direction) on the upper surface of the first workpiece C from the top is detected by the two-dimensional displacement sensor 12. A first detection section A and a second detection section B for estimating a type of surface state from a detected result thereof are set in the X-axis direction.

The first detection section A is a detection range for identifying a state that occurs within a certain range from the rear end part of the workpiece C toward the front, and is a range from a starting point M located in front of the above-described reference point F to the reference point F. For example, the first detection section A is set in a range of several tens of millimeters to several hundreds of millimeters in the X-axis direction.

The second detection section B is a detection range for identifying a state that occurs at the rear end part of the workpiece C, and is set in a range of several millimeters to a dozen millimeters before and after the above-described reference point F.

The two-dimensional displacement sensor 12 covers all of the first detection section A and the second detection section B, and performs displacement detection within a range in which sufficient margins can be obtained on the front side and the back side, respectively (defined as an entire detection range).

Figure 31A:
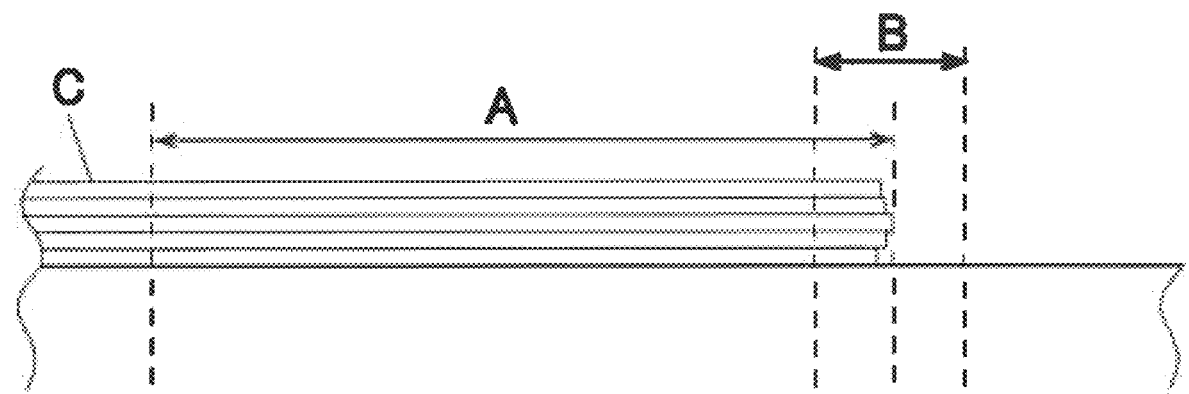
FIG. 31A is a diagram illustrating a displacement of an upper surface of a first workpiece in a "normal state"

As illustrated in FIG. 31A, the "normal state" indicates a state in which the rear end parts of the respective workpieces C are stacked to be flat in a state where the rear end parts thereof are roughly aligned with the reference point F.

Figure 31B:
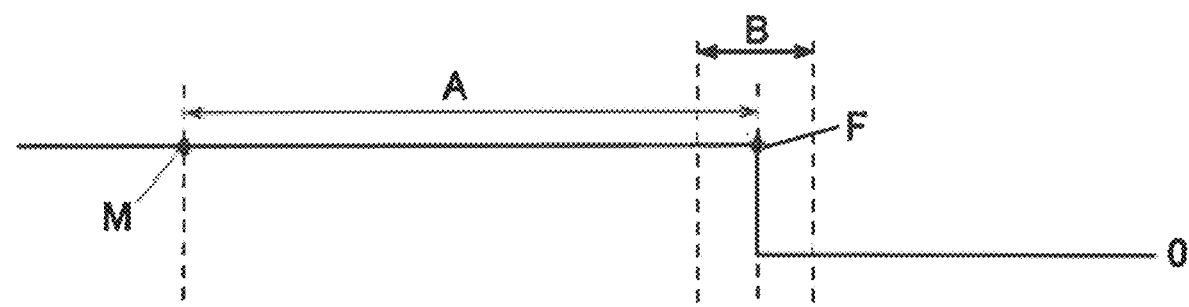
FIG. 31B is a diagram illustrating the displacement of the upper surface of the first workpiece.

FIG. 31B illustrates a result of performing the displacement detection with respect to the workpiece C in the "normal state" by the two-dimensional displacement sensor 12 in the entire detection range. The displacement detection obtains the displacement in the Z-axis direction by scanning the entire detection range in the X-axis direction at sampling intervals of minute units (for example, 0.1 to 1.0 [mm]).

In the case of the "normal state", a fluctuation in displacement with respect to a height of the upper surface according to the number of stacked sheets becomes significantly small, and at the rear end part thereof, the fluctuation thereof tends to sharply decrease from the height of the upper surface to a height of the placement surface.

The CPU 91 of the control device 90 determines, based on the following conditions (1) to (3), whether or not the surface state is the "normal state" by scanning the entire detection range from the front side to the back side by the two-dimensional displacement sensor 12.

(1) In the entire first detection section A, an amount of increase in displacement in the Z-axis direction with respect to a reference height (a height of the starting point M) is less than a first fluctuation threshold value.

(2) In the entire first detection section A, an amount of decrease in displacement in the Z-axis direction with respect to the reference height is less than a second fluctuation threshold value.

(3) There is a portion where a downward inclination for each sampling interval in the second detection section B is equal to or greater than a reduction threshold value.

In the "normal state", since the upper surface of the stacked workpieces C is flat, the normal state is determined based on an identification condition indicating that a vertical displacement is small as described in the conditions (1) and (2). The first and second fluctuation threshold values may be set to, for example, a value of about a thickness of one sheet (or several sheets) of the workpiece C.

In the "normal state", since a drop corresponding to the entire thickness of the stacked workpieces C occurs at the rear end part of the stacked workpieces C, the normal state is determined based on an identification condition indicating that there is the portion where the downward inclination for each sampling interval in the second detection section B is equal to or greater than the reduction threshold value as described in condition (3). The reduction threshold value may be set to, for example, a value of about an inclination that causes a decrease in the entire thickness of the stacked workpieces C with respect to the sampling intervals.

The first and second fluctuation threshold values and the reduction threshold value can be freely and individually set by the input device 96.

When the first and second fluctuation threshold values are set to the thickness of one sheet (or several sheets) of the workpiece C, the CPU 91 may calculate the first and second fluctuation threshold values by allowing the input device 96 to input the value of the thickness of the workpiece C in advance.

When the reduction threshold value is set to the value of about the inclination that causes the decrease in the entire thickness of the stacked workpieces C with respect to the sampling intervals, the CPU 91 may calculate the reduction threshold value by inputting the number of stacked sheets of the workpieces C to be stacked on the placement surface and a value of the thickness of the workpiece C.

Figure 32A:
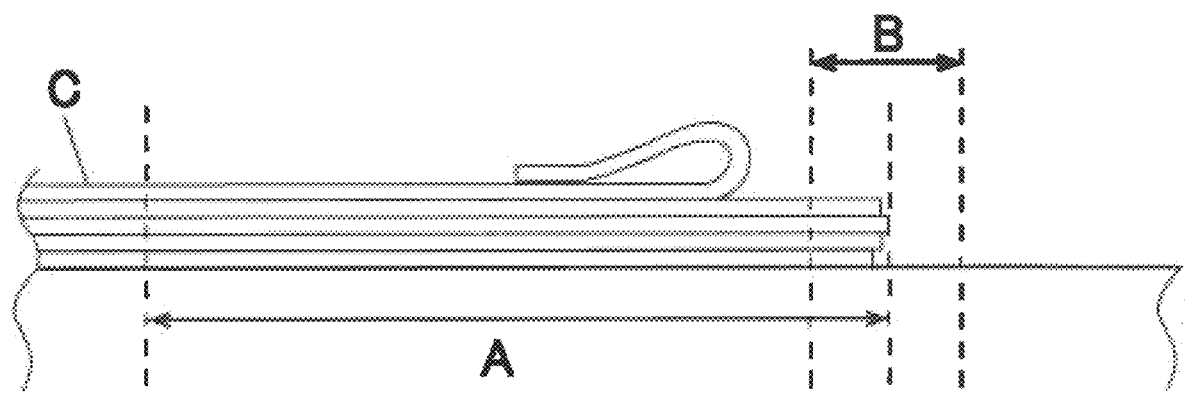
FIG. 32A is a diagram illustrating the displacement of the upper surface of the first workpiece in an "upward-turned state"

As illustrated in FIG. 32A, the "upward-turned state" indicates a state in which the rear end part of the first workpiece C from the top is turned up forward.

Figure 32B:
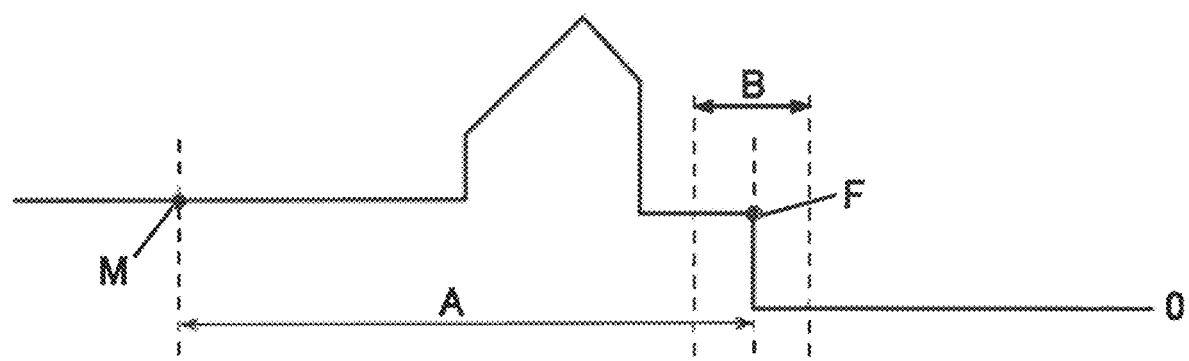
FIG. 32B is a diagram illustrating the displacement of the upper surface of the first workpiece.

FIG. 32B illustrates a result of performing the displacement detection with respect to the workpiece C in the "upward-turned state" by the two-dimensional displacement sensor 12 in the entire detection range.

In the case of the "upward-turned state", the workpiece C that is turned up causes a raised portion having a rising slope, and at a front end part of the raised portion, a steep and small raised portion is generated by the rear end part of the workpiece C that is turned up forward.

The CPU 91 of the control device 90 determines, based on the following conditions (4) to (6), whether or not the surface state is the "upward-turned state" by scanning the entire detection range from the front side to the back side by the two-dimensional displacement sensor 12.

(4) In the entire first detection section A, there is a portion where the amount of increase in displacement in the Z-axis direction with respect to the reference height is equal to or greater than the first fluctuation threshold value.

(5) In the entire first detection section A, there is a portion where an upward inclination for each sampling interval is equal to or greater than an inclination threshold value.

(6) In the entire first detection section A, the amount of increase in displacement in the Z-axis direction with respect to the reference height is less than a third fluctuation threshold value.

In the "upward-turned state", since the raised portion is generated on the upper surface of the stacked workpieces C, as described in the condition (4), the portion where the amount of increase in displacement exceeds the above-described first fluctuation threshold value is always generated.

In the "upward-turned state", since the steep and small raised portion is generated at the front end part of the raised portion, as described in the condition (5), when the upward inclination for each sampling interval is obtained, there is the portion where the upward inclination therefor is equal to or greater than the inclination threshold value. The inclination threshold value may be set to, for example, a value of about an inclination that causes an increase in thickness of about one sheet of the workpiece C with respect to the sampling intervals.

As a state similar to the "upward-turned state", there is a "curled state" which will be described later, and the condition (6) is determined to identify the "upward-turned state" and the "curled state".

In the "curled state", since the rear end part of the workpiece C rises upward, and the rear end part of the workpiece C is not bent backward and not turned diagonally forward and downward as described in the "upward-turned state", a displacement higher than that generated in the "upward-turned state" is generated in the "curled state". Therefore, an intermediate value between the displacements that can be generated in the "curled state" and the "upward-turned state" is set as the third fluctuation threshold value. For example, the third fluctuation threshold value can be obtained empirically by accumulating actually measured values of the "curled state" and the "upward-turned state".

Next, since the amount of increase in displacement exceeding the third fluctuation threshold value is not generated in the first detection section A, the surface state is identified as the "upward-turned state" instead of the "curled state".

The first fluctuation threshold value is as described above.

The inclination threshold value and the third fluctuation threshold value can be freely and selectively set by the input device 96.

When the inclination threshold value is set to an inclination that causes an increase in thickness of about one sheet of the workpiece C with respect to the sampling intervals, the inclination threshold value may be calculated by allowing the input device 96 to input the value of the thickness of the workpiece C in advance.

Figure 33A:
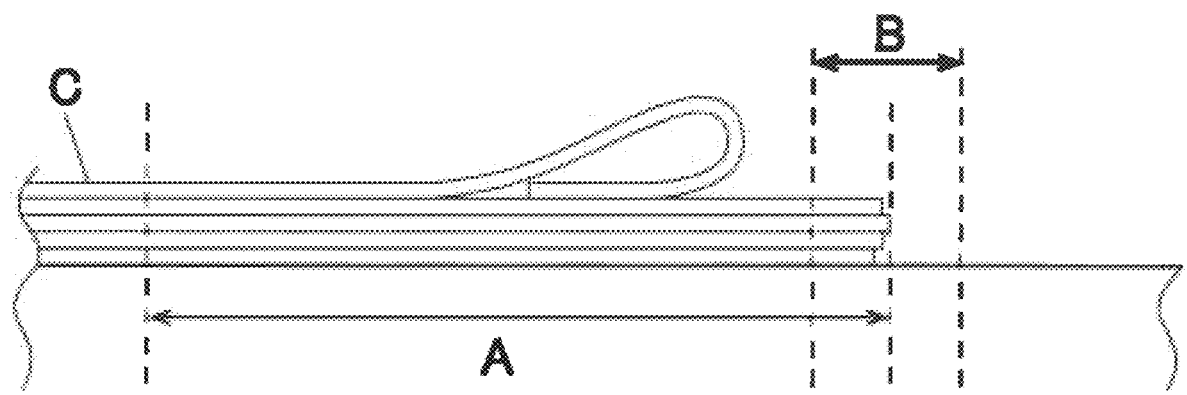
FIG. 33A is a diagram illustrating the displacement of the upper surface of the first workpiece in a "downward-turned state"

As illustrated in FIG. 33A, the "downward-turned state" indicates a state in which the rear end part of the first workpiece C from the bottom is turned over forward.

Figure 33B:
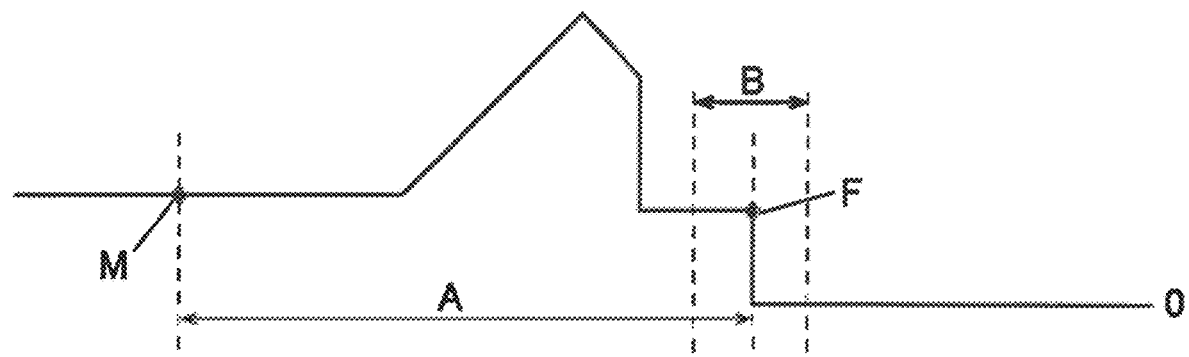
FIG. 33B is a diagram illustrating the displacement of the upper surface of the first workpiece.

FIG. 33B illustrates a result of performing the displacement detection with respect to the workpiece C in the "downward-turned state" by the two-dimensional displacement sensor 12 in the entire detection range.

In the case of the "downward-turned state", the workpiece C that is turned over causes a raised portion having a rising slope. The raised portion in the "downward-turned state" is different from the raised portion in the "upward-turned state". At a front end part thereof, there is no steep and small raised portion and there is a shape in which the displacement smoothly and gradually increases.

The CPU 91 of the control device 90 determines, based on the following conditions (4) and (7), whether or not the surface state is the "downward-turned state" by scanning the entire detection range from the front side to the back side by the two-dimensional displacement sensor 12.

(4) In the entire first detection section A, there is the portion where the amount of increase in displacement in the Z-axis direction with respect to the reference height is equal to or greater than the first fluctuation threshold value.

(7) In the entire first detection section A, the upward inclination for each sampling interval is less than the inclination threshold value.

In the "downward-turned state", since the raised portion is generated on the upper surface of the stacked workpieces C, as described in the condition (4), the portion where the amount of increase in displacement exceeds the above-described first fluctuation threshold value is always generated.

In the "downward-turned state", since the displacement of the front end part of the raised portion smoothly and gradually increases, as described in the condition (7), when the upward inclination for each sampling interval is obtained, there is no portion where the upward inclination therefor is equal to or greater than the inclination threshold value.

The first fluctuation threshold value and the inclination threshold value are as described above.

Figure 34A:
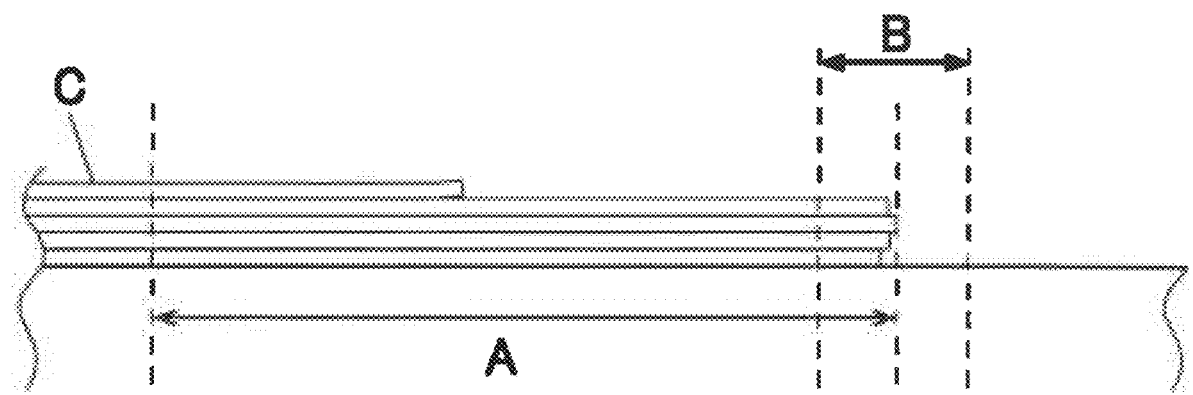
FIG. 34A is a diagram illustrating the displacement of the upper surface of the first workpiece in an "upper fabric shortage state"

As illustrated in FIG. 34A, the "upper fabric shortage state" indicates a state in which the rear end part of the first workpiece C significantly deviates forward.

Figure 34B:
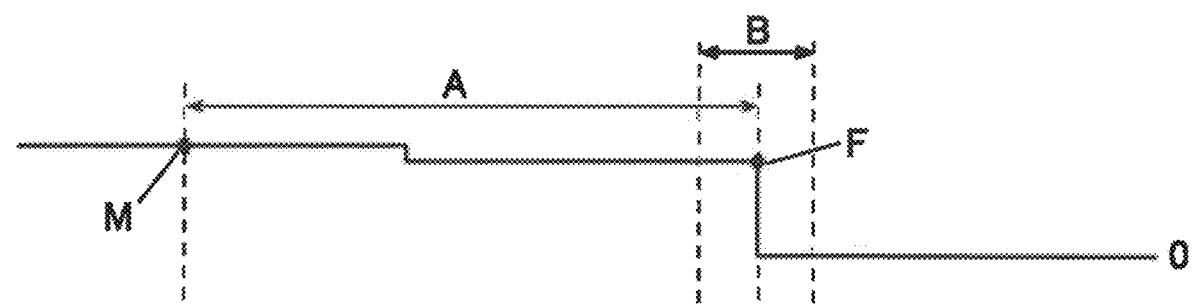
FIG. 34B is a diagram illustrating the displacement of the upper surface of the first workpiece.

FIG. 34B illustrates a result of performing the displacement detection with respect to the workpiece C in the "upper fabric shortage state" by the two-dimensional displacement sensor 12 in the entire detection range.

In the case of the "upper fabric shortage state", a downward step portion is generated by the rear end part of the first workpiece C which significantly deviates forward.

The CPU 91 of the control device 90 determines, based on the following conditions (1) and (8), whether or not the surface state is the "upper fabric shortage state" by scanning the entire detection range from the front side to the back side by the two-dimensional displacement sensor 12.

(1) In the entire first detection section A, the amount of increase in displacement in the Z-axis direction with respect to the reference height is less than the first fluctuation threshold value.

(8) In the entire first detection section A, there is a portion where the amount of decrease in displacement in the Z-axis direction with respect to the reference height is equal to or greater than the second fluctuation threshold value.

In the "upper fabric shortage state", since the upper surface of the stacked workpieces C is flat except the downward step portion, as described in the condition (1), the upper fabric shortage state is determined based on an identification condition indicating that the upper displacement is small.

In the "upper fabric shortage state", since the downward step portion is generated on the upper surface of the stacked workpieces C, as described in the condition (8), the upper fabric shortage state is determined based on an identification condition indicating that there is a portion where the lower displacement is equal to or greater than the second fluctuation threshold value.

The first fluctuation threshold value and the second fluctuation threshold value are as described above.

As illustrated in FIG. 35A, the "upper fabric excessive state" indicates a state in which the rear end part of each workpiece C significantly deviates backward.

Figure 35B:
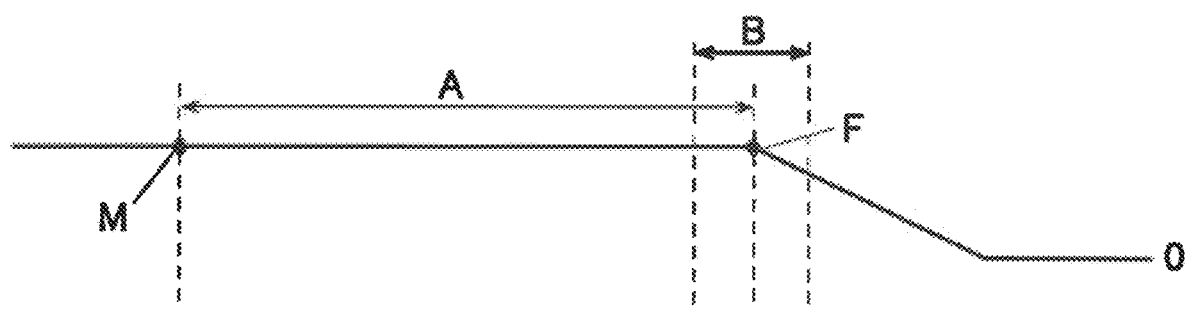
FIG. 35B is a diagram illustrating the displacement of the upper surface of the first workpiece.

FIG. 35B illustrates a result of performing the displacement detection with respect to the workpiece C in the "upper fabric excessive state" by the two-dimensional displacement sensor 12 in the entire detection range.

In the case of the "upper fabric excessive state", within the first detection section A, a fluctuation in displacement with respect to a height of the upper surface of the workpiece C becomes significantly small, and at a section behind the rear end part of the first detection section A, there is a tendency of forming a downward slope from the height of the upper surface to the height of the placement surface.

The CPU 91 of the control device 90 determines, based on the following conditions (1), (2), and (9), whether or not the surface state is the "upper fabric excessive state" by scanning the entire detection range from the front side to the back side by the two-dimensional displacement sensor 12.

(1) In the entire first detection section A, the amount of increase in displacement in the Z-axis direction with respect to the reference height is less than the first fluctuation threshold value.

(2) In the entire first detection section A, the amount of decrease in displacement in the Z-axis direction with respect to the reference height is less than the second fluctuation threshold value.

(9) The downward inclination for each sampling interval in the second detection section B is less than the reduction threshold value.

In the "upper fabric excessive state", since the upper surface of the stacked workpieces C is flat in the first detection section A, as described in the conditions (1) and (2), the upper fabric excessive state is determined based on the identification condition indicating that the vertical displacement is small.

In the "upper fabric excessive state", since the rear end part of the stacked workpieces C behind the first detection section A forms a gentle slope with a drop corresponding to the entire thickness of the workpieces C, as described in the condition (9), the upper fabric excessive state is determined based on an identification condition indicating that the downward inclination for each sampling interval in the second detection section B is less than the reduction threshold value.

The first fluctuation threshold value, the second fluctuation threshold value, and the reduction threshold value are as described above.

As illustrated in FIG. 36A, the "curled state" indicates a state in which the rear end part of the first workpiece C is turned up upward.

Figure 36B:
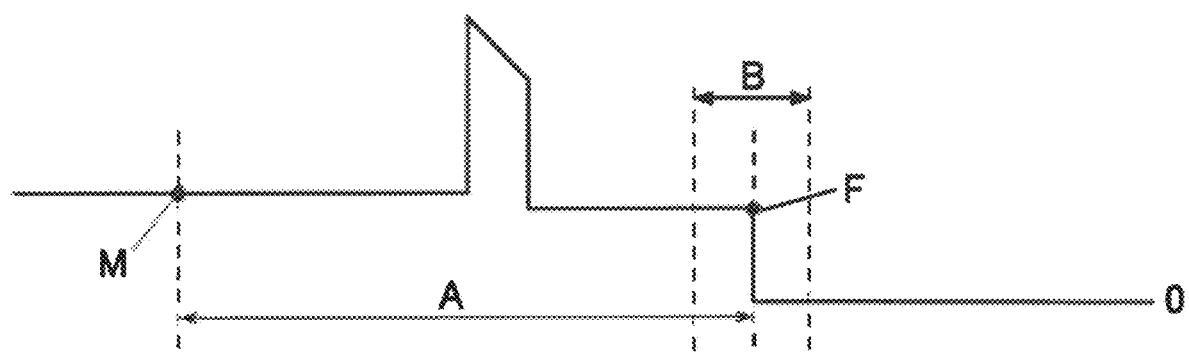
FIG. 36B is a diagram illustrating the displacement of the upper surface of the first workpiece.

FIG. 36B illustrates a result of performing the displacement detection with respect to the workpiece C in the "curled state" by the two-dimensional displacement sensor 12 in the entire detection range.

In the "curled state", the workpiece C that is turned up causes a raised portion that rises sharply upward, and an upper end part of the raised portion is higher than an upper end part of the raised portion in the "upward-turned state".

The CPU 91 of the control device 90 determines, based on the following conditions (4), (5), and (10), whether or not the surface state is the "curled state" by scanning the entire detection range from the front side to the back side by the two-dimensional displacement sensor 12.

(4) In the entire first detection section A, there is the portion where the amount of increase in displacement in the Z-axis direction with respect to the reference height is equal to or greater than the first fluctuation threshold value.
(5) In the entire first detection section A, there is the portion where the upward inclination for each sampling interval is equal to or greater than the inclination threshold value.
(10) In the entire first detection section A, there is a portion where the amount of increase in displacement in the Z-axis direction with respect to the reference height is equal to or greater than the third fluctuation threshold value.

In the "curled state", since the raised portion is generated on the upper surface of the stacked workpieces C, as described in the condition (4), the portion where the amount of increase in displacement exceeds the above-described first fluctuation threshold value is always generated.

In the "curled state", since the raised portion is steep and rises significantly, as described in the condition (5), when the upward inclination for each sampling interval is obtained, there is the portion where the upward inclination therefor is equal to or greater than the inclination threshold value.

In the "curled state", since the raised portion causes a displacement higher than that of the raised portion in the "upward-turned state", the "curled state" can be distinguished from the "upward-turned state" by setting the identification condition indicating that the displacement is equal to or greater than the appropriately set third fluctuation threshold value.

The first fluctuation threshold value, the inclination threshold value, and the third fluctuation threshold value are as described above.

As described above, the surface states of the "normal state", the "upward-turned state", the "downward-turned state", the "upper fabric shortage state", the "upper fabric excessive state", and the "curled state" which are generated in the first workpiece C can be individually identified by determining whether or not the result of performing the displacement detection in the entire detection range by the two-dimensional displacement sensor 12 satisfies various identification conditions determined for each surface state.

Figure 37:
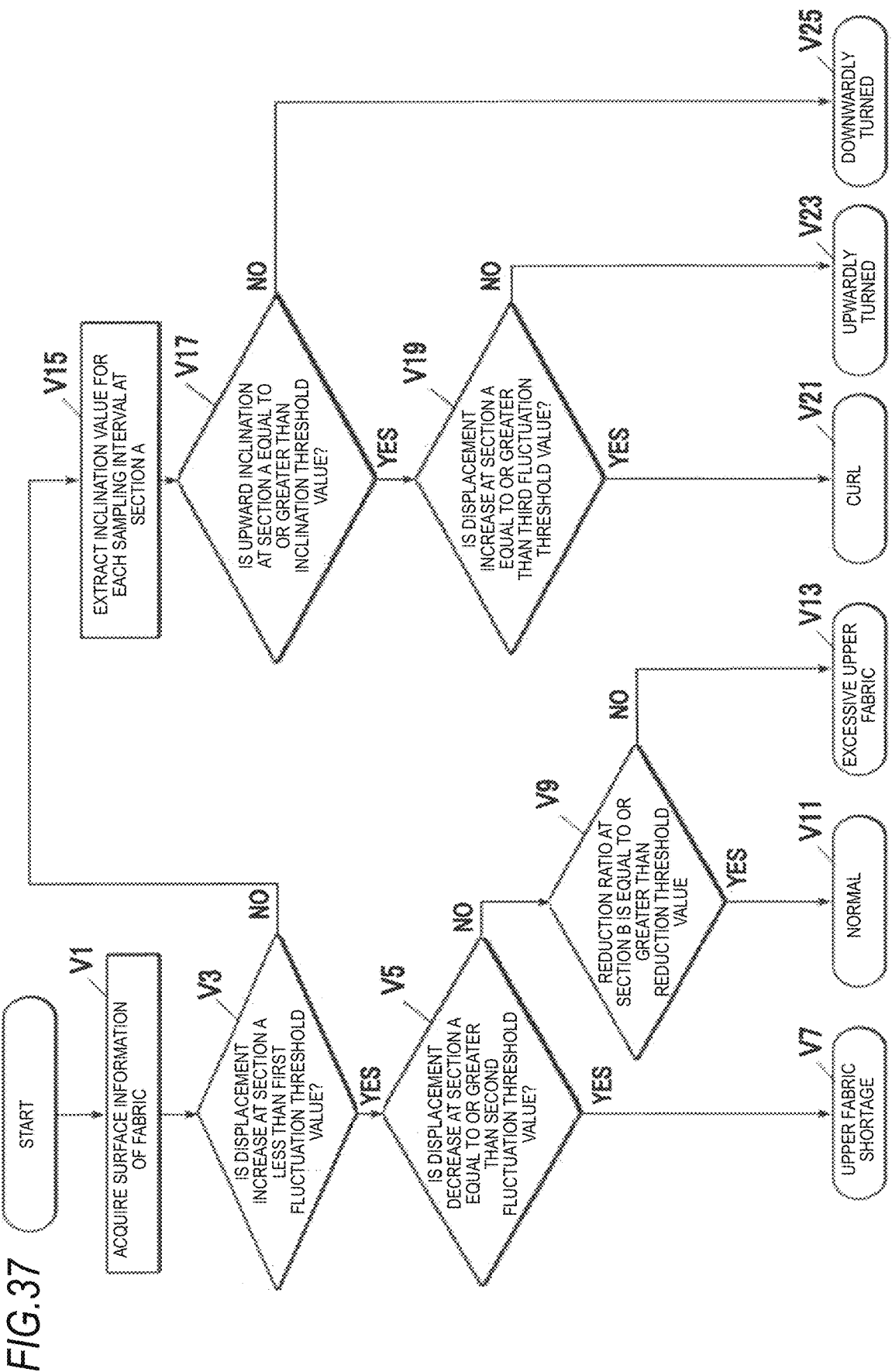
FIG. 37 is a flowchart of a process of estimating a type of surface state generated in the first workpiece.

FIG. 37 is a flowchart of a process, executed by the CPU 91, of estimating the type of surface state generated in the first workpiece C.

The process will be described in order.

First, the CPU 91 controls the robot arm through the control device of the robot arm, and causes the robot arm to move the pick-up device 10 in the X-axis direction. Accordingly, the entire detection range of the workpiece C placed on the placement surface is scanned by the two-dimensional displacement sensor 12 in the X-axis direction, and a displacement of the entire detection range in the Z-axis direction is acquired at sampling intervals (step V1).

It is assumed that the number of stacked sheets of the workpieces C and the thickness thereof, the first to third fluctuation threshold values, the reduction threshold value, and the inclination threshold value are set in advance from the input device 96 or calculated from set values.

Next, the CPU 91 determines whether or not an amount of increase in displacement in the Z-axis direction with respect to the reference height is less than the first fluctuation threshold value in the entire first detection section A (step V3).

When the increase in the entire first detection section A is less than the first fluctuation threshold value, the above-described determination condition (1) is satisfied, such that the CPU 91 determines whether or not there is a portion where an amount of decrease in displacement in the Z-axis direction with respect to the reference height is equal to or greater than the second fluctuation threshold value in the entire first detection section A (step V5).

When there is a portion where a decrease in the entire first detection section A is equal to or greater than the second fluctuation threshold value, the above-described determination condition (8) is satisfied, such that the CPU 91 estimates that the surface state generated in the first workpiece C is the "upper fabric shortage state" (step V7).

In step V5, when it is determined that an amount of decrease in displacement in the Z-axis direction with respect to the reference height in the entire first detection section A is not equal to or greater than the second fluctuation threshold value (less than the second fluctuation threshold value), the above-described determination condition (2) is satisfied, such that the CPU 91 obtains an inclination in the second detection section B. Next, it is determined whether or not the inclination of the second detection section B is a downward slope equal to or greater than the reduction threshold value (step V9).

As a result, when the inclination of the second detection section B is the downward slope equal to or greater than the reduction threshold value, the above-described determination condition (3) is satisfied, such that the CPU 91 estimates that the surface state generated in the first workpiece C is the "normal state" (step V11).

On the other hand, when the inclination of the second detection section B is a downward slope that is not equal to or greater than the reduction threshold value (less than the reduction threshold value), the above-described determination condition (9) is satisfied, such that the CPU 91 estimates that the surface state generated in the first workpiece C is the "upper fabric excessive state" (step V13).

In step V3, when it is determined that the amount of increase in displacement in the Z-axis direction with respect to the reference height in the entire first detection section A is not less than the first fluctuation threshold value (there is a portion where the amount of increase in displacement is equal to or greater than the first fluctuation threshold value), the above-described determination condition (4) is satisfied, such that the CPU 91 obtains an inclination for each sampling interval in the first detection section A (step V15).

Next, it is determined whether or not there is an upward inclination, among the inclinations for each sampling interval in the first detection section A, equal to or greater than the inclination threshold value (step V17).

As a result, when there is the upward inclination equal to or greater than the inclination threshold value in the first detection section A, the above-described determination condition (5) is satisfied, such that the CPU 91 determines whether or not there is a portion where the amount of increase in displacement in the Z-axis direction with respect to the reference height in the entire first detection section A is equal to or greater than the third fluctuation threshold value (step V19).

As a result, when there is the portion where the amount of increase in displacement is equal to or greater than the third fluctuation threshold value in the first detection section A, the above-described determination condition (10) is satisfied, such that the CPU 91 estimates that the surface state generated in the first workpiece C is the "curled state" (step V21).

On the other hand, when the displacement in the first detection section A is not equal to or greater than the third fluctuation threshold value (less than the third fluctuation threshold value), the above-described determination condition (6) is satisfied, such that the CPU 91 estimates that the surface state generated in the first workpiece C is the "upward-turned state" (step V23).

On the other hand, in step V17, when there is no upward inclination, among the inclinations for each sampling interval in the first detection section A, equal to or greater than the inclination threshold value (less than the inclination threshold value), the above-described determination condition (7) is satisfied, such that the CPU 91 estimates that the surface state generated in the first workpiece C is the "downward-turned state" (step V25).

As described above, the CPU 91 can estimate the surface state generated in the first workpiece C as any one of the "normal state", the "upward-turned state", the "downward-turned state", the "upper fabric shortage state", the "upper fabric excessive state", and the "curled state". Accordingly, the CPU 91 of the control device 90 functions as an estimation unit.

[Normalization Operation for Surface State of Workpiece]

The CPU 91 of the control device 90 estimates the surface state generated in the first workpiece C, and when the surface state is a surface state other than the "normal state", the CPU 91 controls the pick-up device 10 and the robot arm so as to perform a normalization operation for making the surface state the "normal state". The CPU 91 controls the robot arm through the control device 101.

Hereinafter, the normalization operation for each surface state will be described individually.

Figure 38:
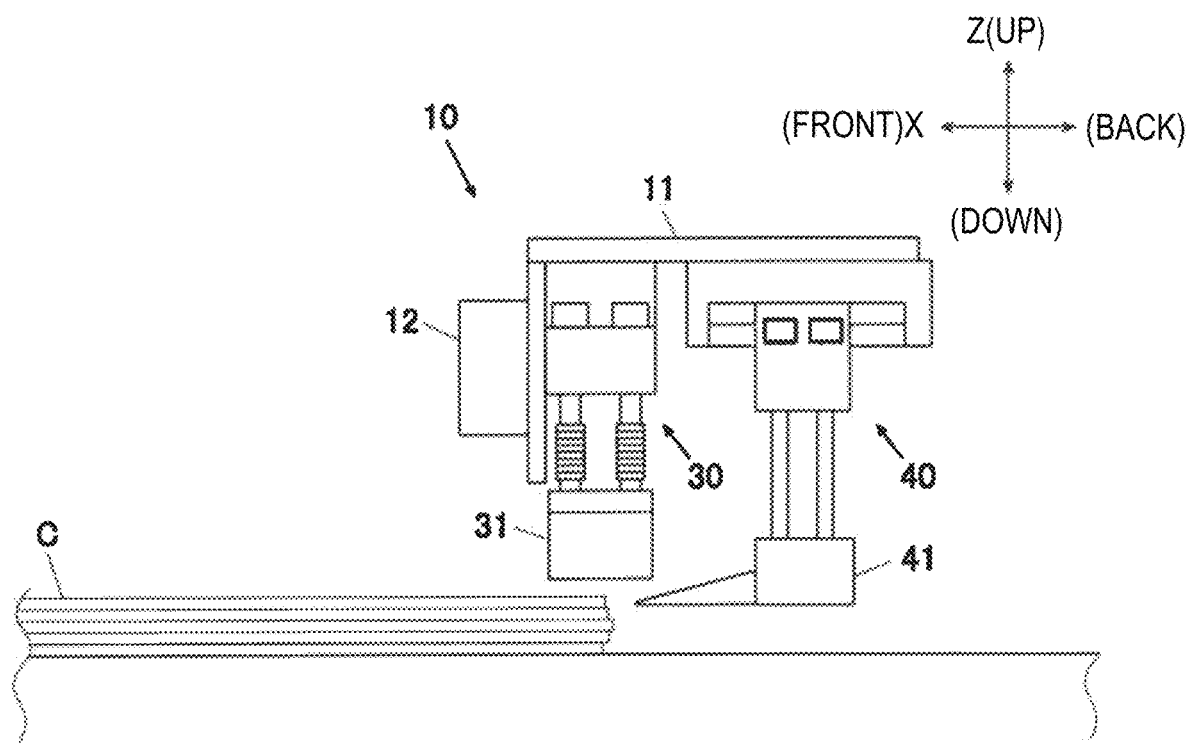
FIG. 38 is an operation explanatory view when a surface state of the workpiece is the "normal state".

FIG. 38 is an operation explanatory view when the surface state of the workpiece C is the "normal state".

In the case of the "normal state", the CPU 91 executes any one of the first to third pick-up operations without performing the normalization operation.

Figure 39A:
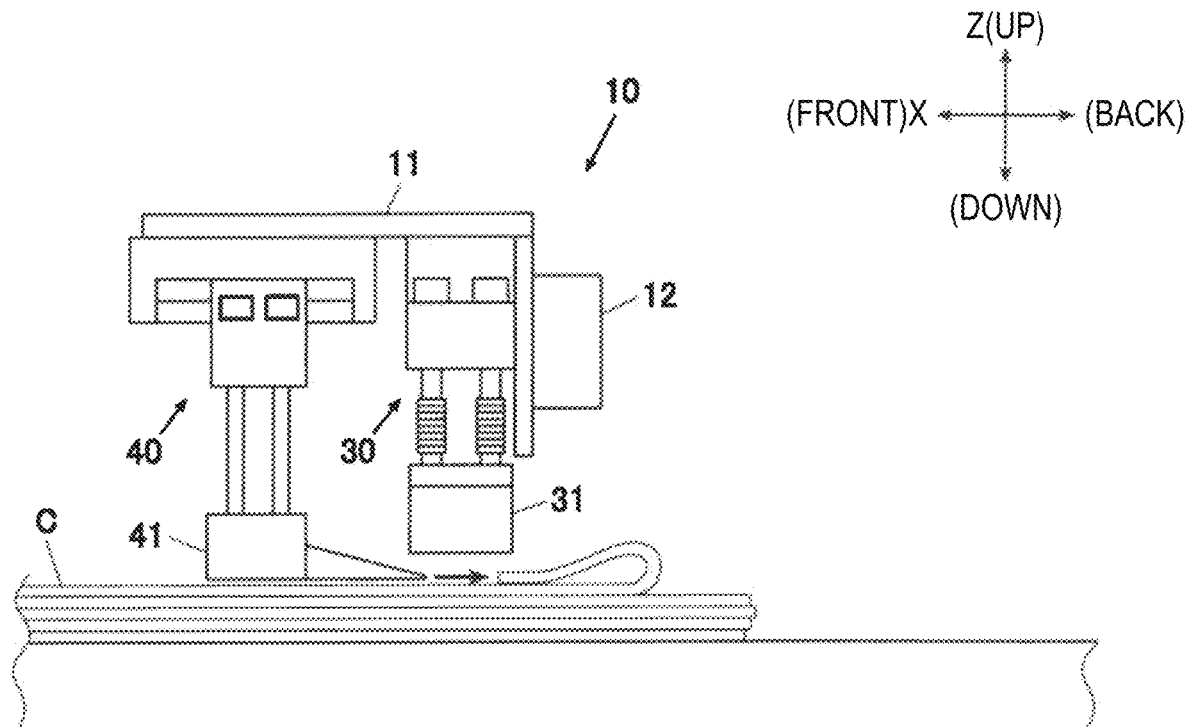
FIGS. 39A and 39B are operation explanatory views of a normalization operation when the surface state of the workpiece is the "upward-turned state".
Figure 39B:
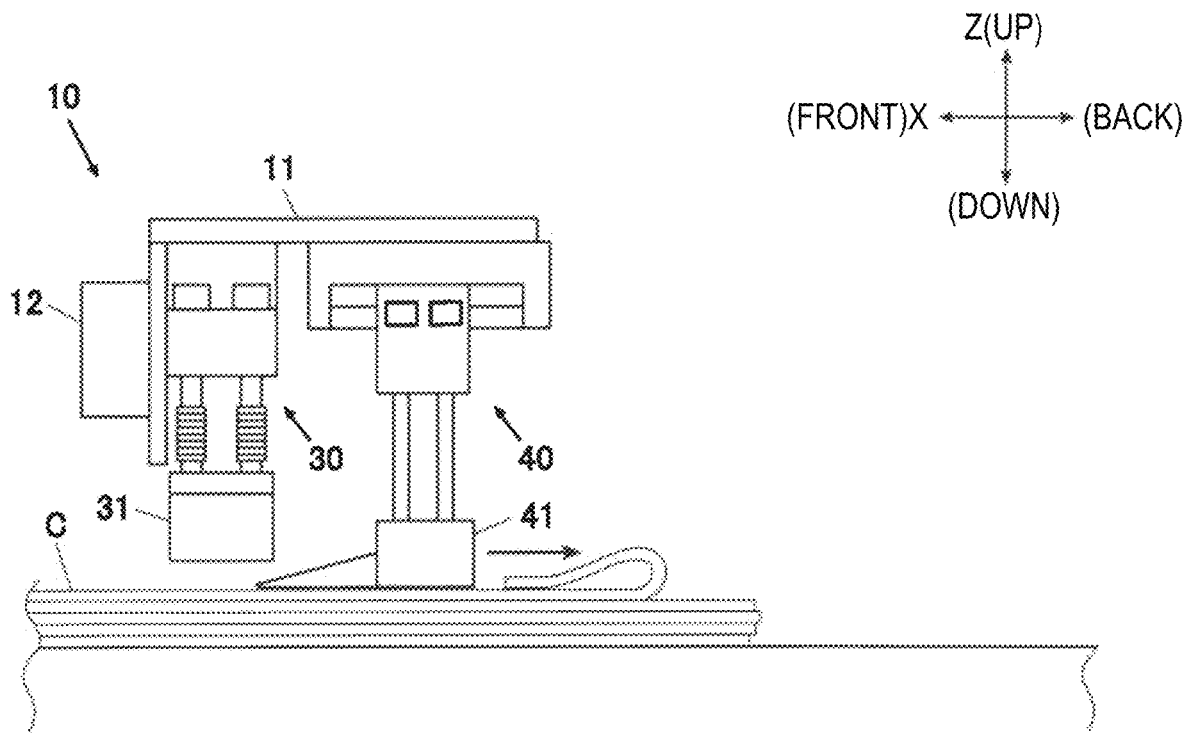

FIGS. 39A and 39B are operation explanatory views of the normalization operation when the surface state of the workpiece C is the "upward-turned state".

For convenience of description, in FIG. 39A, the directions of "front" and "back" are described as the directions of the pick-up device 10 when the pick-up operation is performed (refer to FIGS. 13, 14, 21 to 25, and 27 to 30), and are described in directions that do not match the directions of the pick-up device 10 in the drawing. A text in FIG. 39A will be described in accordance with the directions of "front" and "back" shown in the drawing.

When the "upward-turned state" is generated, as illustrated in FIG. 39A, the CPU 91 causes the robot arm to reverse the front and back directions of the pick-up device 10 by 180° around the Z-axis. Accordingly, the tip part 411 of the claw member 41 can be directed backward. The tip part 411 of the claw member 41 is caused to move to the directly front side of the rear end part of the workpiece C in which the upward-turned state is generated, and air is controlled to be discharged from the nozzle port 412, such that the rear end part of the workpiece C in which the "upward-turned state" is generated can be pushed back backward, and thus the workpiece C can be in the "normal state".

Alternatively, as illustrated in FIG. 39B, the CPU 91 causes the robot arm to move the rear end part of the claw member 41 of the pick-up device 10 to the directly front side of the rear end part of the workpiece C in which the upward-turned state is generated, and the bottom surface of the claw member 41 is in sliding contact with the upper surface of the first workpiece C or maintains a height at which the bottom surface of the claw member 41 is slightly not in sliding contact with the upper surface of the first workpiece C. After that, the CPU 91 causes the robot arm to move the pick-up device 10 backward.

Accordingly, while the bottom surface of the claw member 41 flattens the workpiece C, the rear end part of the claw member 41 can push back the rear end part of the workpiece C in which the upward-turned state is generated backward, such that the workpiece C can be in the "normal state".

Only one of the normalization operations illustrated in FIGS. 39A and 39B may be performed, or both normalization operations may be performed in order (regardless of a first operation or a second operation).

Figure 40A:
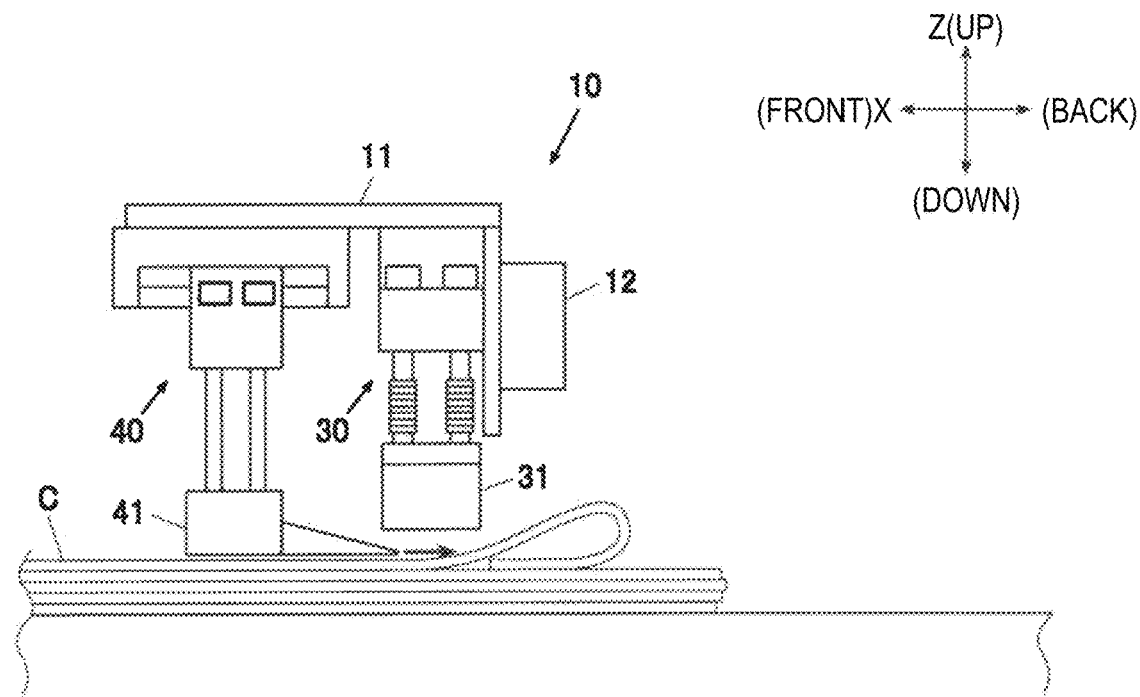
FIGS. 40A and 40B are operation explanatory views of the normalization operation when the surface state of the workpiece is the "downward-turned state".
Figure 40B:
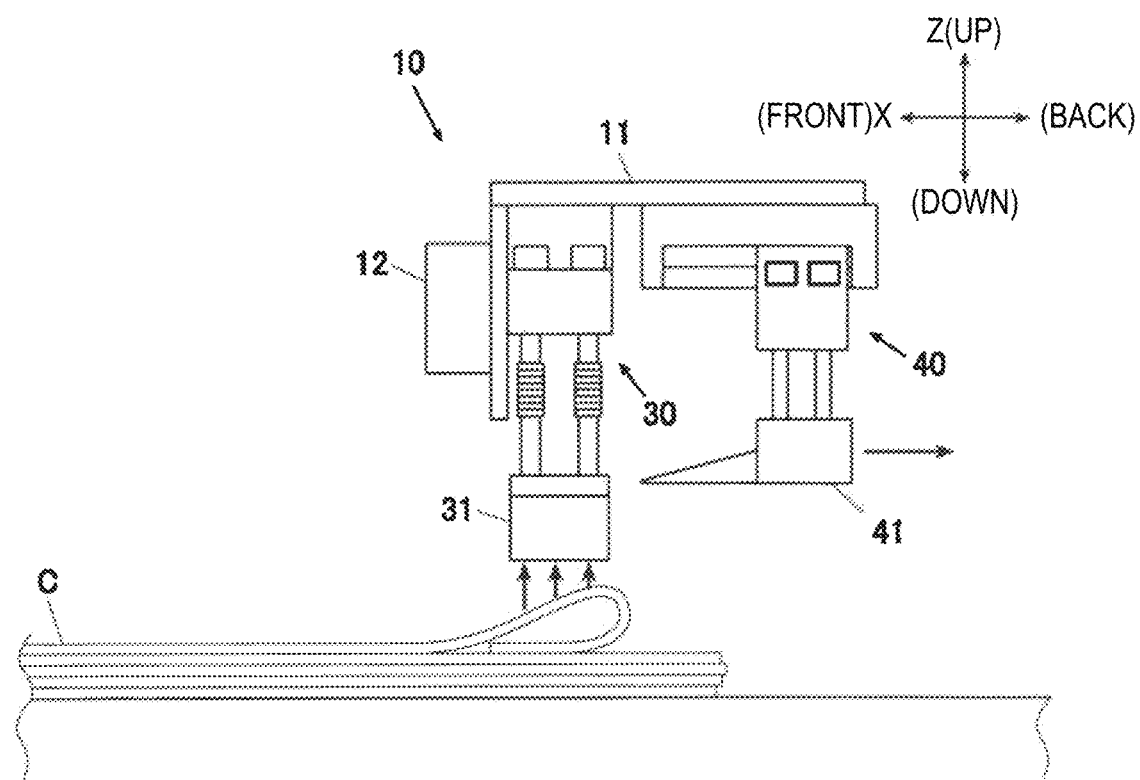

FIGS. 40A and 40B are operation explanatory views of the normalization operation when the surface state of the workpiece C is the "downward-turned state".

For convenience of description, in the case of FIG. 40A as well, the directions of "front" and "back" are described as the directions of the pick-up device 10 when the pick-up operation is performed, and are described in directions that do not match the directions of the pick-up device 10 in the drawing. The same applies to the text description related to FIG. 40A.

When the "downward-turned state" is generated, as illustrated in FIG. 40A, the CPU 91 causes the robot arm to reverse the front and back directions of the pick-up device 10 by 180° around the Z-axis. Accordingly, the tip part 411 of the claw member 41 can be directed backward. The tip part 411 of the claw member 41 is caused to move to the directly front side of the rear end part of the workpiece C in which the downward-turned state is generated, and air is controlled to be discharged from the nozzle port 412. Accordingly, the air passing through the workpiece C can push back the rear end part of the workpiece C in which the downward-turned state is generated backward, such that the workpiece C can be in the "normal state".

Alternatively, as illustrated in FIG. 40B, the CPU 91 causes the robot arm to move the non-absorption type suction pad 31 of the pick-up device 10 directly above the rear end part of the workpiece C in which the downward-turned state is generated, and executes a suction operation. At that time, the CPU 91 may cause the robot arm to move the pick-up device 10 slightly upward, and the pick-up device 10 may further pull up the pulled workpiece C upward.

Accordingly, the rear end part of the workpiece C in which the downward-turned state is generated can be returned to the back by its own elasticity, such that the workpiece C can be in the "normal state".

Only one of the normalization operations of FIGS. 40A and 40B may be performed, or both normalization operations may be performed in order (regardless of a first operation or a second operation).

Figure 41:
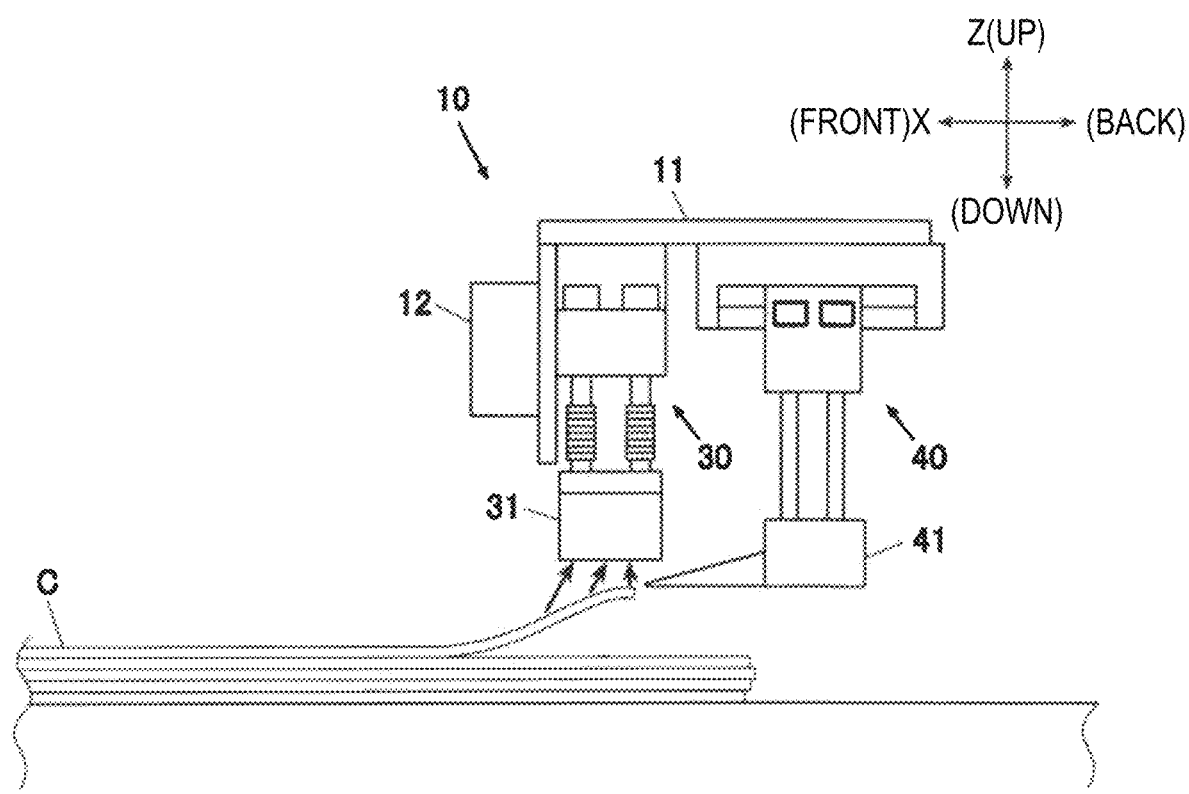
FIG. 41 is an operation explanatory view of the normalization operation when the surface state of the workpiece is the "upper fabric shortage state".

FIG. 41 is an operation explanatory view of the normalization operation when the surface state of the workpiece C is the "upper fabric shortage state".

When the "upper fabric shortage stage" is generated, as illustrated in FIG. 41, the CPU 91 causes the robot arm to move the non-absorption type suction pad 31 of the pick-up device 10 to directly above the rear end part of the workpiece C deviating forward, and executes the suction operation. Next, the CPU 91 causes the robot arm to move the pick-up device 10 backward to move the rear end part of the pulled workpiece C backward.

Accordingly, the rear end part of the workpiece C deviating forward can be drawn back backward, such that the workpiece C can be in the "normal state".

Figure 42:
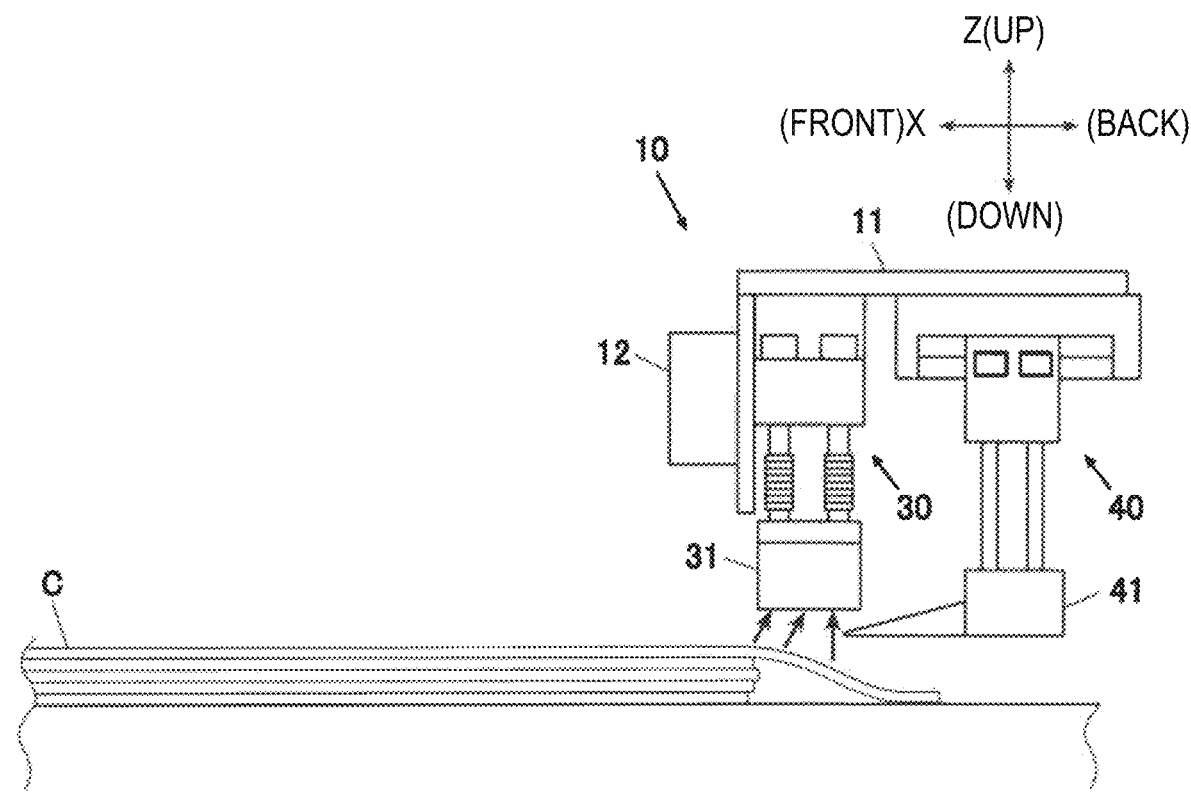
FIG. 42 is an operation explanatory view of the normalization operation when the surface state of the workpiece is the "upper fabric excessive state".

FIG. 42 is an operation explanatory view of the normalization operation when the surface state of the workpiece C is the "upper fabric excessive state".

When the "upper fabric excessive state" is generated, as illustrated in FIG. 42, the CPU 91 causes the robot arm to move the non-absorption type suction pad 31 of the pick-up device 10 to directly above the rear end part of the workpiece C deviating backward, and executes the suction operation. Next, the CPU 91 causes the robot arm to move the pick-up device 10 forward to move the rear end part of the pulled workpiece C forward.

Accordingly, the rear end part of the workpiece C deviating backward can be drawn back forward, such that the workpiece C can be in the "normal state".

Figure 43:
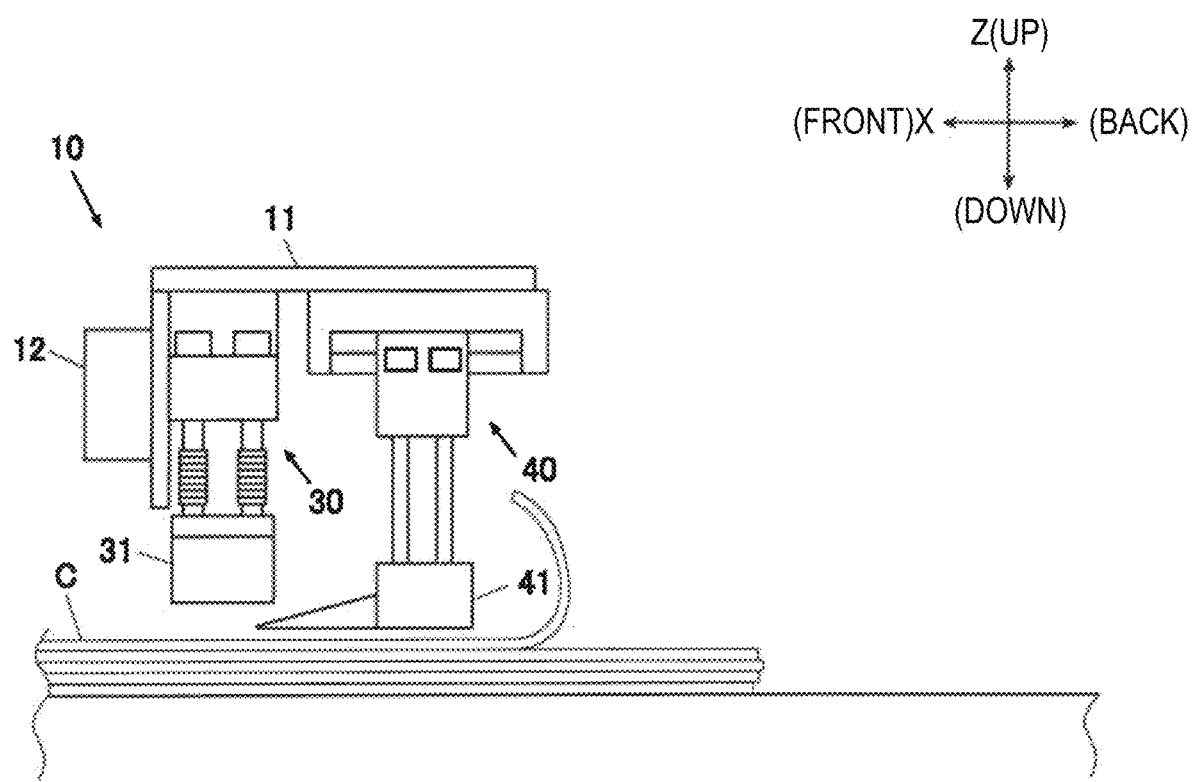
FIG. 43 is an operation explanatory view of the normalization operation when the surface state of the workpiece is the "curled state".

FIG. 43 is an operation explanatory view of the normalization operation when the surface state of the workpiece C is the "curled state".

As illustrated in FIG. 43, the CPU 91 causes the robot arm to move the rear end part of the claw member 41 of the pick-up device 10 to the directly front side of the rear end part of the workpiece C in which the curled state is generated, and the bottom surface of the claw member 41 is in sliding contact with the upper surface of the first workpiece C or maintains a height at which the bottom surface of the claw member 41 is slightly not in sliding contact with the upper surface of the first workpiece C. After that, the CPU 91 causes the robot arm to move the pick-up device 10 backward.

Accordingly, while the bottom surface of the claw member 41 flattens the workpiece C, the rear end part of the claw member 41 can push back the rear end part of the workpiece C in which the curled state is generated backward, such that the workpiece C can be in the "normal state".

The process of estimating the surface state and the normalization operation may be performed every time before the operation of picking up the workpiece C is performed, or may be performed periodically or when a certain condition is satisfied. When the process of estimating the surface state and the normalization operation are periodically performed, for example, the process of estimating the surface state and the normalization operation may be performed every time a specified number of sheets of the workpieces C are picked up. When the certain condition is satisfied, for example, the process of estimating the surface state and the normalization operation may be performed when the main power of the device is turned on, or may be performed when a bundle of workpieces C is placed on a placement table. Alternatively, the process of estimating the surface state or the normalization operation may be performed when the input device 96 inputs an instruction for executing the process of estimating the surface state or the normalization operation.

The process of estimating the surface state and the normalization operation may be performed as a set, or only one thereof may be performed.

Technical Effects of Embodiments of the Invention

As described above, since the pick-up device 10 is formed in a shape in which the air blowing side end part of the groove inner bottom surface 216 of the ventilation groove 212 provided on the bottom surface 211 of the pick-up nozzle 21 is directed in a direction of being separated from the workpiece C, the pick-up device 10 can pull the workpiece C in a direction of being separated from the lower workpiece in a local range of a location facing the blowing side end part of the pick-up nozzle 21.

Therefore, even in the case of the workpiece C which is difficult to be pulled due to a curled end part, and the workpiece C made of a material that causes the workpieces C to be stuck to each other, the separation of the workpiece C can be locally accelerated, such that the workpieces C can be picked up one by one.

The air blowing side end part of the bottom surface 211 of the pick-up nozzle 21 is separated from the workpiece C upward further than the other portion of the bottom surface 211 by the step 217. The step 217 makes it easy to secure a space for pulling up the workpiece C to be pulled upward, such that the workpiece C can be effectively separated from the other workpieces C.

Since the pick-up nozzle 21 is formed in a shape in which the air blowing side end part of the groove inner bottom surface 216 of the ventilation groove 212 is formed with a curved surface of which undulation angle gradually increases from a state parallel to the bottom surface 211 of the pick-up nozzle 21, the separation of the workpiece C can be gradually accelerated, and the workpieces C can be picked up one by one more effectively and stably.

When the air blowing side end part of the groove inner bottom surface 216 of the ventilation groove 212 is formed with an inclined surface inclined at a constant undulation angle with respect to the bottom surface 211 of the pick-up nozzle 21, it is possible to accelerate the separation of the workpiece C along the inclined surface. A shape is simplified, such that the ventilation groove 212 can be easily processed.

Since the pick-up nozzle 21 is disposed on a downstream side in the advancing direction with respect to the claw member 41, the pick-up nozzle 21 turns up the first workpiece C, and then the claw member 41 can separate the first workpiece C from the second workpiece C, thereby making it possible to perform the pick-up work effectively and efficiently.

Since the pick-up device 10 includes the separation mechanism 40 for inserting the claw member 41 between the workpieces C by causing the tip part 411 of the claw member 41 to move forward or backward, it is possible to prevent the workpieces C from being attached to each other again after the workpieces C are separated from each other, and to separate the workpieces C more effectively.

Since the pick-up device 10 includes the suction mechanism 30 including the non-absorption type suction pad 31, the workpiece C can be separated in a wider range than the pick-up nozzle 21. When the workpiece C is not made of a material causing difficulty in the separation work, the pick-up work can be performed more quickly.

Since the pick-up device 10 includes the magnetic sensor 25 and the touch sensor 36 as the thickness detecting unit for detecting the thickness of the workpiece C on the claw member 41, the control device 90 serving as the determination unit can determine, based on the detected thickness of the workpiece C, pick-up errors such as a pick-up failure, a pick-up of a plurality of workpieces C, or the like.

Therefore, the workpiece C can be correctly and appropriately supplied to a supply destination, such that reliability can be improved.

Particularly, in the case of using the touch sensor 36, since the thickness of the workpiece C is detected from a height of the gripping member 53 with respect to the claw member 41, the thickness of the workpiece C can be detected in the process of gripping the workpiece C, such that the number of work steps can be reduced as compared with a case of performing the detection with a dedicated separate member, and the detection can be easily performed.

The pick-up device 10 includes the input device 96 that selects one or a plurality of combinations of the nozzle mechanism 20, the separation mechanism 40, and the suction mechanism 30. Since the control device 90 executes the operation control of picking up the workpiece according to the selection of the input device 96, the control device 90 makes it possible to appropriately pick up various workpieces C in consideration of characteristics of the nozzle mechanism 20, the separation mechanism 40, and the suction mechanism 30.

Particularly, when the control device 90 executes, according to the selection, the operation control of any one of the first pick-up operation for picking up the workpiece C by the separation mechanism 40 alone, the second pick-up operation for picking up the workpiece C by a combination of the nozzle mechanism 20 and the separation mechanism 40, and the third pick-up operation for picking up the workpiece by a combination of the suction mechanism 30 and the separation mechanism 40, the control device 90 can appropriately and efficiently perform the pick-up work for various workpieces C depending on a type of the workpiece C and a difference in the tact of the pick-up operation.

In the first pick-up operation, the tip part 411 of the claw member 41 of the separation mechanism 40 is caused to move forward to separate and pick up the first workpiece C, such that the workpiece C can be picked up more quickly.

In the second pick-up operation, the pick-up nozzle 21 pulls the first workpiece C upward, and then the tip part 411 of the claw member 41 is inserted into the lower side of the first workpiece C to pick up the first workpiece C, such that even though the workpiece C is made of a material causing difficulty in separating the workpieces C from each other, the workpieces C can be separated from each other more effectively, and a highly reliable pick-up operation can be implemented.

In the third pick-up operation, the non-absorption type suction pad 31 pulls the first workpiece C, and then the tip part 411 of the claw member 41 is inserted into the lower side of the first workpiece C to pick up the first workpiece C, such that it is possible to accelerate the separation of the workpieces C which are difficult to be separated from each other by the claw member 41 alone, and to pick up the workpiece C more quickly than the pick-up nozzle 21.

In the pick-up device 10, since the CPU 91 functions as the estimation unit that estimates the state of the first workpiece C from the top from the detected result by the two-dimensional displacement sensor 12, the surface state of the stacked workpieces C can be estimated before the pick-up operation is performed, and it is possible to determine whether or not the subsequent pick-up operation is executed, thereby making it possible to reduce occurrence of a pick-up operation failure and improve the reliability of the device.

Since the CPU 91 estimates the state of the first workpiece C from the top from the displacement in the stacking direction on the upper surface of the stacked workpieces C to be detected by the two-dimensional displacement sensor 12 and the inclination based on the displacement, the existing detection device can be used, a displacement detection unit is not required to be newly provided, and the number of parts can be reduced such that the cost can be reduced.

Since the CPU 91 executes the normalization operation for normalizing the surface state of the workpiece C depending on the state of the first workpiece C from the top estimated by the CPU 91, it is possible to reduce the occurrence of the pick-up operation failure in the subsequent pick-up operation and improve the reliability of the device.

Since the CPU 91 controls one or more of the nozzle mechanism 20, the separation mechanism 40, the suction mechanism 30, and the holding mechanism 50 to execute the normalization operation, the normalization operation can be executed by using an existing configuration, a configuration for performing the normalization operation is not required to be newly provided, and the number of parts can be reduced such that the cost can be reduced.

Others

The details described in each of the embodiments can be changed as appropriate without departing from the spirit of the invention.

For example, examples of the pick-up operation of the workpiece C include the first to third pick-up operation, and the pick-up operation is not limited thereto. The pick-up operation may be performed independently by any one of the nozzle mechanism 20, the separation mechanism 40, and the suction mechanism 30, or the pick-up operation may be performed by a combination of two or more.

When the two-dimensional displacement sensor 12 can detect the location of the workpiece C with high accuracy, the end part detection of the workpiece C by the photoelectric sensor 55 may be omitted.

What is claimed is:

1. A pick-up device picking up stacked sheet-shaped workpieces from the top, the device comprising:
   a nozzle mechanism that includes a pick-up nozzle pulling up a first workpiece from the top of the stacked workpieces by air blowing;
   a holding mechanism that holds the first workpiece from the top;
   a separation mechanism that includes a claw member being inserted into a lower side of the first workpiece from the top with respect to the stacked workpieces, and a forward and backward drive unit causing a tip part of the claw member to move forward and backward;
   a suction mechanism that includes a non-absorption type suction pad pulling up the first workpiece from the top of the stacked workpieces;
   a control device that controls the nozzle mechanism, the separation mechanism, the suction mechanism, and the holding mechanism; and
   a selection unit that selects one or more combinations of the nozzle mechanism, the separation mechanism, and the suction mechanism,
   wherein the control device executes operation control for picking up the stacked workpieces from the top according to the selection of the selection unit.

2. The pick-up device according to claim 1,
   wherein the control device executes, according to the selection of the selection unit, the operation control of any one of a first pick-up operation for picking up the workpiece by the separation mechanism alone, a second pick-up operation for picking up the workpiece by a combination of the nozzle mechanism and the separation mechanism, and a third pick-up operation for picking up the workpiece by a combination of the suction mechanism and the separation mechanism.

3. The pick-up device according to claim 2,
   wherein the holding mechanism includes a gripping member that is lowered relative to the claw member on the upper side of the claw member to grip the workpiece, and a gripping drive unit that gives the gripping member a movement operation for allowing the gripping member to move along a relatively downward direction with respect to the claw member, and the control device, in the first pick-up operation, causes the tip part of the claw member of the separation mechanism to move forward to be inserted into the lower side of the first workpiece from the top, and causes the gripping member of the holding mechanism to be relatively lowered to grip the first workpiece from the top.

4. The pick-up device according to claim 2,
wherein the holding mechanism includes a gripping member that is lowered relative to the claw member on the upper side of the claw member to grip the workpiece, and a gripping drive unit that gives the gripping member a movement operation for allowing the gripping member to move along a relatively downward direction with respect to the claw member, and the control device, in the second pick-up operation, causes the pick-up nozzle to blow air by the nozzle mechanism to pull up the first workpiece from the top, causes the tip part of the claw member of the separation mechanism to move forward to be inserted into the lower side of the first workpiece from the top, and causes the gripping member of the holding mechanism to be relatively lowered to grip the first workpiece from the top.

5. The pick-up device according to claim 2,
wherein the holding mechanism includes a gripping member that is relatively lowered relative to the claw member on the upper side of the claw member to grip the workpiece, and a gripping drive unit that gives the gripping member a movement operation for allowing the gripping member to move along a relatively downward direction with respect to the claw member, and the control device, in the third pick-up operation, causes the non-absorption type suction pad of the suction mechanism to pull up the first workpiece from the top of the stacked workpieces, causes the tip part of the claw member of the separation mechanism to move forward to be inserted into the lower side of the first workpiece from the top, and causes the gripping member of the holding mechanism to be relatively lowered to grip the first workpiece from the top.

6. The pick-up device according to claim 1, further comprising:
   a displacement detecting unit that detects a displacement in a stacking direction on an upper surface of the stacked workpieces; and
   an estimation unit that estimates a state of the first workpiece from the top, based on a detected result of the displacement detecting unit.

7. The pick-up device according to claim 6,
wherein the estimation unit estimates the state of the first workpiece from the top, from the displacement in the stacking direction on the upper surface of the stacked workpieces to be detected by the displacement detecting unit, and an inclination based on the displacement.

8. The pick-up device according to claim 6,
wherein the control device executes a normalization operation for normalizing the state of the first workpiece according to the state of the first workpiece from the top estimated by the estimation unit.

9. The pick-up device according to claim 8,
wherein the control device controls any one or more of the nozzle mechanism, the separation mechanism, the suction mechanism, and the holding mechanism to execute the normalization operation.

\* \* \* \* \*